(12) United States Patent
Fong

(10) Patent No.: US 8,321,478 B2
(45) Date of Patent: Nov. 27, 2012

(54) SYSTEM AND METHOD OF TRANSLATING A RELATIONAL DATABASE INTO AN XML DOCUMENT AND VICE VERSA

(76) Inventor: Joseph S. P. Fong, Discovery Bay (HK)

( * ) Notice: Subject to any disclaimer, the term of this patent is extended or adjusted under 35 U.S.C. 154(b) by 531 days.

(21) Appl. No.: 12/202,714

(22) Filed: Sep. 2, 2008

(65) Prior Publication Data

US 2008/0320023 A1    Dec. 25, 2008

Related U.S. Application Data

(63) Continuation of application No. 11/049,831, filed on Feb. 3, 2005, now abandoned.

(51) Int. Cl.
*G06F 17/30* (2006.01)
(52) U.S. Cl. .......... 707/809; 707/756; 707/E17.048
(58) Field of Classification Search .......... 707/999.101, 707/809, E17.124, 756, E17.048
See application file for complete search history.

(56) References Cited

U.S. PATENT DOCUMENTS

| | | | | |
|---|---|---|---|---|
| 5,797,137 | A * | 8/1998 | Golshani et al. | 707/803 |
| 6,581,062 | B1 | 6/2003 | Draper et al. | 1/1 |
| 6,785,673 | B1 * | 8/2004 | Fernandez et al. | 1/1 |
| 6,785,685 | B2 * | 8/2004 | Soetarman et al. | 1/1 |
| 6,826,568 | B2 * | 11/2004 | Bernstein et al. | 707/749 |
| 6,915,304 | B2 * | 7/2005 | Krupa | 707/756 |
| 7,031,956 | B1 * | 4/2006 | Lee et al. | 1/1 |
| 7,043,487 | B2 * | 5/2006 | Krishnamurthy et al. | 707/804 |
| 7,178,100 | B2 * | 2/2007 | Call | 715/210 |
| 7,487,439 | B1 * | 2/2009 | Lo et al. | 715/234 |
| 2002/0099715 | A1 * | 7/2002 | Jahnke et al. | 707/100 |
| 2002/0116371 | A1 * | 8/2002 | Dodds et al. | 707/3 |
| 2002/0156811 | A1 * | 10/2002 | Krupa | 707/513 |
| 2002/0169788 | A1 * | 11/2002 | Lee et al. | 707/104.1 |
| 2003/0014397 | A1 * | 1/2003 | Chau et al. | 707/3 |
| 2003/0101194 | A1 * | 5/2003 | Rys et al. | 707/101 |
| 2003/0177443 | A1 * | 9/2003 | Schnelle et al. | 715/513 |
| 2003/0204511 | A1 * | 10/2003 | Brundage et al. | 707/100 |
| 2004/0128296 | A1 * | 7/2004 | Krishnamurthy et al. | 707/100 |
| 2004/0225671 | A1 * | 11/2004 | Carroll et al. | 707/101 |
| 2004/0225763 | A1 * | 11/2004 | Carroll et al. | 710/36 |
| 2005/0055336 | A1 * | 3/2005 | Hui et al. | 707/3 |

(Continued)

OTHER PUBLICATIONS

Fong et al., "Converting Relational Database into XML Document", IEEE, 2001, pp. 61-65.*

(Continued)

*Primary Examiner* — Phuong Thao Cao
(74) *Attorney, Agent, or Firm* — David E. Rook; Hoffman Warnick LLC

(57) ABSTRACT

A method of translating a relational database into an XML document comprises generating an Extended Entity Relationship model from relational schema associated with the relational database and applying a schema translation process to the Extended Entity Relationship model to map the relational schema into a Document Type Definition (DTD) of an XML schema. An XML Tree Model is then generated from the Document Type Definition, the XML Tree Model being representative of one or more data semantics of the relational schema which are preserved as one or more data semantics in the XML document. Relational data from the relational database is then converted into the XML document using the relational schema and the XML schema from the Document Type Definition and/or the XML Tree Model. There is also described a method of translating an XML database into a relational database which comprises the reversal of the steps of the disclosed method, and a system for implementing both methods.

19 Claims, 48 Drawing Sheets

U.S. PATENT DOCUMENTS

| | | | |
|---|---|---|---|
| 2005/0165866 A1* | 7/2005 | Bohannon et al. | 707/203 |
| 2005/0182772 A1* | 8/2005 | Mital et al. | 707/100 |
| 2005/0187973 A1* | 8/2005 | Brychell et al. | 707/104.1 |
| 2005/0198064 A1* | 9/2005 | Davidson et al. | 707/103 R |
| 2005/0203933 A1* | 9/2005 | Chaudhuri et al. | 707/101 |
| 2006/0004851 A1* | 1/2006 | Gold et al. | 707/103 X |
| 2006/0101423 A1* | 5/2006 | Aharoni et al. | 717/136 |
| 2007/0112810 A1* | 5/2007 | Jonsson | 707/101 |
| 2007/0198539 A1* | 8/2007 | Warshavsky et al. | 707/100 |

OTHER PUBLICATIONS

Fong et al., "Converting Relational Database into XML Document with DOM", Information and Software Technology 45 (2003), pp. 335-355.*

Jacinto et al., "Bidirectional Conversion between XML Documents and Relational Data Bases", 2002, pp. 437-443.*

Varlamis et al., "Bridging XML—Schema and Relational Databases. A system for Generating and Manipulating Relational database using Valid XML documents", 2001, pp. 105-114.*

Lee et al., "NeT & CoT: Translating Relational Schemas to XML Schemas using Semantic Constraints", ACM, 2002, 10 pages.*

Fong et al., "Converting relational database into XML documents with DOM", Information and Software Technology 45, 2003, pp. 335-355.*

Kleiner et al., "Automatic Generation of XML DTDs from Conceptual Database Schemas", GI Jahrestagun (1) 2001, 10 pages.*

Mani et al., "Semantic Data Modeling using XML Schemas", In Proceedings of the 20th International Conference on Conceptual Modeling (ER 2001), 14 pages.*

Lee et al., "Constraints-preserving Transformation from XML Document Type Definition to Relational Schema", in ER 2000, 14 pages.*

Chen et al., "Constraint Preserving XML Storage in Relations", In Proceedings of the International Workshop on the Web and Databases (WEBDB) 2002, 6 pages.*

Lee et al., "CPI: Constraints_Preserving Inlining Algorithm for mapping XML DTD to Relational Schema", Data & Knowledge Engineering 39 (2001), pp. 3-25.*

Lee et al., "NeT & CoT: Translating Relational Schemas to XML Schemas using Semantic Constraints", ACM International Conference on Information and Knowledge Management, 2002, 10 pages.*

Fong et al., "Converting Relational Database Into XML document", In Proceedings of Database and Expert Systems Applications, IEEE, 2001, pp. 61-66 (5 pages).*

Wang et al., "Reverse Engineering based Approach for Transferring Legacy Relational Databases into XML", In Proceedings of the 6th International Conference on Enterprise Information Systems, ICEIS 2004, Apr. 4-17, 2004, pp. 175-189 (15 pages).*

Fong et al., "Converting Relational Database into XML Documents with DOM", Information and Software Technology 45 (2003), 2003, pp. 335-355 (21 pages).*

Liu et al., "Constraint Preserving Transformation from Relational Schema to XML Schema", Kluwer Academic Publishers, 2005, 22 pages, accessed online at <https://staff.cis.unisa.edu.au/personal/~liuj/publications/06wwwJ-chengf-r2xml3.pdf> on Aug. 2, 2012.*

Lv et al., "Relational to XML Schema Conversion with Constraints", ASIAN 2005, LNCS 3818, 2005, pp. 278-279 (2 pages).*

Fan et al., "Integrity Constraints for XML", in Proceedings of the 19th ACM Symposium on Principles of Database Systems, ACM—New York, 2000, 35 pages.*

Bourret et al., "A Generic Load/Extract Utility for Data Transfer Between XML Documents and Relational Databases", In the 2nd International Workshop on Advanced Issues of EC and Web-based Information System (WECWIS), 2000, pp. 134-143 (10 pages).*

Fong et al., "Translating Relational Schema with Contraints into XML Schema", In the International Journal of Software Engineering and Knowledge Engineering, No. 16, 2006, 41 pages, accessed online at <http://www.cs.cityu.edu.hk/~yong/homepage/reference/Translating%20Relational.pdf> on Aug. 2, 2012.*

* cited by examiner

Relation A

| A1 | A2 |
|---|---|
| a11 | a21 |
| a12 | a22 |

Relation B

| B1 | B2 | *A1 |
|---|---|---|
| b11 | b21 | a11 |
| b12 | b22 | a12 |

Data Conversion ⟷

XML document

Relation A

| A1 | A2 |
|---|---|
| a11 | a21 |
| a12 | a22 |

Relation B

| B1 | B2 | *A1 |
|---|---|---|
| b11 | b21 | a11 |
| b12 | b22 | a12 |

Data Conversion ⟷

XML document

Relation A

| A1 | A2 |
|---|---|
| a11 | a21 |
| a12 | a22 |

Relation B1

| *A1 | B11 |
|---|---|
| a11 | b11 |

Relation B2

| *A1 | B21 |
|---|---|
| a12 | b21 |

Data Conversion ⟷

XML document

Relation A

| A1 | A2 |
|---|---|
| a11 | a21 |
| a12 | a22 |

Relation B1

| *A1 | B11 |
|---|---|
| a11 | b11 |

Relation B2

| *A1 | B21 |
|---|---|
| a11 | b21 |
| a12 | b22 |

Data Conversion ⟷

XML document

XML Tree Model (Program-generated view)

"*" postfixed are multiple occurrence

SYSTEM AND METHOD OF TRANSLATING A RELATIONAL DATABASE INTO AN XML DOCUMENT AND VICE VERSA

CROSS-REFERENCE TO RELATED APPLICATIONS

This application is a continuation application of U.S. patent application Ser. No. 11/049,831, filed 3 Feb. 2005 now abandoned, which is hereby incorporated herein.

FIELD OF INVENTION

The present invention relates to a method of translating a relational database into an XML document, a method of translating an XML database into a relational database, a method of data transmission of relational data through an XML document between a sender and a receiver over a network, a computer program, computer program product, a system of translating a relational database into an XML document and a system of translating an XML database into a relational database.

BACKGROUND OF INVENTION

Internet applications today are faced with the problem of replicating, transforming, exporting, or saving data from one format to another. This process may be laborious, tedious and error prone. The Internet holds within it the potential for integrating all information into a global network, promising access to information any time and anywhere. However, this potential has yet to be realised. At present, the Internet is merely an access medium. To realize the Internet's potential, intelligent search, data exchange, adaptive presentation, and data recovery are needed. The Internet must go beyond setting an information access standard, which means a standard way of representing data, so that software can search, move, display, recover and otherwise manipulate information currently hidden in contextual obscurity.

XML (eXtensible Markup Language) has emerged as the standard for data interchange over the Internet. Interoperation of relational databases and XML databases requires schema translation and data conversion between the relational and XML databases. The translated XML schema may assist in the sharing of business data with other systems, interoperability with incompatible systems, exposing legacy data to applications that use XML such as e-commerce, object persistence using XML, and content syndication. In recent years, with the growing importance of XML documents as a means to represent data on the World Wide Web, much research has been carried out on devising new technologies to store and retrieve XML documents using relational databases.

XML databases are available from the key Relational Database Vendors in the marketplace as an extender or cartridge to a relational database management system. Most XML-enabled database management systems such as Oracle, SQL Server and Sybase can only translate a few relations into an XML document. However, they cannot transform the whole relational database into an XML document nor synchronize a relational database into a replicate XML database.

Moreover, in such conventional systems and methods, the translation is without data semantics constraints considerations, and thus these methods may not be sufficient for an information highway on the web. The demand on the database is increased in e-commerce. Aoying Zhou, Hongjun Lu, Shihui Zheng, Yuqi Liang, Long Zhang, Wenyun Ji, and Zengping Tian describe a visual based XML document management system (a VXMLR system) in the paper entitled 'A Visual XML-Relational Database System', published as Proceedings of the 27th VLDB Conference, Roma, Italy, 2001 pp. 646-648. In this system, firstly an XML document is parsed into a Document Object Model (DOM) tree and the Document Type Definition (DTD) of the document is extracted. The Document Object Model tree is then mapped into a relational table and stored in a database. For processing XML queries, the path expressions queries are transformed into SQL statements and submitted to the underlying Relational Database Management Systems (RDBMS). VXMLR maintains some statistics of data and a path directory, which are used in the query rewriting process to reduce the number of SQL statements and simplify join conditions.

Mary Fernandez, Wang-Chiew Tan and Dan Suciu in the document entitled 'SilkRoute: trading between relations and XML, Computer Networks', Volume 33, Issues 1-6, June 2000, pp. 723-745 describe a general framework for mapping relational databases to XML virtual views using a declarative query language, RXL (Relational-to-XML Transformation Language). The resultant view is formulated by application using XML-Query Language (QL) to extract XML data.

In a document by Masatoshi Yoshikawa and Toshiyuki Amagasa entitled 'XRel: A path-based approach to storage and retrieval of XML documents using relational databases', published as ACM Transactions on Internet Technology, Vol. 1 No. 1, August 2001, pp. 110-141, an XML document is decomposed into a set of nodes that are stored in several tables along with encoded path information from the root to each node. XML documents are stored using a fixed relational schema without any information about DTDs and also utilize indices such as the B1-tree supported by DBMS. To process XML queries, an algorithm is presented for translating a core subset of XPath expressions into SQL queries.

Jayavel Shanmugasundaram, Eugene Shekita, Rinion Barr, Michael Carey, Bruce Lindsay, Hamid Pirahesh, and Berthold Reinwald, in a document entitled 'Efficiently Publishing Relational Data as XML Documents', published as Proceedings of the 26th VLDB Conference, Cairo, Egypt, 2000, pp. 65-76, describe an SQL language extension, namely an XML constructor, for constructing complex XML documents directly in the relation engine. Different execution plans for generating the content of an XML document were explored. The result shows that constructing XML documents inside the relation engine could have significant performance benefits.

Joseph Fong, Francis Pang, and Chris Bloor in a document entitled 'Converting Relational Database into XML Document', published as Proceedings of First International Workshop on Electronic Business Hubs, September, 2001, pp. 61-65 describe a method to translate XQL into SQL in an XML gateway. The described translation process adopts a symbolic transformation of node navigation in an XQL query graph to a relation join table navigation in an SQL query graph.

Joseph Fong and Tharam Dillon in a document entitled 'Towards Query Translation from XQL to SQL', published as Proc. of 9th IFIP 2.6 Working Conference on Database Semantics (D59) by World Scientific Publisher in 2001, pp. 113-129, describe a comparison of the performance analysis between an XML-Enabled Database and a Native XML database and Native XML databases are recommended therein for very complex structure systems. In a document by Joseph Fong, H K Wong, and Anthony Fong entitled 'Performance Analysis between XML-Enabled Database and Native XML Database', a book chapter of XML Data Management, edited by Akmal Chaudhri, Addison-Wesley, USA, March, 2003, steps are described for converting a relational database into an XML document. The described steps show how to translate relational schema into XML schema, followed by manually mapping data to an XML document.

Multi-database systems are systems that provide interoperation and a varying degree of integration among multiple databases. There are different approaches to multidatabase interoperability. Global schema integration is an approach that is based on complete integration of multiple databases in order to provide a global schema. However, there are several disadvantages of this approach, one of them is that it is difficult to identify relationships among attributes of two schemas and to identity relationships among entity types and relationship types. However, there is another approach, known as the Multidatabase Language Approach. The aim of this approach is to perform queries involving several databases at the same time. However, this approach requires users to learn another language and users may find it difficult to understand each individual database schema.

Some database management systems (e.g. Oracle, DB2) allow input of XQL queries to allow users to retrieve XML documents. However, the data retrieved are actually stored in tables in the relational database and are not stored in an XML database.

Conventional methods for storing XML documents in relational databases can roughly be classified into three categories: structure-mapping, model-mapping and semantic-preserving approaches.

The Model-Mapping Approach:

There have been several studies that use fixed relational schemas to store XML documents. Such approaches are known as model-mapping approaches. Each such approach has different mapping rules and database schema.

The "Edge" approach is described in Kanne, C., and Moerkotte, G., Efficient Storage of XML Data, Proceedings of the 16 International Conference on Data Engineering, 2000, Page(s): 198-198 and stores the XML data as a direct graph/tree in a single relational table. This approach maintains edges individually. Therefore it needs to concatenate the edges to form a path for processing user queries. As a sample table, it only keeps edge-labels, rather than the labeled paths. Therefore a large number of joins is needed to check edge connections.

Similar to the "Edge" approach, Thomas Kudrass, in a document entitled 'Management of XML documents without schema in relational database systems', published as Information and Software Technology, Volume 44, Issue 4, March 2002, Page(s): 269-275 describes an edge table enriched by an amount of information in order to distinguish between different target nodes. In this approach, the content of a document is stored in a leaf value (Leaf table) or in an attribute value (Attr table). Both are referenced from the Edge table via a foreign key. The edges of the document tree are identified by a source node and a target node. Each document has a unique ID so that an edge can be assigned to one document. A drawback of this approach is that the decomposition of a document produces a lot of tuples to be inserted into the database. Therefore, the load time may increase for a large document. Masatoshi Yoshikawa, and Toshiyuki Amagasa, in a document entitled 'Xrel: A Path-Based Approach to Storage and Retrieval of XML Documents Using Relational Databases', published as ACM Transactions on Internet Technology, Vol. 1, No. 1, August 2001, Page(s): 110-141 describe a system (XreI) in which an XML document is decomposed into nodes on the basis of its tree structure and stored in relational tables according to the node type, with path information from the root to each node. The Xrel system stores the directed graph of an XML document in four tables. The advantage of the XRel system is that it does not require recursive queries, and can perform the same function within the SQL-92 standard. Haifeng Jiang, Hongjun Lu, Wei Wang, and Jeffrey Xu Yu, in a document entitled 'Xparent: an efficient RDBMS-Based XML database system', published as Proceedings of the 18' International Conference on Data Engineering. 2002, Page(s): 335-336 describe a system (Xparent) in which the data model of an Xpath system is adopted to represent XML documents. The Xparent system models a document as an ordered tree. It uses similar schema to those used in the XreI system. In this system the data-path id replaces the start and end pairs used in the XreI system. The advantage of the Xparent system is that it can be efficiently supported using conventional index mechanisms such as B-tree. One drawback of the Xparent system is that it requires a large number of joins to check edge-connections for processing complex queries.

In XML-Relational conversion which is described in a document by Latifur Khan, Yan Rao entitled 'A performance evaluation of storing XML data in relational database management systems', published as Proceeding of the 3rd international workshop on Web information and data management, November 2001 Page(s): 31-38, each document is stored in two relational tables. This approach preserves the nested structure of an XML document. A shortcoming of this approach is that PathId depends on an element's tag, and it might be the case that some elements occur multiple times which violates the definition of primary key (PathId). Extra work is required to solve such conflicts.

The Structure-Mapping Approach:

In structure-mapping, schemas are extracted from XML documents and a database schema is defined for each XML document.

Mary Fernández, Wang-Chiew Tan and Dan Suciu, in a document entitled 'SilkRoute: trading between relations and XML', published as Computer Networks, Volume 33, Issues 1-6, June 2000, Page(s): 723-745 describes a general framework for mapping relational databases to XML virtual views using a declarative query language, RXL (Relational to XML Transformation Language). The operation starts by writing an RXL query that defines the XML virtual view of the database. The main shortcoming with this approach is that queries over the views often produce composed queries with many unions. Iraklis Varlamis and Michalis Vazirgiannis, in a document entitled 'Bridging XML-schema and relational databases, a system for generating and manipulating relational databases using valid XML documents', published as Proceeding of the ACM Symposium on Document Engineering, November 2001, Page(s): 105-114 describe an X-Database system that acts as an interface between the application and database. The basis of the system is an XML-Schema that describes the logical model of interchanged information. A drawback of the X-Database system is that in this system the XML-Schema may be defined once in the beginning of the process and cannot be changed, but, in reality, the schema is changed over time in the majority of applications.

The XPERANTO system described by Michael Carey, Jerry Kiernan, Jayavel Shanmugasumidaram, Eugene Shekita, and Subbu Subramanianm, in a document entitled 'XPERANTO: Middleware for Publishing Object-Relational Data as XML Documents', published as Proceedings of the $26^{th}$ VLDB Conference, 2000, Page(s): 646-648 operates as a middleware on top of a (an object) relational database system. This system starts by providing a default virtual view of a given (object) relational database. The user may then create more complex or specialised views based on the default view by using an XML query language. One attractive aspect of the XPERANTO approach is that it works in any existing relational database system because the XPERANTO system generates a regular SQL and tags the results outside the database engine.

Aoying Zhou, Hongjun Lu, Shihui Zheng, Yudi Liang, Long Zhang, Wenyun Ji, and Zengping Tian in a paper entitled "VXMLR: A Visual XML-Relational Database System" published as Proceedings of the 27th VLDB Conference, 2001, pages 646-648 present a visual based XML document management system, VXMLR. In this system, the XML document is parsed into a Document Object Mode tree and the DTD of the document is extracted. The document tree is then mapped and stored into a relational table. VXMLR maintains some statistic of data and a path directory, which are used in the query rewriting process to reduce the number of SQL statements and simplify join conditions.

The Semantic-Preserving Approach:

The semantic-preserve approach generates an XML structure that is able to describe the semantics and structure in the underlying relational database.

Wenyue Du, Mong Li Lee and Tok Wang Ling, in a document entitled 'XML structures for relational data', published as Proceedings of the Second International Conference on Web Information Systems Engineering, Volume 1, December 2001, Page(s): 151-160 describe a methodology which employs a semantically rich Object-Relational-Attribute model for semi-structured data (ORA-SS) in the translation process. ORA-SS models a rich variety of semantic constraints (strong/weak entities, binary/n-ary/recursive/ISA relationship type, single-valued/multi-valued attributes of entity types or relationship types and cardinality constraints) in the underlying relational database, and represents the implicit structures of relational data using hierarchy and referencing. ORA-SS preserves the inherent semantics and implicit structure in relational schema.

J. Fong, H. K. Wong and Z. Cheng, in a document entitled 'Converting relational database into XML documents with DOM', published as Information and Software Technology, Volume 45, Issue 6, April 2003, Pages 335-355 describe a system in which the relational schema are denormalized into joined tables which are transformed into a Document Object Model (DOM) according to their data dependency constraints. These DOMs are integrated into a DOM which is translated into an XML document. The data dependencies constraints in the de-normalized relational schema are mapped into XML document trees in elements and sub-elements. In the process, the partial functional dependencies are mapped into elements and attributes. The transitive data dependencies are mapped into element, sub-element, and sub-sub-elements in the XML documents. The multi-valued dependencies are mapped into multiple sub-elements under one element. The join dependencies are mapped into a group element. As a result, the data semantics in the relational schema are translated and preserved in the XML document.

Angela Cristina Duta, Ken Barker, Reda Alhajj, in a document entitled 'ConvRel: relationship conversion to XML nested structures', published as Proceedings of the 2004 ACM symposium on applied computing, March 2004, Page(s): 698-702 describe a system in which relational schemas are transformed into nested-based XML schema for each relational data source.

In summary, there is a need for a system having a relational database for traditional data processing and also its equivalent XML database for various applications (such as Bank-to-Bank (B2B) applications) with improved performance in the online conversion from relational data to an XML document. Furthermore, as users may prefer to keep two production database systems for computing, there is a need for a system in which a relational database may be used for internal data processing and its counterpart XML database may be used for external Internet data transmission. There is also a need for a method for converting between a relational database and an XML database which improves database performance, enables automatic XML database recovery in the case of system failures, and is easy to use enabling users to use their own familiar query language.

SUMMARY OF THE INVENTION

According to a first aspect of the present invention there is provided a method of translating a relational database into an XML document comprising the steps of:

generating an Extended Entity Relationship (EER) model from relational schema associated with said relational database;

applying a schema translation process to the Extended Entity Relationship model to map the relational schema into a Document Type Definition (DTD) of an XML schema;

generating a XML Tree Model from said Document Type Definition representative of one or more data semantics of the relational schema which are preserved as one or more data semantics in said XML document; and converting relational data from said relational database into said XML document using said relational schema and said XML schema from said Document Type Definition and/or said XML Tree Model.

Preferably, the step of applying a schema translation process comprises mapping the relational schema with associated relational schema constraints into said Document Type Definition.

Preferably, the step of generating a XML Tree Model comprises generating a plurality of XML Tree Models representative of one or more data semantics of the relational schema. In a preferred embodiment, the method further comprises updating said relational database and said XML database by translating an update transaction from said relational database in Structural Query Language into an update transaction of said XML database as a Document Object Model.

According to a second aspect of the present invention there is provided a method of translating an XML database into a relational database comprising the steps of:

generating a XML Tree Model from said XML database;

generating a Document Type Definition representative of one or more data semantics of an XML schema associated with said XML database;

generating an Extended Entity Relationship (EER) model from said XML schema;

applying a schema translation process to the Extended Entity Relationship model to map the XML schema into a relational schema representative of said relational database, said data semantics of said XML schema being preserved as one or more data semantics in said relational database; and converting XML data from said XML database into said relational database using said relational schema and said XML schema from said Document Type Definition and/or said XML Tree Model.

Preferably, said XML schema comprise one or more elements each having an associated data occurrence, and wherein the step of applying a schema translation process further comprises for each element in said XML schema, locating a corresponding target relation, and loading into a tuple of said target relation the data occurrence of said element according to one or more data semantics of said XML database.

According to a third aspect of the present invention there is provided a method of data transmission of relational data through an XML document between a sender and a receiver over a network comprising the method defined above for translating relational data into an XML document, transmitting from said sender said XML document over said network, receiving at said receiver said XML document, and converting said XML document into a relational language used in said receiver Preferably, the step of converting said XML document into a local relational schema used in said receiver comprises:

generating a XML Tree Model from said XML document;

generating a Document Type Definition representative of one or more data semantics of an XML schema associated with said XML document;

generating an Extended Entity Relationship (EER) model from said XML schema;

applying a schema translation process to the Extended Entity Relationship model to map the XML schema into said local relational schema representative of a relational database of said receiver, said data semantics of said XML schema being preserved as one or more data semantics in said relational database of said receiver; and converting XML data from said XML database into said local relational database using said local relational schema and said XML schema from said Document Type Definition and/or said XML Tree Model.

Preferably, said network is the Internet.

According to a fourth aspect of the present invention there is provided a computer program comprising program instructions for causing a computer to perform one or more of the methods defined above.

According to a fifth aspect of the present invention there is provided a computer program product comprising the computer program defined above.

According to a sixth aspect of the present invention there is provided a system arranged to perform any one or more of the methods defined above.

According to a seventh aspect of the present invention there is provided a system of translating a relational database into an XML document comprising:

an Extended Entity Relationship (EER) model generator for generating an Extended Entity Relationship (EER) model from relational schema associated with said relational database;

means for applying a schema translation process to the Extended Entity Relationship model to map the relational schema into a Document Type Definition (DTD) of an XML schema;

a generator for generating a XML Tree Model from said Document Type Definition representative of one or more data semantics of the relational schema which are preserved as one or more data semantics in said XML document; and a converter for converting relational data from said relational database into said XML document using said relational schema and said XML schema from said Document Type Definition and/or said XML Tree Model.

According to an eighth aspect of the present invention there is provided a system of translating an XML database into a relational database comprising:

a XML Tree Model generator for generating a XML Tree Model from said XML database;

a Document Type Definition generator for generating a Document Type Definition representative of one or more data semantics of an XML schema associated with said XML database;

an Extended Entity Relationship (EER) model generator for generating an Extended Entity Relationship (EER) model from said XML schema;

means for applying a schema translation process to the Extended Entity Relationship model to map the XML schema into a relational schema representative of said relational database, said data semantics of said XML schema being preserved as one or more data semantics in said relational database; and a converter for converting XML data from said XML database into said relational database using said relational schema and said XML schema from said Document Type Definition and/or said XML Tree Model.

One or more preferred embodiments of the invention are advantageous for assisting improvements in database performance, automating XML database recovery in the case of system failures, and permitting users to use their own familiar query language which renders the systems and methods easy to use.

One or more preferred embodiments of the invention provide an incrementally maintainable XML database for efficient and effective Internet computing on the web which is particularly useful in the field of e-commerce.

Internet computing performance may be improved as a replicate XML database and its counterpart relational database may be processed in parallel for both internal data processing computing and external data transmission on the Internet. Furthermore, one or more preferred embodiments of the invention enable an XML database to be recovered by its counterpart relational database in the event that the XML database is down.

To make relational tables compatible with the XML document, one or more preferred embodiments of the invention propose a scheme for translating a relational database into an XML document according to its topology mapping. The scheme may preserve the original relational database constraints which has the benefit that XML documents may be made compatible with a relational database and vice versa.

Thus, one or more preferred embodiments of the invention provide a pair of information capacity equivalent relational and XML databases for rapid and user friendly computing on the Internet.

In one or more embodiments of the present invention, the DTD is used as the logical schema and the XML Tree Model is suggested as the conceptual schema. Thus, users may rely on the XML Tree Model to improve the conceptual structure for understanding the data requirements constraints of XML database.

XML schema provides a means of using XML instances to define augmented DTDs.

DESCRIPTION OF DRAWINGS

Preferred features of the invention will now be described, for the sake of illustration only, with reference to the following figures in which:

FIG. 6b is a schematic representation of a cardinality mapping in a conversion between relational data and an XML document for the case of one-to-one cardinality according to an embodiment of the invention;

FIG. 6d is a schematic representation of a cardinality mapping in a conversion between relational data and an XML document for the case of one-to-many cardinality according to an embodiment of the invention;

FIG. 9b is a schematic representation of a generalisation mapping of conversion between relational data and an XML document for the case of disjoint generalisation according to an embodiment of the invention;

FIG. 9d is a schematic representation of a generalisation mapping of conversion between the relational data and the XML document for the case of overlap generalisation according to an embodiment of the invention;

DESCRIPTION OF PREFERRED EMBODIMENTS

Document Type Definition (DTD) is a logical schema of the XML model. There is currently no standard format for the conceptual level of the XML model, and preferred embodiments of the invention present a XML Tree Model as a diagrammatic representation of a DTD to form an XML conceptual model. The XML Tree Model may represent diagrammatically the data semantics of an XML database. The XML Tree Model may transform the constraints of a DTD in a topological structure of hierarchy nodes representing all elements within the DTD. Furthermore, the XML Tree Model may confirm the constraints according to user requirements.

Figure 1:
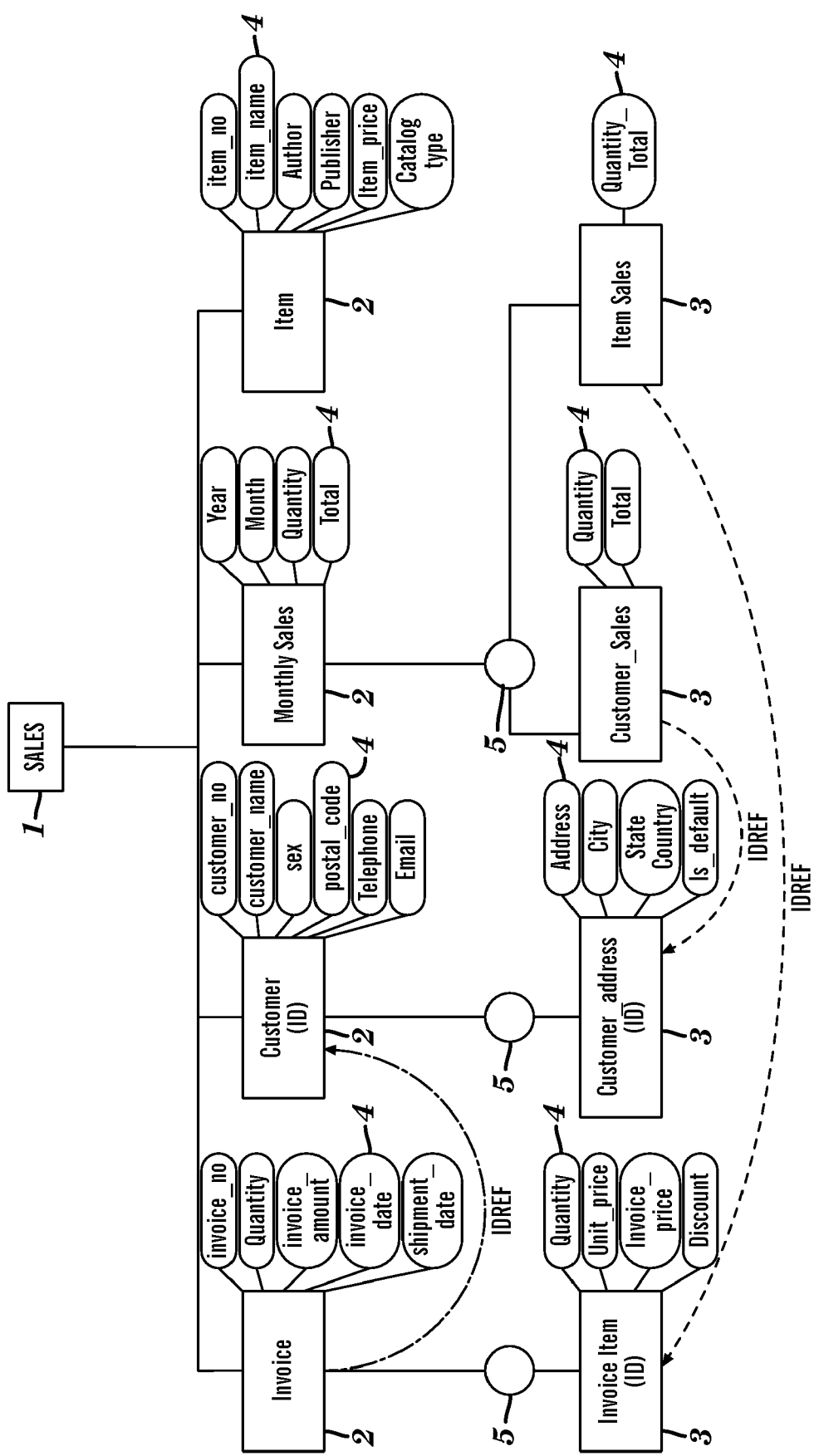
FIG. 1 is an example of a XML Tree Model based on the root element 'SALES' for use in an embodiment of the invention.

FIG. 1 is an example of a Document Type Definition (DTD) graph based on a root element SALES 1. The root element 1 has a number of attached elements 2, namely Invoice, Customer, Monthly_Sales and Item. A number of sub-elements 3 are attached to one or more of the elements 2, for example a sub-element Invoice_Item is attached to the element Invoice, a sub-element Customer_Address is attached to the element Customer and sub-elements Customer_Sales and Item_Sales are attached to the element Monthly Sales. Each element 2 and sub-element 3 has a number of attributes 4, for example, the sub-element Invoice has the attributes Invoice_Number, Quantity, Invoice_Amount, Invoice_Date and Shipment_Date. An occurrence indicator 5 may be used, for example, to identify "set" sub-elements 3 that can occur from zero to many times under a parent element 2.

According to a preferred embodiment of the invention, an XML document may be considered to have a hierarchical tree structure as follows. Every XML document must have one root element 1. The root element 1 is in the highest hierarchical level. The root element 1 contains all the other elements 2, 3 and its attributes 4. The other elements 2, 3 are in hierarchical order, such that they are in relative parent or child node. The relative higher level is the parent node and the relative lower level is the child node.

An element 2 may be considered to be the basic building block of an XML document.

An element name should start with a letter or underscore character. An element may have sub-elements 3 under it. However, an empty element does not have a sub-element. Between an element 2 and a sub-element 3, there may be declarations 5 which control the occurrences of sub-elements 3. For example, element instances in a Document Type Definition (DTD) may be defined with an occurrence indicator The "*" operator may be used, for example, to identify "set" sub-elements that can occur from zero to many times under a parent element. The "+" occurrence indicator may be used to specify one to many times occurrence under a parent element. The "?" occurrence indicator may be used to specify zero to one time occurrence under a parent element.

Attributes 4 give more information about an element 2 and reside inside the element 2. An attribute 4 may further define the behaviour of an element 2 and allow it to have extended links by giving it an identifier.

The components of the XML Tree Model preferably consist of the Element 2, Attributes 4, Occurrence indicator 5, Id, Idref, Group element, Sub-element 3 and Component element.

Figure 2A:
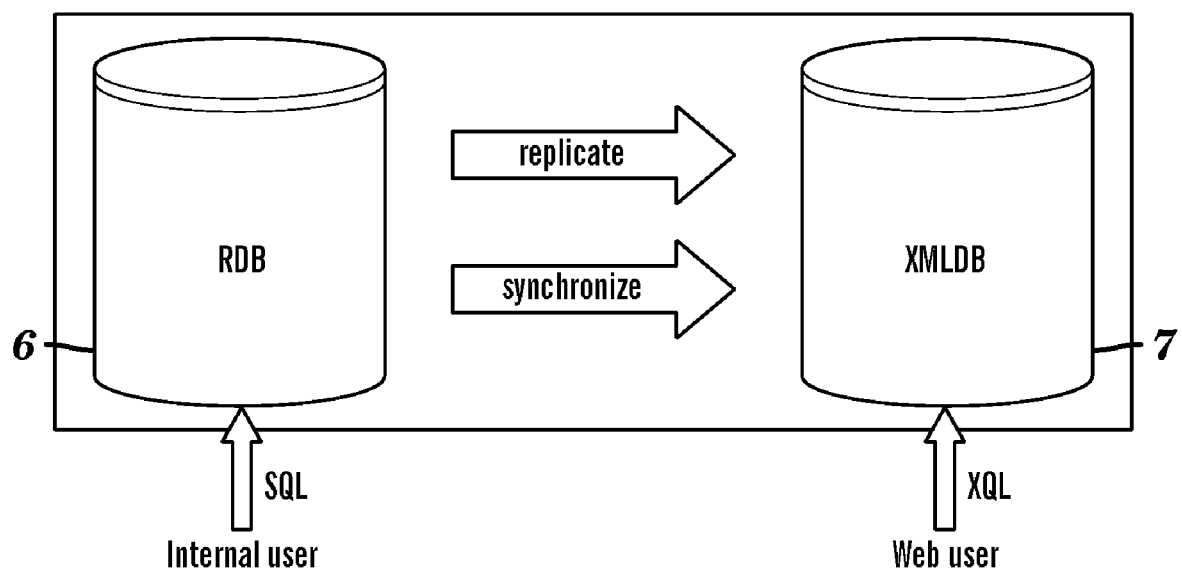
FIG. 2a is a schematic representation of an architecture of replicate relational and XML databases according to an embodiment of the invention.

FIG. 2a shows a scheme according to a preferred embodiment of the invention for making relational tables in a relational database (RDB) 6 compatible with an XML document 7 by translating a relational database 6 into an XML document 7 according to its topology mapping. The scheme may preserve the original relational database constraints.

Figure 2B:
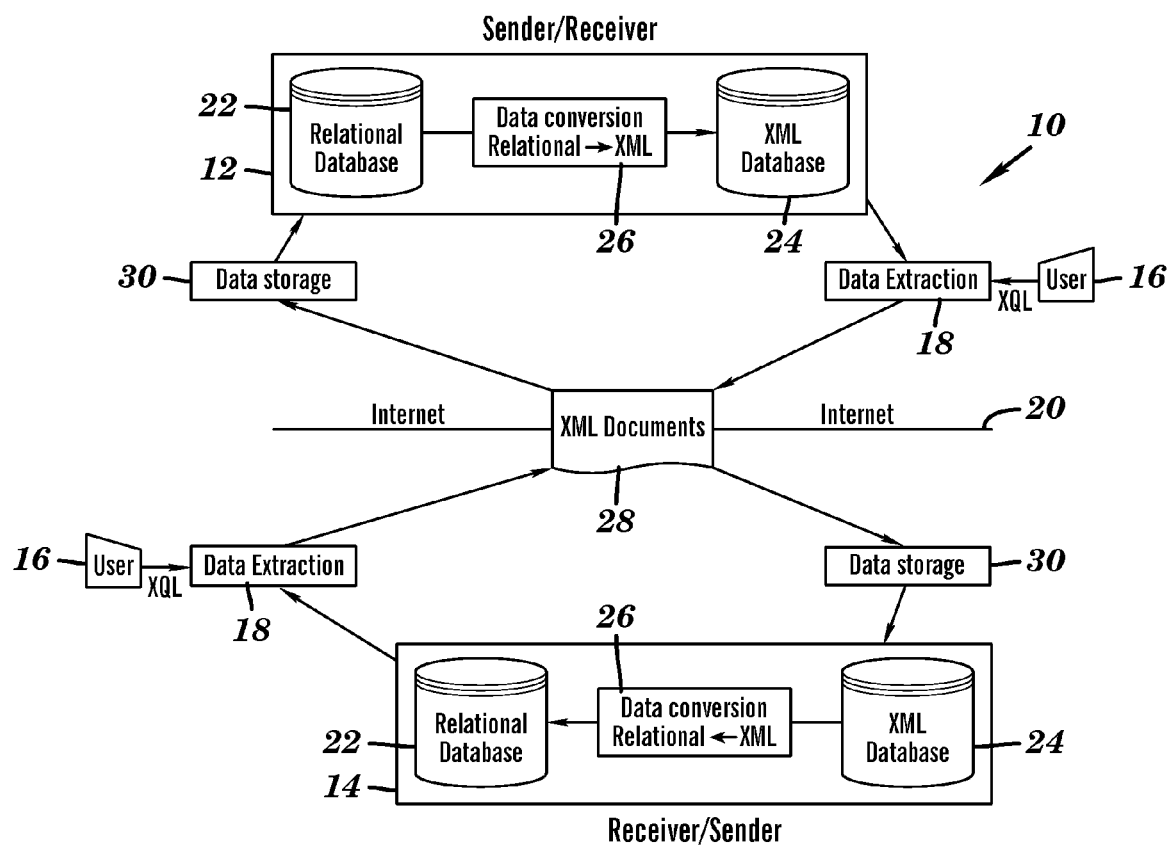
FIG. 2b is a schematic representation of an architecture of schema and data conversion between relational and XML databases according to an embodiment of the invention.

FIG. 2b is a block schematic of the architecture 10 of a conversion system according to a preferred embodiment of the invention for translating between relational and XML databases, when transmitting and receiving data, for example, over the Internet.

The architecture 10 comprises a Sender/Receiver station and a Receiver/Sender station. Each station comprises a user interface 16 coupled to a data extraction stage 18, each data extraction stage 18 also being coupled to a respective database system 12, 14 and the Internet 20. Each database system 12, 14 contains a relational database 22 for local use, an XML database 24 for transmitting and receiving data and a data conversion stage 26 for converting the format and data between the two databases.

At the sending station, which comprises the database 12, data stored in the relational database 22 may be converted by the data conversion stage 26 to XML format and stored in the XML database 24 prior to transmission over the Internet 20 as an XML document 28. The data to be transmitted is extracted by the data extraction stage 18 under instruction from the user interface 16 associated with the sending station.

At the receiving station which comprises the database 14, the received XML document 28 is stored in the XML database 24 by a data storage stage 30 coupled to the Internet 20 and the database system 14. The stored document is then converted by the data conversion stage 26 to relational format and stored in the relational database 22, from which it may be accessed via the associated data extraction stage 18 by the user interface 16 for local use.

XML data received by the sender station from the Internet 20 may be processed in a similar manner to that described above. An XML document received from the Internet 20 is stored in the database system 12 by a further data storage stage 30.

A benefit of one or more preferred embodiments of the invention is that XML documents may be made compatible with the relational database and vice versa. A pair of information capacity equivalent relational and XML databases may be created for rapid and user friendly computing on the Internet.

According to a preferred embodiment of the invention, in replicating a relational database into an XML database, relational data may be copied into the XML document by transforming the topology data structure of relational tables into the hierarchical data structure of XML documents. As an example, a view of the relational database may be selected with a root relation and transformed into four topological XML documents according to their data semantics for transmission. One benefit of using an XML document as an intermediate data exchange on the Internet is to enable different receivers to expect a standard document on the Internet which can be mapped into their own relational database for processing.

Figure 2C:
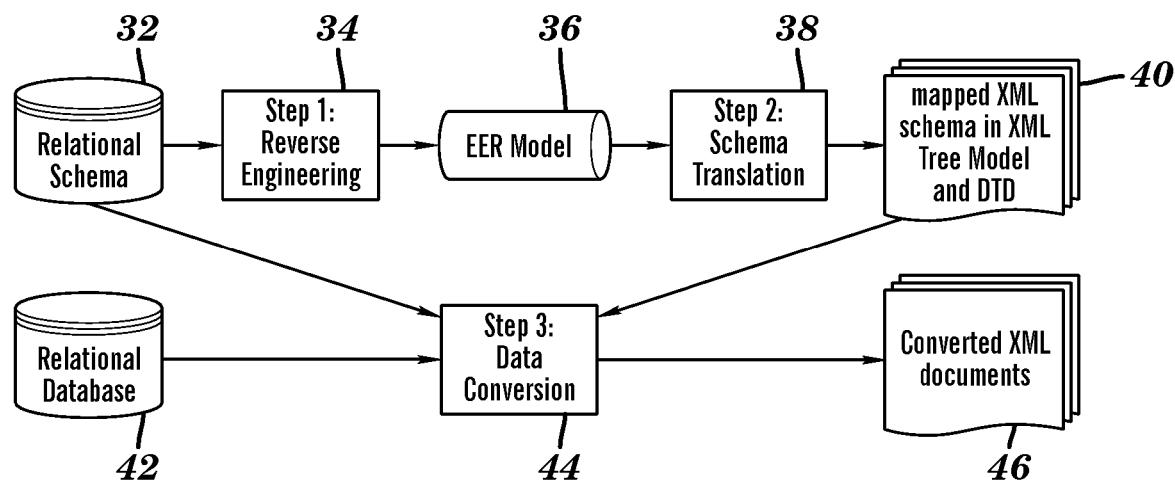
FIG. 2c is a schematic representation of an architecture of re-engineering a relational database into XML documents according to an embodiment of the invention.

FIG. 2c is a schematic representation of an architecture of re-engineering a relational database into XML documents according to a preferred embodiment of the invention. In this embodiment, a relational database has an associated relational schema 32 and the relational schema 32 is reverse-engineered in a stage 34 into an EER model 36. Through a schema translation stage 38, the relational schema may then be made compatible with XML schema, based on each constraint in the relational schema by mapping the relational schema with its semantic constraints into a DTD and a XML Tree Model in a further stage 40.

After schema translation 38, relational data from the relational database 42 may be converted in a data conversion stage 44 into XML documents 46 by loading the relational data into XML documents under the control of the relational schema 32 and the XML schema created in the stage 40. Tuples of relational tables are loaded into the object instances of elements in the XML documents according to their constraints. By following a stepwise procedure as shown in FIG. 2c, a relational schema may be translated into an XML schema based on a selected root element, and then relational data may be loaded into an XML document.

The procedure for conversion between a relational database and the corresponding XML database and vice versa as shown in FIG. 2c may be divided into four basic steps:
Step 1: Reverse engineer relational and XML logical schema into an EER model and a XML Tree Model.
Step 2: Perform schema translation from relational to XML and vice versa by carrying out the following sub-steps:
   (1) Defining a root element
   (2) Mapping weak entity between relational and XML databases
   (3) Mapping participation between relational and XML document
   (4) Mapping cardinality between relational and XML databases
   (5) Mapping aggregation between relational and XML databases
   (6) Mapping is a relationship between relational and XML databases
   (7) Mapping generalisation between relational and XML database
   (8) Mapping categorisation between relational and XML databases
   (9) Mapping n-ary relationship between relational and XML databases
Step 3: Perform Data Conversion from Relational Database into XML Documents by Carrying Out the Following Sub-Steps:
   (1) Converting relations into a DOM or JDOM (Java Document Object Model)
   (2) Integrating XML documents using JDOM
   (3) Manipulating XML documents using JDOM
Step 4: Perform Conversion from XML Database Into Relational Database The above steps will now be described in more detail with reference to the figures.
Step 1: Reverse Engineer Relational and XML Logical Schema into an EER Model To reverse-engineer relational and XML logical schema into an EER model, a relational classification table (see for example Table 1 below) may be used to define the relationship between keys and attributes in all relations, and data semantics may be recovered in the form of an EER model.

TABLE 1

| Classification | Description |
|---|---|
| PR1 | Primary relation describes entities. Primary relation Type 1 is a relation whose primary key does not contain a key of another relation. |
| PR2 | Primary relation Type 2 is a relation whose primary key does contain a key of another relation. |
| SR1 | Second relation has primary key which is fully or partially formed by concatenation of primary keys of other relations. Secondary relation Type 1 has the key of the secondary relation formed fully by concatenation of primary keys of primary relations. |
| SR2 | Secondary relation Type 2 is a relation of secondary relations that are not of Type 1. |
| KAP | Key Attribute Primary is an attribute in the primary key of a secondary relation that is also a key of some primary relation. |
| KAG | Key Attribute General are all the other primary key attributes in a secondary relation that are not of the KAP type. |
| FKA | Foreign Key Attribute is a non-primary key attribute of a primary relation that is a foreign key. |
| NKA | Nonkey Attributes are the rest of the non-primary key attributes. |

An XML classification table (see for example Table 2 below) may be used to define the association among elements.

TABLE 2

| Root Element | Group element | Element Name | Sub-element |
|---|---|---|---|
| Highest level element node in | Group element node on top of (component) | Unique for storing the name of element | Element under another element in |

TABLE 2-continued

| XML document | elements | declaration | the XML tree structure |
|---|---|---|---|
| Attribute Name | Occurrence Indicator | ID | IDREF |
| Multi-value for storing the names of attribute declaration | control character of the data occurrences of element | an attribute with a unique address for reference | an attribute with a reference to the ID |

An example of an algorithm which may be used to map relations into topological XML documents is set out below.

Algorithm:
Begin
Map relational schema into a classification table of relations;
Recover data dependency of relations from the classification table into an EER model;
For each relation of relational database do
Case recovered data dependency is:
(1) functional dependency: translate relations into a single sub-element topological XML document;
(2) multi-valued dependency: translate relations into a multiple sub-element topological XML document;
(3) join dependency: translate relations into a group element topological XML document;
(4) m:n cardinality: translate relations into a referred element topological XML document;
Case End;
For end;
End;

For the purposes of this specification the notations of data constraints referred to may be defined as follows:

Functional dependency: A functional dependency is a statement of the form X→Y, where X and Y are sets of attributes. The FD: X→Y holds for relation R if whenever s and t are tuples of R where s[X]=t[X], then s[Y]=t[Y].

Multi-valued dependency: Let R be a relation, and let X, Y, and Z be attributes of R. Then Y is multi-dependent on X in MVD: X→→YIZ if and only if the set of Y-values matching a given (X-value, Z-value) pair in R depends only on the X-value and is independent of the Z-value.

Join dependency: Let R be a relation, and let A, B, ..., Z be arbitrary subsets of the set of attributes of R. Then JD ▷ ◁{A, ... Z} is said to hold for a relation R if R=▷ ◁ {R[A] ... R[Z]}. That is, JD* (A, ... Z) if and only if R is equal to the join of its projections on A, Z.

Transitive dependency: A functional dependency X→Y in a relation schema R is a transitive dependency if there is a set of attribute Z that is neither a candidate key nor a subset of any key of R, and both X→Z and Z→Y hold.

Partial dependency: A functional dependency X→Y is a partial dependency if some attribute A↓X can be removed from X and the dependency still hold.

In an EER model, it is possible to navigate from one entity to another entity in one-to-many cardinality in correspondence with an XML hierarchical containment tree model from parent element to child elements. Navigability specifies the feasibility of the traversal from an entity to its related entities. Relationship can be directional with navigability. Navigation is from parent element to child element, then from the children table of the previous relationship and so on.

In an EER model, a superclass entity data occurrence should include its subclass entity data occurrences. On the other hand, a subclass entity may have its own attributes. Thus, a superclass entity requested by the user should include its relevant subclass entity.

Step 2: Schema Translation from Relational to XML and Vice Versa

The conceptual and logical schema (data semantics) in the EER model may be mapped from relational to XML and vice versa according to their data dependencies constraints. These constraints can then be transformed into DTD as XML schema in the following manner:

Step 2.1 Define a Root Element

To select a root element, its relevant information must be put into an XML schema. Relevance is concerned with the entities that are related to an entity selected by the user for processing. The relevant classes include the selected entity and all its related entities that are navigable. Navigability specifies whether traversal from an entity to its related entity is possible.

To make relational schema compatible with the XML schema, based on each constraint in the relational schema, the relational schema with its semantic constraints are mapped in stage 40 of FIG. 2c into a DTD.

Given the DTD information of the XML to be stored, a structure may be created called the XML Tree Model that mirrors the structure of the DTD. Each node in the XML Tree model represents an XML element in a rectangle, an XML attribute in an oval, and an operator in a circle. These may be put together in a hierarchical containment under a root element node, with element nodes under a parent element node.

Furthermore, it is possible to link elements together with an Identifier (ID) and an Identifier Reference (IDREF). An element with an IDREF refers to an element with an ID. Each ID must have a unique address. Nodes can refer to each other by using the ID and IDREF.

Elements may cross-reference each other by ID and IDREF such that an element having an IDREF can refer to another element with the appropriate ID.

Thus, to draw an XML Tree Model, an element is selected as a root and then its relevant information is put into a document. The selection is usually driven by the nature of the data being handled and its perceived business application.

XML is in the form of a spool of text in a particular sequence and the sequence will affect the output statement and finally the whole database schema. An XML schema may be considered to consist of a root element and then each element is laid down one by one as branches and leaves in the schema. There is a top-down relationship of the element in an XML schema. Even the element's attributes are also ordered in the schema.

On the other hand, XML Tree Model node diagram uses a graphical interface. Each node in an XML Tree Model does not carry any ordering information. There is no explicit root-branch relationship between nodes in the XML Tree Model nodes diagram.

In order to solve the problem due to this structural difference, an arbitrary root element, a database object, has to be created in order to start the branching from root. Branching from this root element are the basic classes and various constraints included in the XML Tree Model specification. To prepare for the transformation, the non-ordered XML Tree Model node diagram must be replaced with a listing of all related components in the entity diagram. This process may be termed "Decomposition". With the component list, a process sequence may be drawn to transform each kind of XML Tree Model component into its XML correspondence of DTD.

Figure 3:
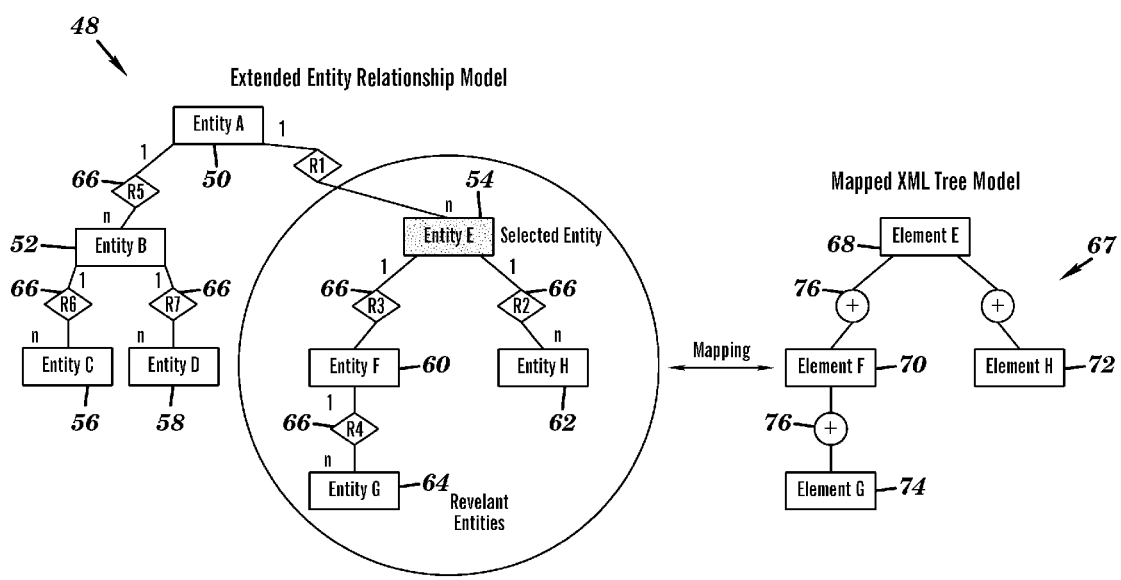
FIG. 3 is a schematic representation of a mapping of a selected Root Element and Relevant Entities of an Extended Entities Relationship model into a XML Tree Model according to an embodiment of the invention.

FIG. 3 illustrates the mapping of a selected root element and its relevant entities into a XML Tree Model according to a preferred embodiment of the present invention. An Extended Entity Relationship model 48 is composed of the superclass entity A 50 having subclass entities B 52 and E 54. Subclass entity B 52 has related entities C 56 and D 58 and subclass entity E 54 has relevant entities F 60 and H 62. Entity F 60 has a relevant entity G 64. Entities F 60, G 64 and H 62 are relevant entities as they are navigable from entity E 54. The relationship 66 between each entity A to G is denoted by the diamond-shaped boxes R1, . . . , R7 The relationships may be directional with navigability. Unidirectional means only one relationship end is navigable and bi-directional means both relationship ends are navigable.

Entity E 54 is selected for mapping and, in the XML Tree Model 67, becomes the Root Element E 68. Entities F 60 and H 62 become the sub-elements F 70 and H 72 respectively, entity G 64 becoming sub-element G 74. The operators 76 indicate that each sub-element occurs at least once. The navigable entities in the EER Model are mapped as sub elements under root elements in a hierarchy structure. All elements are declared as EMPTY in this situation. Each attribute of the relevant entity is mapped into the attribute of the corresponding element.

The mapping procedure may operate both ways and may be used to map from the XML Tree Model into the EER Model.

Step 2.2: Mapping Weak Entity Between Relational and XML Databases

A weak entity depends on its strong entity in that the primary key of the weak entity is also a foreign key referring to the primary key of its strong entity. In DTD, a strong entity may be transformed into an element with ID and a weak entity into another element which refers to the "ID" element using IDREF as shown in FIGS. 4a and 4b.

Figure 4A:
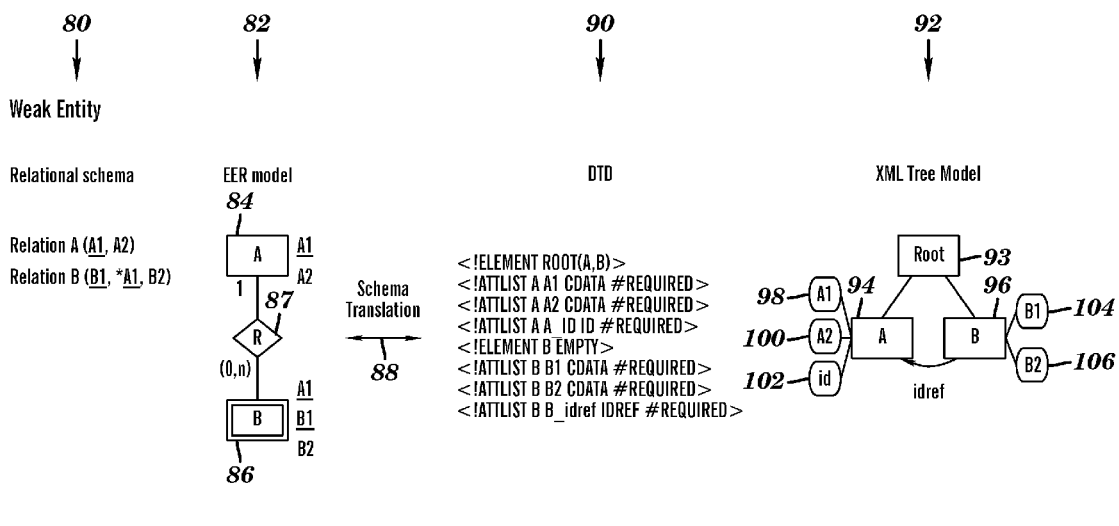
FIG. 4a is a schematic representation of a mapping of a translation between the relational schema and a XML Tree Model of a weak entity according to an embodiment of the invention.

FIGS. 4a and b illustrate the mapping of a weak entity between the relational and XML databases. In FIG. 4a, the relational schema 80 comprises the strong relation A and the weak relation B. In the corresponding EER model 82, relation A becomes entity A 84 and relation B becomes entity B 86. The Schema Translation 88 translates the EER model into the Document Type Definition 90 from which the XML Tree Model 92 may be obtained. In the XML Tree Model, the entity A 84 becomes the sub-element A 94 and the entity B 86 becomes the sub-element B 96, both sub-elements being dependent on the root element 93. Sub-element A 94 has attributes A1 98 from the subclass entity A1, A2 100 from the subclass entity A2 and an identity id 102. Sub-element B 96 has attributes B1 104 from the subclass entity B1 and B2 106 from the subclass entity B2. Sub-element B 96 refers to sub-element A 94 through idref. The procedure is reversible and the relational schema may be obtained from the XML Tree Model.

Figure 4B:
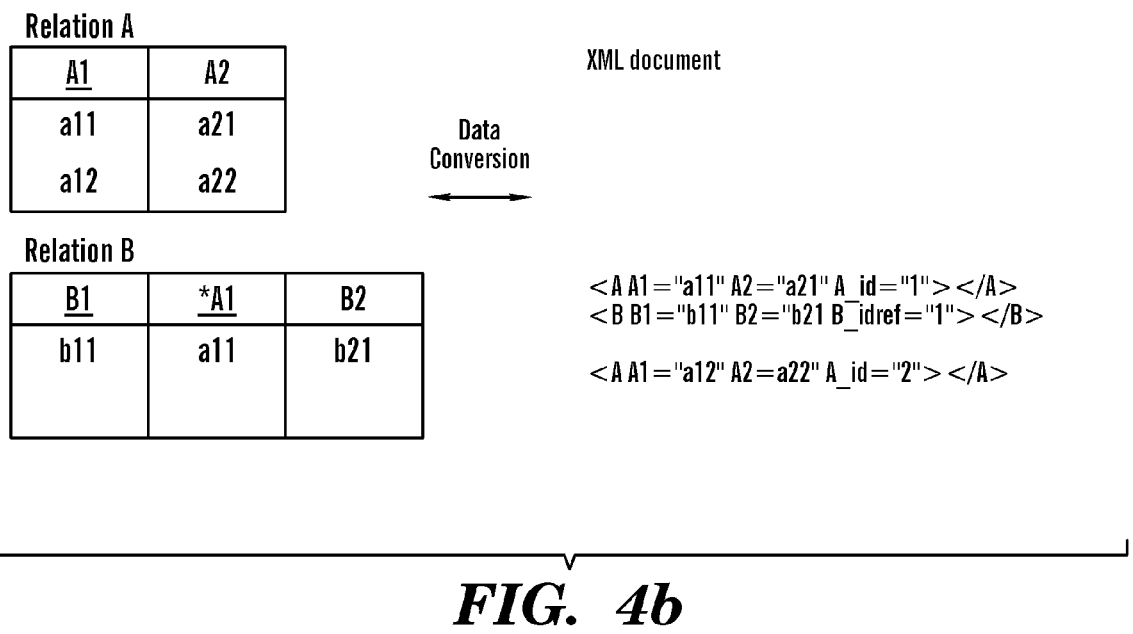
FIG. 4b is a schematic representation of a mapping of a conversion between the relational data and the XML document of a weak entity according to an embodiment of the invention.

FIG. 4b illustrates the mapping of the data in a weak entity between the relational database and the XML document. Data from the relational database is converted through the data conversion process into an XML document. The procedure is reversible and data may be converted from the XML document into the relational database.

The existence dependency constraints may be preserved in the translated XML schema as shown below:

| | Relational schema | Translated XML schema in DTD |
| --- | --- | --- |
| Functional dependency | B.A1 → A.A1 | Instance (B) → Instance (A) |

An example of algorithms for schema translation between the relational and XML in FIGS. 4a and 4b are:

| Relational → XML DTD | XML DTD → Relational |
| --- | --- |
| Begin<br>If ∃PR2 and KAG then ∃ weak entity;<br>Parent relation A.A1, A.A2 → sibling element A.A1, A.A2;<br>Child relation B.B1, B.B2 → Sibling Element B.B1, B.B2;<br>End; | Begin<br>If ∃a sibling element refers other sibling element then ∃weak entity;<br>Sibling element A.A1, A.A2 → Parent relation A.A1, A.A2;<br>Sibling element B.idref → child relation B.A1;<br>Sibling element B.B1, B.B2 → child relation B.B1, B.B2;<br>End; |

Step 2.3: Mapping Participation Between Relational and XML Document

A child table is in total participation with a parent table in that all data occurrences of the child table must participate in a relationship with the parent table. A foreign key of a child table in total participation must refer to the primary key of its parent table. A child table is in partial participation with a parent table in that a foreign key of a child table in partial participation can be a null value.

In preferred embodiments of the present invention, the functional dependency of relational schema may be preserved in the XML schema where a foreign key determines a referred primary key and an instance of a child element determines a data occurrence of a parent element as shown below in Table 3:

TABLE 3

| | Relational schema | Translated XML schema in DTD |
| --- | --- | --- |
| Functional dependency | B.A1 → A.A1 | Instance (B) → Instance (A) |

Figure 5A:
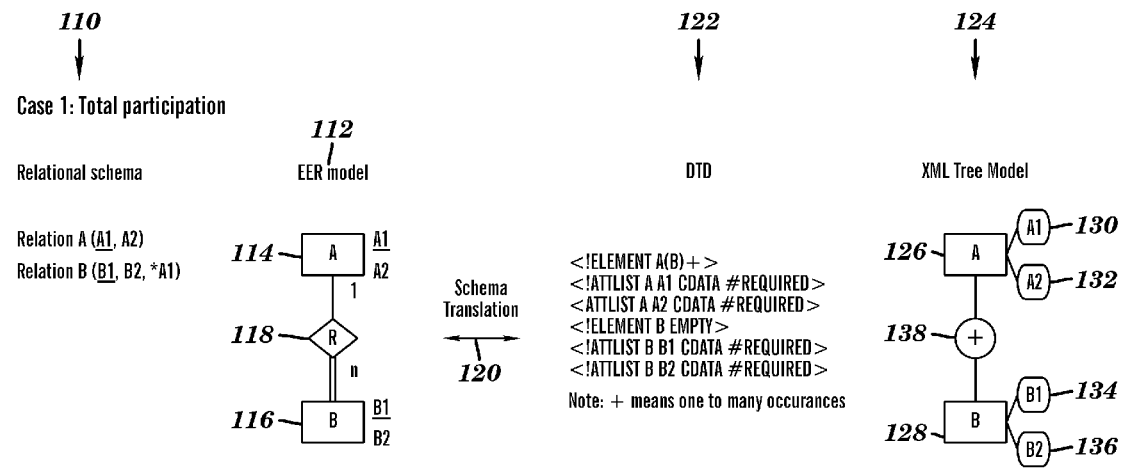
FIG. 5a is a schematic representation of a participation mapping of a translation between relational schema and a XML Tree Model in the case of total participation according to an embodiment of the invention for a single sub-element topological XML document.

In DTD, the total participation may be translated into a mandatory occurrence and a partial participation into an optional occurrence as shown in FIGS. 5a to 5f which illustrate the mapping of the participation of a child table with a parent table between the relational database and the XML document according to a preferred embodiment of the invention. FIG. 5a illustrates the translation of the schema between the relational schema and the XML Tree Model for a total participation relationship. The relational schema 110 comprises the Relation A and Relation B. In the corresponding EER model 112, relation A becomes entity A 114 and relation B becomes entity B 116. The entity A 114 is in a relationship R 118 with the entity B 116, with more than one occurrence of entity B 116. The Schema Translation 120 translates the EER model 112 into the Document Type Definition 122 from which the XML Tree Model 124 may be obtained. In the XML Tree Model, the entity A 114 becomes the element A 126 and the entity B 116 becomes the sub-element B 128. Element A 126 has attributes A1 130 from the subclass entity A1 and A2 132 from the subclass entity A2. The sub-element B 128 has attributes B1 134 from the subclass entity B1 and B2 136 from the subclass entity B2. The procedure is reversible and the relational schema may be obtained from the XML Tree Model.

Figure 5B:
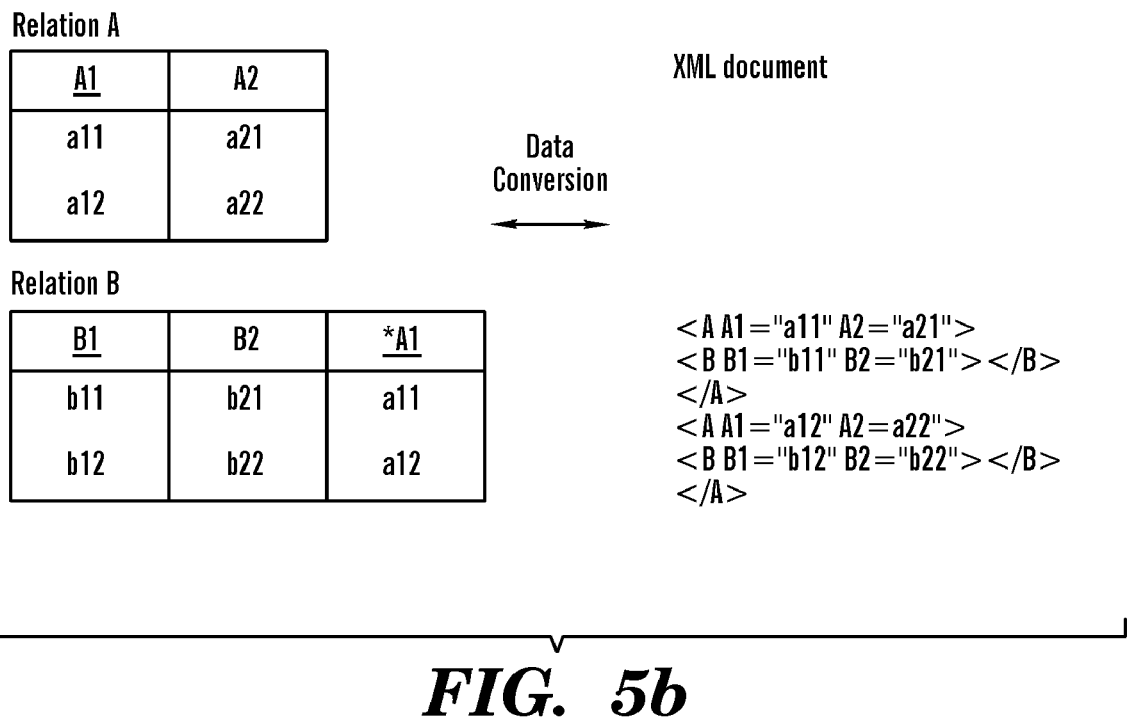
FIG. 5b is a schematic representation of a participation mapping of a conversion between relational data and an XML document in the case of total participation according to an embodiment of the invention for a single sub-element topological XML document.

FIG. 5b illustrates the mapping of the data in a total participation relationship between the relational database and the XML document according to a preferred embodiment of the invention. Data from the relational database is converted through the data conversion process into an XML document. The procedure is reversible and data may be converted from the XML document into the relational database.

FIGS. 5a and 5b show the transformation of relations with recovered functional dependency into a single sub-element topological XML document. In these figures, a receiver's relations A (A1, A2) and B (B1, B2, *A1) with FD (functional dependency) $\overline{A.A1} \rightarrow A.A1$, are classified and joined into a relation R(A1, A2, B1, B2) which is then translated into a single sub-element topological XML document by mapping parent relation A into element A, and child relation B into sub-element B.

Figure 5C:
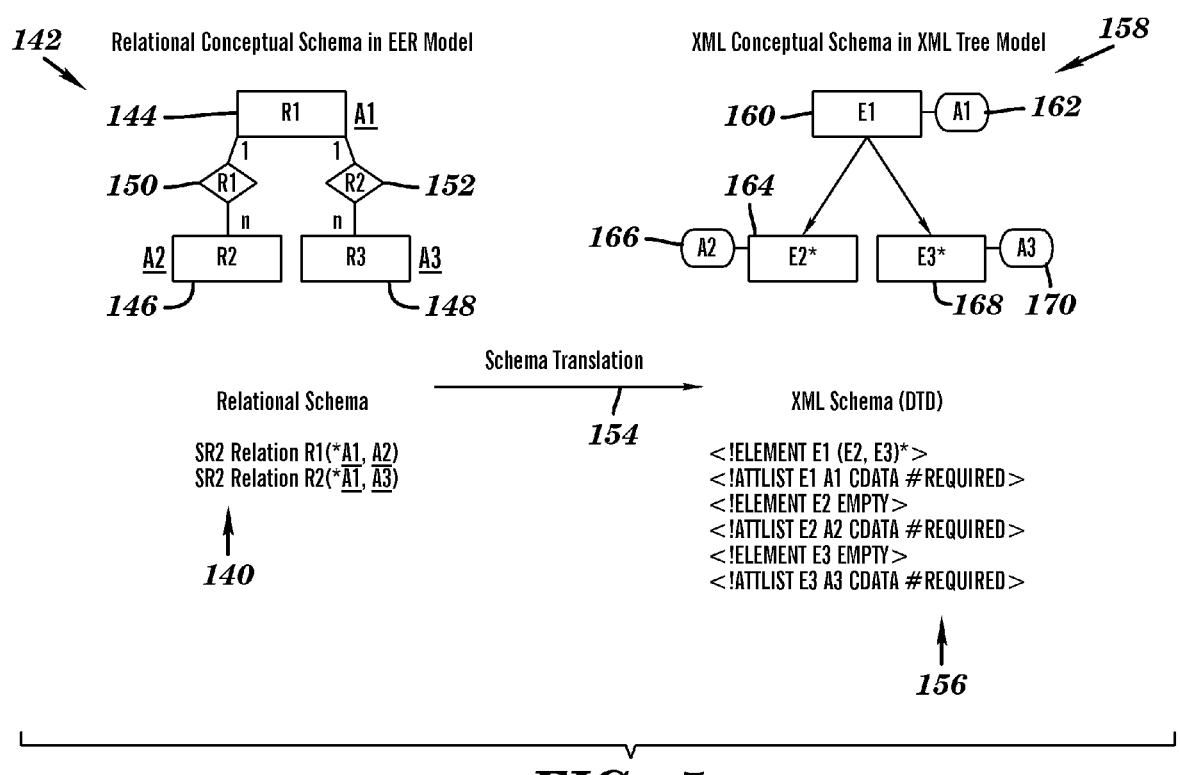
FIG. 5c is a schematic representation of a participation mapping of a translation between relational schema and a XML Tree Model in the case of total participation according to an embodiment of the invention for a multiple sub-element topological XML document.
Figure 5D:
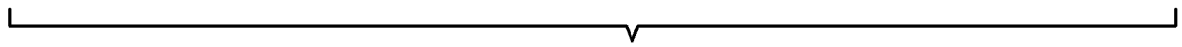
FIG. 5d is a schematic representation of a participation mapping of a conversion between relational data and an XML document in the case of total participation according to an embodiment of the invention for a multiple sub-element topological XML document.

FIGS. 5c and 5d show the transformation of relations with recovered multi-valued dependency into a multiple sub-elements topological XML document. In these figures, a receiver's relations Relation R1 (*A1, A2) and R2 (*A1, A3) with MVD (multiple value dependency) $A1 \rightarrow\rightarrow A2|A3$, can be classified and joined into a relation R(R1, R2, R3) which is then translated into a multiple sub-element topological XML document by mapping A1 into element E1 and A2 and A3 into sub-elements E2 and E3.

FIG. 5c illustrates the translation of the schema between relational schema and a XML Tree Model for a further example of a total participation relationship. The relational schema 140 comprises Relation R1 and Relation R2. In the corresponding EER model 142, relation R1 becomes entity R1 144, relation R2 becomes entity R2 146 and entity R3 148. The entity R1 144 is in a relationship R1 150 with the entity R2 146, with more than one occurrence n of entity R2 146. The entity R1 144 is in a relationship R2 152 with the entity R3 148, with more than one occurrence n of entity R3 148. The Schema Translation 154 translates the EER model 142 into the Document Type Definition 156 from which the XML Tree Model 158 is obtained.

In the XML Tree Model 158, the entity R1 144 becomes the element E1 160 and has an attribute A1 162 from the subclass entity A1. The entity R2 146 becomes the sub-element E2* 164 having an attribute A2 166 from the subclass entity A2. The entity R3 148 becomes the sub-element E3* 168 having an attribute A3 170 from the subclass entity A3. The "*" operator identifies sub-elements that can occur from zero to n times under a parent element. The procedure is reversible and the relational schema may be obtained from the XML Tree Model.

FIG. 5d illustrates the mapping of the data in the above total participation relationship between the relational database and the XML document. Data from the relational database may be converted through the data conversion process into an XML document. The procedure is reversible and data may be converted from the XML document into the relational database.

Figure 5E:
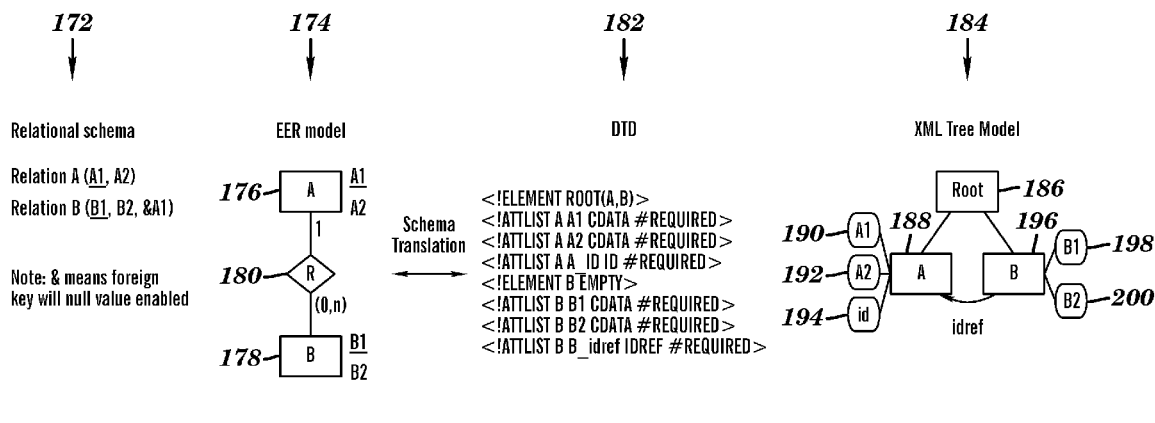
FIG. 5e is a schematic representation of a participation mapping of a translation between relational schema and a XML Tree Model in the case of partial participation according to an embodiment of the invention.

FIG. 5e illustrates the translation of schema between a relational schema and XML tree model for a partial participation relationship. The relational schema 172 comprises the Relation A and Relation B. In the corresponding EER model 174, relation A becomes entity A 176 and relation B becomes entity B 178. The entity A 176 is in a relationship R 180 with the entity B 178. The Schema Translation translates the EER model 174 into the Document Type Definition 182 from which the XML tree model 184 is obtained. In the XML tree model 184, there is a root element 186 and the entity A 176 becomes the sub-element A 188 and the entity B 178 becomes the sub-element B 196, both sub-elements being dependent on the root element 186. Sub-element A 188 has attributes A1 190 from the subclass entity A1, A2 192 from the subclass entity A2 and an identity id 194. The sub-element B 196 has attributes B1 198 from the subclass entity B1 and B2 200 from the subclass entity B2. The sub-element B 196 refers to the sub-element A 188 through idref. The procedure is reversible and the relational schema may be obtained from the XML tree.

Figure 5F:
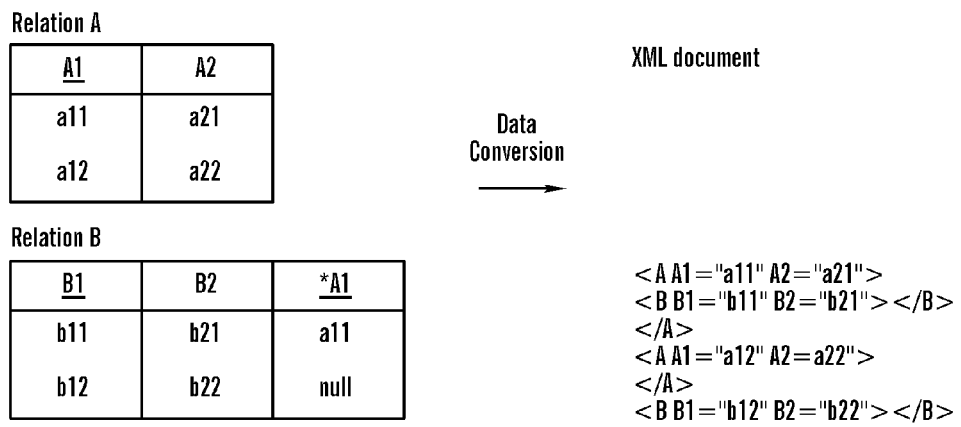
FIG. 5f is a schematic representation of a participation mapping of a conversion between relational data and an XML document in the case of partial participation according to an embodiment of the invention.

FIG. 5f illustrates the mapping of the data in a partial participation relationship between the relational database and the XML document. Data from the relational database is converted through the data conversion process into an XML document. The procedure is reversible and data may be converted from the XML document into the relational database. Examples of preferred algorithms of schema translation between relational and XML for use in the methods illustrated in FIGS. 5a to 5f are set out in Table 4:

TABLE 4

| Relational → XML DTD | XML DTD → Relational |
|---|---|
| Begin | Begin |
| If ∃FKA without null value | If ∃parent element with "+" occurrence indicator |
| Then ∃total participation exists | |
| If total participation | Then ∃total participation |
| Then begin | If total participation |
| Parent relation A.A1, A.A2 → parent element A.A1, A.A2; | Then begin |
| | Parent element A.A1, A.A2 → parent relation |
| Child relation B.B1, B.B2 → child element B.B1, B.B2; | A.A1, A.A2; |
| End; | Child element B.B1, B.B2 → child relation B.B1, B.B2; |
| FKA with null value → Partial participation; | |
| If partial participation | Child element B.idref → child relation B.A1; |
| Then begin | End; |
| Parent relation A.A1, A.A2 → sibling element A.A1, A.A2, A.id; | If ∃a sibling element refers to a sibling element |
| Child relation B.B1, B.B2 → sibling element B.B1, B.B2; B.idref referring to A.id; | Then ∃partial participation |
| End; | If partial participation |
| End; | Then begin |
| | Sibling element A.A1, A.A2 → parent |

TABLE 4-continued

| Relational → XML DTD | XML DTD → Relational |
|---|---|
| | relation<br>A.A1, A.A2;<br>Sibling element B.B1, B.B2 → child relation<br>B.B1, B.B2;<br>Sibling element B.idref → child relation B.A1;<br>End<br>End |

Step 2.4: Mapping Cardinality Between Relational and XML Databases

One-to-one cardinality indicates that a foreign key of a child table refers to a primary key of a parent table in one to one occurrence. One-to-many cardinality indicates that a primary key of a parent table is referred by many foreign keys of a child table in one to many occurrences. Many-to-many cardinality indicates that a primary key of a parent table is referred by many foreign keys of a child table and vice versa.

FIGS. 6a to 6f illustrate the mapping of cardinality according to a preferred embodiment of the invention between relational and XML databases for the three conditions of one-to-one, one-to-many and many-to-many cardinality.

Figure 6A:
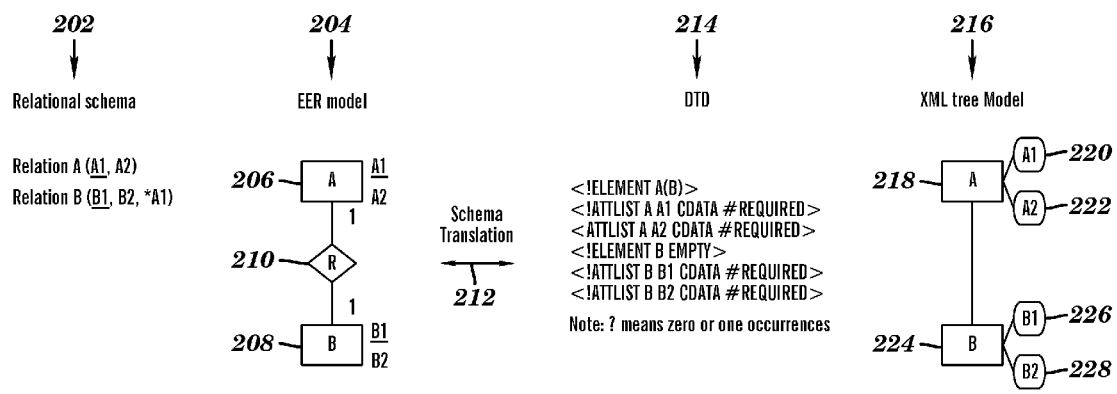
FIG. 6a is a schematic representation of a cardinality mapping in a translation between relational schema and an XML tree model for the case of one-to-one cardinality according to an embodiment of the invention.

FIG. 6a illustrates the translation of the schema between the relational schema and the XML tree model for the case of one-to-one cardinality. The relational schema 202 comprises the Relation A and Relation B. In the corresponding EER model 204, relation A becomes entity A 206 and relation B becomes entity B 208. The entity A 206 is in a relationship R 210 with the entity B 208. The Schema Translation 212 translates the EER model 204 into the Document Type Definition 214 from which the XML tree model 216 is obtained. In the XML tree model 216, the entity A 206 becomes the element A 218 and the entity B 208 becomes the element B 224, in this case, element B 224 only occurs once. Element A 218 has attributes A1 220 from the subclass entity A1 and A2 222 from the subclass entity A2. The element B 224 has attributes B1 226 from the subclass entity B1 and B2 228 from the subclass entity B2. The procedure is reversible and the relational schema may be obtained from the XML tree.

FIG. 6b illustrates the mapping of the data in the between the relational database and the XML document in the case of one-to-one cardinality. Data from the relational database is converted through the data conversion process into an XML document. The procedure is reversible and data may be converted from the XML document into the relational database.

Figure 6C:
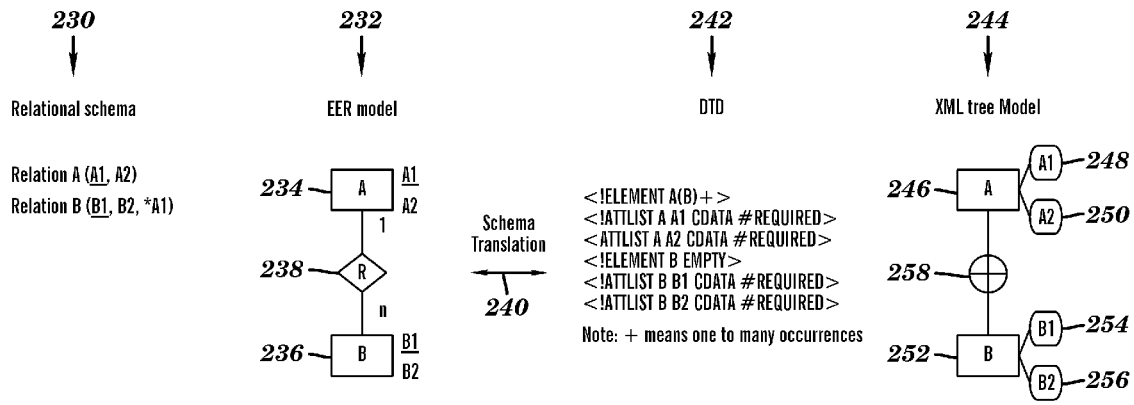
FIG. 6c is a schematic representation of a cardinality mapping in a translation between relational schema and an XML tree model for the case of one-to-many cardinality according to an embodiment of the invention.

FIG. 6c illustrates the translation of the schema between the relational schema and the XML tree model for the case of one-to-many cardinality. The relational schema 230 comprises the Relation A and Relation B. In the corresponding EER model 232, relation A becomes entity A 234 and relation B becomes entity B 236. The entity A 234 is in a relationship R 238 with the entity B 236. The Schema Translation 240 translates the EER model 232 into the Document Type Definition 242 from which the XML tree model 244 is obtained. In the XML tree model 244, the entity A 234 becomes the element A 246 and the entity B 236 becomes the element B 252, in this case, element B 252 occurs more than once. Element A 246 has attributes A1 248 from the subclass entity A1 and A2 250 from the subclass entity A2. The element B 252 has attributes B1 254 from the subclass entity B1 and B2 256 from the subclass entity B2. The procedure is reversible and the relational schema may be obtained from the XML tree.

FIG. 6d illustrates the mapping of the data in the between the relational database and the XML document in the case of one-to-many cardinality. Data from the relational database is converted through the data conversion process into an XML document. The procedure is reversible and data may be converted from the XML document into the relational database.

Figure 6E:
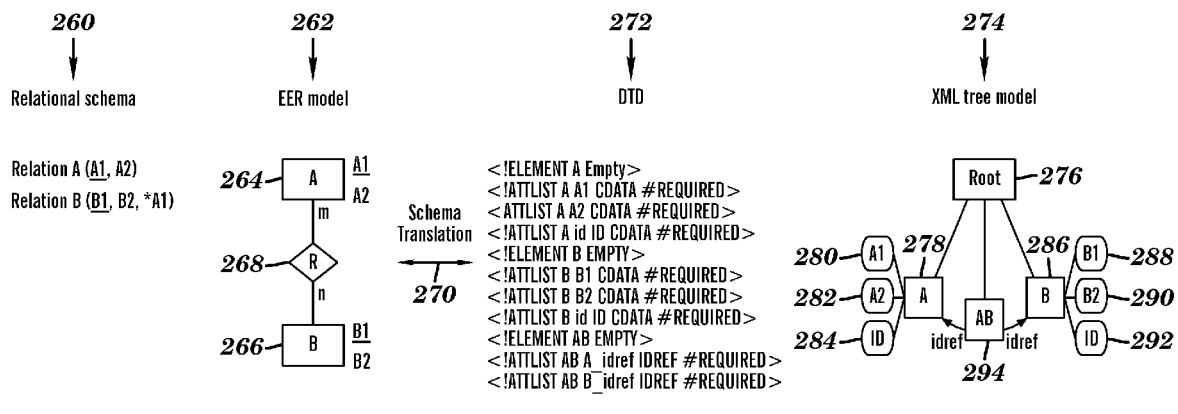
FIG. 6e is a schematic representation of a cardinality mapping in a translation between relational schema and an XML tree model for the case of many-to-many cardinality according to an embodiment of the invention.

FIG. 6e illustrates the translation of the schema between the relational schema and the XML tree model for the case of many-to-many cardinality. The relational schema 260 comprises the Relation A and Relation B. In the corresponding EER model 262, relation A becomes entity A 264 and relation B becomes entity B 266. The entity A 264 is in a relationship R 268 with the entity B 266. The Schema Translation 270 translates the EER model 262 into the Document Type Definition 272 from which the XML tree model 274 is obtained. In the XML tree model 274, the entity A 264 becomes the sub-element A 278 and the entity B 266 becomes the sub-element B 286, a further sub-element AB 294 is formed and in this case, both sub-elements A 278 and B 286 occur more than once. All the sub-elements are dependent on the root element 276 and sub-element AB 294 refers to the other sub-elements through idref. Sub-element A 278 has attributes A1 280 from the subclass entity A1, A2 282 from the subclass entity A2 and an identity ID 284. The sub-element B 286 has attributes B1 288 from the subclass entity B1, B2 290 from the subclass entity B2 and an identity ID 292. The procedure is reversible and the relational schema may be obtained from the XML tree.

Figure 6F:
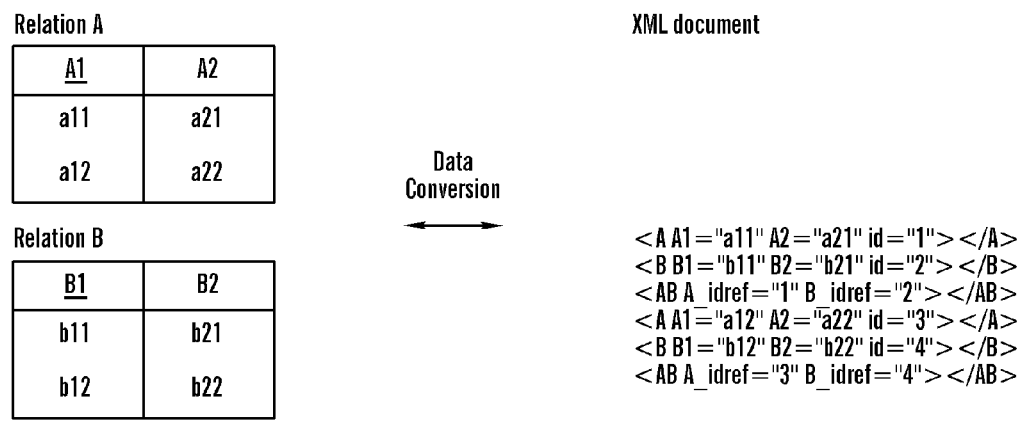
FIG. 6f is a schematic representation of a cardinality mapping in a conversion between relational data and an XML document for the case of many-to-many cardinality according to an embodiment of the invention.

FIG. 6f illustrates the mapping of the data in the between the relational database and the XML document in the case of many-to-many cardinality. Data from the relational database is converted through the data conversion process into an XML document. The procedure is reversible and data may be converted from the XML document into the relational database.

FIGS. 6e and 6f show the transformation of relations with recovered m:n cardinality into a referral topology XML document. In these figures, a receiver's relations R1(A1, A3), R2(A2, A4) and R3(*A1, *A2) with R1(A1, A3)→R2(A2, A4) can be classified and joined into a relation R(A1, A2, A3, A4) which may then be translated into a referral topological XML document by mapping A1 into attribute "id" of element E1, and A2 into attribute "idref" of element E2.

Table 5 below illustrates that the functional dependency and multi-valued dependency of relational schema are preserved in the translated XML schema used in the three above-described cases of cardinality as shown in FIGS. 6a to 6f.

TABLE 5

| Figure | Data Dependency | Relational schema | Translated XML in DTD |
|---|---|---|---|
| FIGS. 6a to 6d | Functional Dependency | B.A1 → A.A1 | Instance (B) → Instance (A) |

TABLE 5-continued

| Figure | Data Dependency | Relational schema | Translated XML in DTD |
|---|---|---|---|
| FIGS. 6e and 6f | Multi-valued dependency | A.A1 → → AB.A1<br>B.B1 → → AB.B1 | Instance (A) → →<br>Instance (AB)<br>Instance (B) → →<br>Instance (AB) |

Examples of preferred algorithms of schema translation between relational and XML for use in the methods illustrated in FIGS. 6a to 5f are set out in Table 6.

TABLE 6

| Relational → XML DTD | XML DTD → Relational |
|---|---|
| Begin<br>If ∃FKA then ∃1:1/1:n cardinality;<br>If ∃SR1 with KAPs then ∃m:n cardinality;<br>If 1:1/1:n cardinality<br>Then begin<br>Parent relation A.A1, A.A2 → parent element<br>A.A1, A.A2;<br>child relation B.B1, B.B2 → child element B.B1, B.B2;<br>End;<br>If m:n cardinality<br>Then begin<br>Relation A.A1, A.A2 → sibling element A.A1,<br>A.A2, A.id;<br>Relation B.B1, B.B2 → sibling element B.B1, B.B2; B.id;<br>Relationship relation AB.A1 → sibling element AB with idref referring A.id and B.id;<br>End | Begin<br>If ∃parent and child elements<br>Then ∃1:1 cardinality;<br>If ∃parent element with "+" occurrence indicator<br>Then ∃1:n cardinality;<br>If ∃a sibling element refers other sibling elements<br>Then ∃m:n cardinality;<br>If 1:1/1:n cardinality<br>Then begin<br>Parent element A.A1, A.A2 → parent relation<br>A.A1, A.A2;<br>Child element B.B1, B.B2 → child relation B.B1,<br>B.B2;<br>End;<br>If m:n cardinality<br>Then begin<br>Sibling element A.A1, A.A2 → relation A.A1,<br>A.A2:<br>Sibling element B.B1, B.B2 → relation B.B1,<br>B.B2;<br>Sibling element AB.A1, AB.B1 → relation AB.A1, AB.B1<br>End; |

Step 2.5: Mapping Aggregation Between Relational and XML Databases

An aggregation specifies a whole-part relationship within an aggregate such that an entity represents the whole of the aggregate and a constituent entity represents part of the aggregate. The aggregate may be taken as an entity which is mapped into an element. A DTD may be used to construct the part relationships in the element content.

Figure 7A:
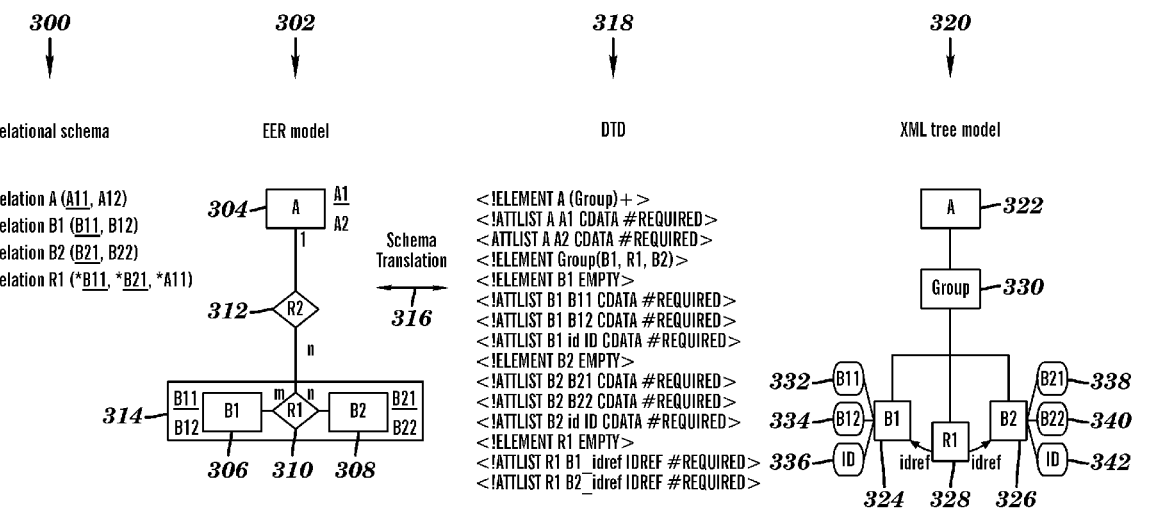
FIG. 7a is a schematic representation of a mapping of aggregation translation between relational schema and an XML tree model according to an embodiment of the invention.

FIGS. 7a and b illustrate the mapping of aggregation between the relational and XML databases according to a preferred embodiment of the invention. FIG. 7a illustrates the mapping of aggregation between the relational and XML databases. The relational schema 300 comprises the Relation A, Relation B1, Relation B2 and Relation R1. In the corresponding EER model 302, relation A becomes entity A 304, relation B1 becomes entity B1 306, relation B2 becomes entity B2 308 and relation R1 becomes entity R1 310. The entity A 304 is in a relationship R2 312 with the aggregate 314, comprising the entities R1 310, B1 306 and B2 308. The aggregate 314 occurs more than once. The Schema Translation 316 translates the EER model 302 into the Document Type Definition 318 from which the XML tree model 320 is obtained. In the XML tree model 320, the entity A 304 becomes the element A 322, the entity B1 306 becomes the element B1 324, the entity B2 308 becomes the element B2 326 and the relation R1 310 becomes the element R1 328. Element A 322 is linked to the group 330 comprising elements R1 328, B1 324 and B2 326. The element B1 324 has attributes B11 332 from the subclass entity B11, B12 334 from the subclass entity B12 and an identity ID 336. The element B2 326 has attributes B21 338 from the subclass entity B21, B22 340 from the subclass entity B22 and an identity ID 342. The element R1 328 refers to the elements B1 324 and B2 326 through idref. The procedure is reversible and the relational schema may be obtained from the XML tree model.

Figure 7B:
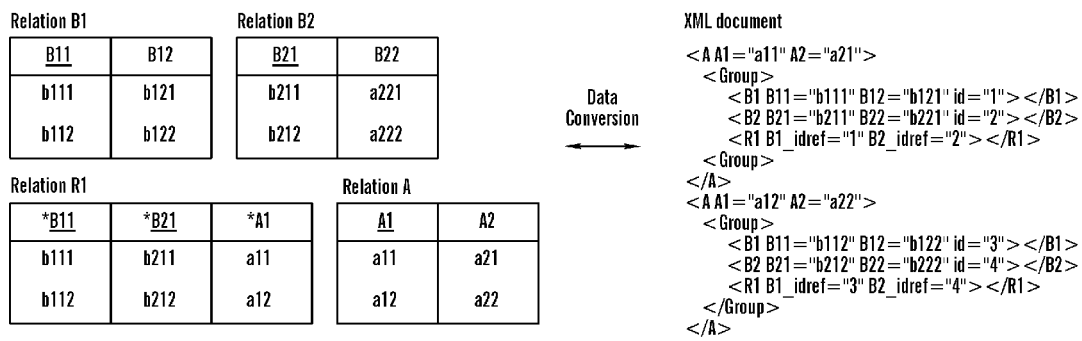
FIG. 7b is a schematic representation of a mapping of aggregation conversion between relational data and an XML document according to an embodiment of the invention.

FIG. 7b illustrates the mapping of the data in the between the relational database and the XML document for an aggregate. Data from the relational database is converted through the data conversion process into an XML document. The procedure is reversible and data may be converted from the XML document into the relational database. In the methods of FIGS. 7a and 7b, the functional dependency of relational schema may be preserved in the translated XML schema as shown below in Table 7.

TABLE 7

| | Relational schema | Translated XML schema in DTD |
|---|---|---|
| Functional dependency | R1.A1 → A.A1 | Instance (R1) → Instance (A) |

Examples of preferred algorithms of schema translation between relational and XML for use in the methods of FIGS. 7a and 7b are:

| Relational → XML DTD | XML DTD → Relational |
|---|---|
| Begin<br>If ∃ SR1 with FKA or KAP then ∃ aggregation: | Begin<br>If ∃ group element then ∃ aggregation; |

| Relational → XML DTD | XML DTD → Relational |
|---|---|
| If aggregation<br>Then begin<br>Component relation A.A1, A.A2 → component<br>Element A.A1, A.A2, A.id;<br>Component relation B.B1, B.B2 → component<br>Element B.B1, B.B2, B.id;<br>Component relation R1.A1, R1.B1 → component<br>Element R1 referring to sibling element A and B,<br>group element A;<br>end | If aggregation<br>Then begin<br>Component element A.A1, A.A2 → component<br>relation A.A1, A.A2;<br>component element B.B1, B.B2 → component<br>relation B.B1, B.B2;<br>component element R1.A1, R1.B1 → component<br>relationship relation R1.A1, R1.B1;<br>End; |

Step 2.6: Mapping is a Relationship Between Relational and XML Databases

The is a defines a relationship between a subclass entity and a superclass entity such that the data in the subclass must be included in the superclass. Also, the superclass and subclass must have the same domain value which is why they can be related in is a relationship.

Figure 8:
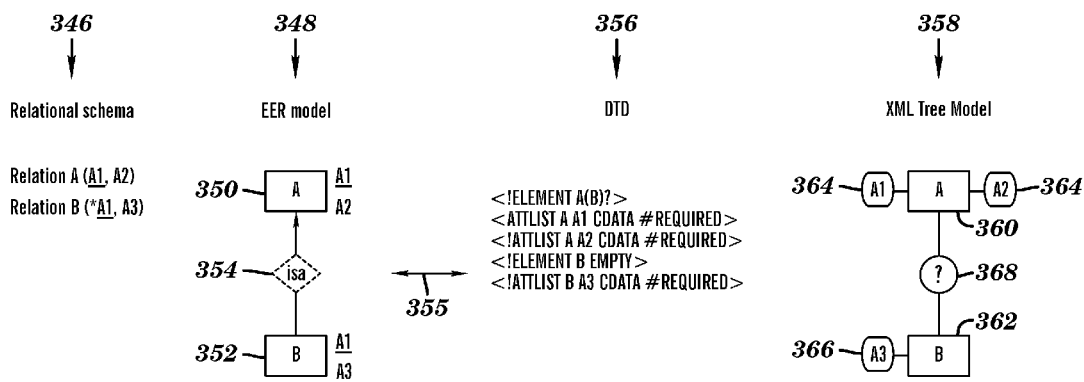
FIG. 8 is a schematic representation of a mapping of the is a relationship between relational schema and a XML Tree Model according to an embodiment of the invention.

In DTD, each subclass entity may be transformed as a child element which refers to its parent element such that each parent element can have zero to one child elements. FIG. 8 illustrates the mapping of an is a relationship between the relational and XML databases according to a preferred embodiment of the present invention. The relational schema 346 comprises the Relation A and Relation B. In the corresponding EER model 348, relation A becomes entity A 350 and relation B becomes entity B 352. The entity A 350 is in a relationship is a 354 with the entity B 352. The Schema Translation 355 translates the EER model 348 into the Document Type Definition 356 from which the XML Tree Model 358 is obtained. In the XML Tree Model, the entity A 350 becomes the element A 360 and the entity B 352 becomes the element B 362. Element A 360 has attributes A1 364 from the subclass entity A1 and A2 364 from the subclass entity A2. The element B 362 has an attribute A3 366 from the subclass entity A3. In the XML Tree Model, the relationship is a 354 becomes the operator 368.

The procedure is reversible and the relational schema may be obtained from the XML Tree Model.

In the methods of FIG. 8, the functional dependency constraints of relational schema may be preserved in the translated XML schema as shown below in Table 8.

TABLE 8

| | Relational schema | Translated XML schema in DTD |
|---|---|---|
| Functional dependency | B.A1 → A.A1 | Instance (B) → Instance (A) |

Examples of preferred algorithms of schema translation between relational and XML for use in the method of FIG. 8 are:

| Relational → XML DTD | XML DTD → Relational |
|---|---|
| Begin<br>If ∃ PR2 and KAP only then ∃ sa;<br>If isa<br>Then begin | Begin<br>If ∃ parent element and "?" occurrence indicator then ∃ isa;<br>If isa |

| Relational → XML DTD | XML DTD → Relational |
|---|---|
| Superclass relation A.A1, A.A2 → parent element A.A1, A.A2,"?" occurrence indicator;<br>Subclass relation B.A3 → child element B.A3;<br>End | Then begin<br>Parent element A.A1, A.A2 → parent relation A.A1, A.A2;<br>If ∃ child element occurrence then parent element A.A1 → child relation B.A1;<br>child element B.A3 → child relation B.A1, B.A3;<br>component element R1.A1, R1.B1 → component relationship relation R1.A1, R1.B1;<br>End |

Step 2.7: Mapping Generalisation Between Relational and XML Database

The generalisation defines a relationship between entities to build a taxonomy of classes: One entity is a more general description of a set of other entities. In DTD, the general superclass entity may be transformed into an element, the element type originating from the superclass.

FIGS. 9a to 9d illustrate the mapping of the generalisation between the relational and XML databases for both disjoint and overlapping generalisation according to a preferred embodiment of the present invention.

Figure 9A:
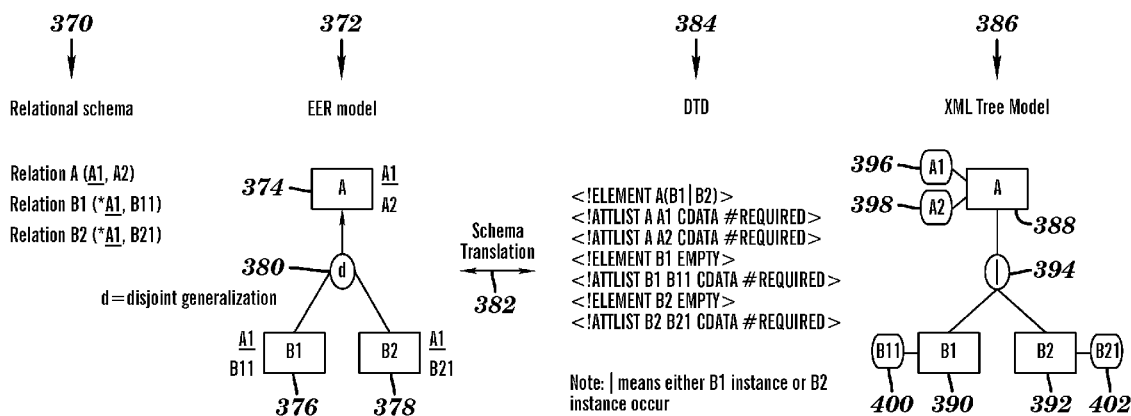
FIG. 9a is a schematic representation of a generalisation mapping of translation between relational schema and a XML Tree Model for the case of disjoint generalisation according to an embodiment of the invention.

FIG. 9a illustrates the translation of the schema between the relational schema and the XML Tree Model for a disjoint generalisation according to a preferred embodiment of the present invention. The relational schema 370 comprises the Relation A, the Relation B1 and the Relation B2. In the corresponding EER model 372, relation A becomes entity A 374, the relation B1 becomes the entity B1 376 and the relation B2 becomes entity B2 378. The entity A 374 is in a disjoint generalisation 380 with the entities B1 376 and B2 378. The Schema Translation 382 translates the EER model 372 into the Document Type Definition 384 from which the XML Tree Model 386 is obtained. In the XML Tree Model, the entity A 374 becomes the element A 388, the entity B1 376 becomes the element B1 390 and the entity B2 378 becomes the element B2 392. Element A 388 has attributes A1 396 from the subclass entity A1 and A2 398 from the subclass entity A2. The element B1 390 has an attribute B11 400 from the subclass entity B11 and the element B2 392 has an attribute B21 402 from the subclass entity B21. In the XML Tree Model, the element A 388 is in a generalisation relationship 394 with either B1 390 or B2 392. The procedure is reversible and the relational schema may be obtained from the XML Tree Model.

FIG. 9b illustrates the mapping of the data between the relational database and the XML document in a disjoint generalisation. Data from the relational database is converted through the data conversion process into an XML document. The procedure is reversible and data may be converted from the XML document into the relational database.

Figure 9C:
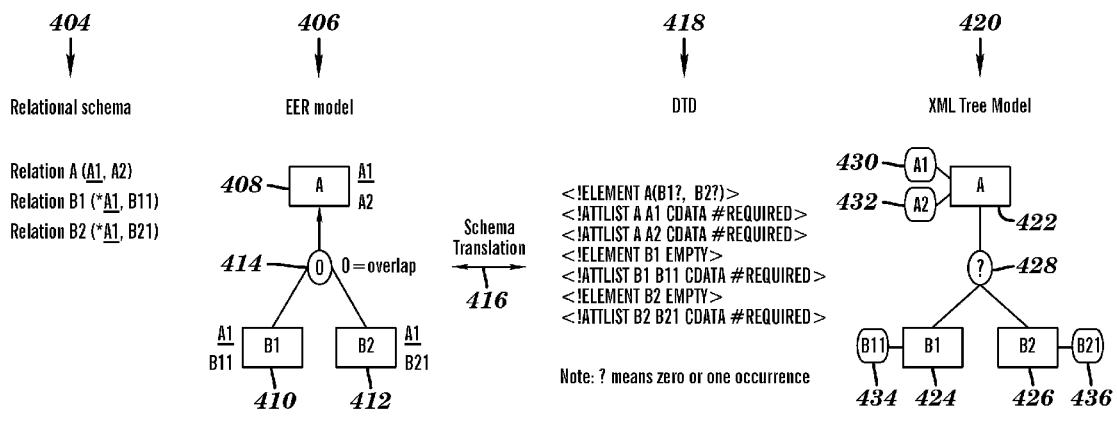
FIG. 9c is a schematic representation of a generalisation mapping of translation between relational schema and a XML Tree Model for the case of overlap generalisation according to an embodiment of the invention.

FIG. 9c illustrates the translation of schema between the relational schema and the XML Tree Model for an overlap generalisation according to a preferred embodiment of the present invention. The relational schema 404 comprises the Relation A, the Relation B1 and the Relation B2. In the corresponding EER model 406, relation A becomes entity A 408, the relation B1 becomes the entity B1 410 and the relation B2 becomes entity B2 412. The entity A408 is in an overlap generalisation 414 with the entities B1 410 and B2 412. The Schema Translation 416 translates the EER model 406 into the Document Type Definition 418 from which the XML Tree Model 420 is obtained. In the XML Tree Model 420, the entity A 408 becomes the element A 442, the entity B1 410 becomes the element B1 424 and the entity B2 412 becomes the element B2 426. Element A 422 has attributes A1 430 from the subclass entity A1 and A2 432 from the subclass entity A2. The element B1 424 has an attribute B11 434 from the subclass entity B11 and the element B2 426 has an attribute B21 436 from the subclass entity B2 1. In the XML Tree Model, the element A 422 is in a generalisation relationship 428 with either B1 424 or B2 426. The procedure is reversible and the relational schema may be obtained from the XML Tree Model.

FIG. 9d illustrates the mapping of the data between the relational database and the XML document in an overlap generalisation. Data from the relational database is converted through the data conversion process into an XML document. The procedure is reversible and data may be converted from the XML document into the relational database.

In the methods of FIGS. 9a to 9d, the functional dependency constraints of relational schema may be preserved in the translated XML schema as shown below in Table 9.

TABLE 9

| | Relational schema | Translated XML schema in DTD |
|---|---|---|
| Functional dependency | B1.A1 → A.A1<br>B2.A1 → A.A1 | Instance (B1) → Instance (A)<br>Instance (B2) → Instance (A) |

Examples of preferred algorithms of schema translation between relational and XML for use in the methods of FIGS. 9a to 9d are:

| Relational → XML DTD | XML DTD → Relational |
|---|---|
| Begin<br>If ∃ PR2s with same disjoint KAP<br>Then ∃disjoint generalisation among superclass<br>Relation (referred by) and subclass relations (referring to);<br>If ∃ PR2s with same overlap KAP<br>Then ∃ overlap generalisations among superclass<br>Relation (referred by) and subclass relations (referring to);<br>If disjoint generalisation<br>Then begin<br>Superclass relation A.A1, A.A2 → parent<br>Element A.A1, A.A2, "\|" occurrence indicator;<br>Subclass relation B.B11 → child element B.B11;<br>end;<br>If overlap generalisation<br>Then begin<br>Superclass relation A.A1, A.A2 → parent<br>Element A.A1, A.A2, "?" occurrence indicator;<br>Subclass relation B.B11 → child element B.B 11;<br>End | Begin<br>If ∃ parent element and multiple child elements with "\|" or "?" occurrence indicator<br>then ∃ generalisation;<br>If generalisation<br>Then begin<br>parent element A.A1, A.A2 → superclass relation<br>A.A1, A.A2;<br>child element B1.B11 → subclass relation B1.11;<br>child element B2.B21 → subclass relation B2.21;<br>End; |

Step 2.8: Mapping Categorisation Between Relational and XML Databases

A subclass table is a subset of a categorisation of its superclass tables in which the data occurrence of the subclass table appears in one and only one superclass table. In DTD, the superclass may be transformed into an element, and the common subclass into a sub-element. Each element receives an additional "artificial" ID attribute declared as #REQUIRED referred by the common sub-element's IDREF.

Figure 10A:
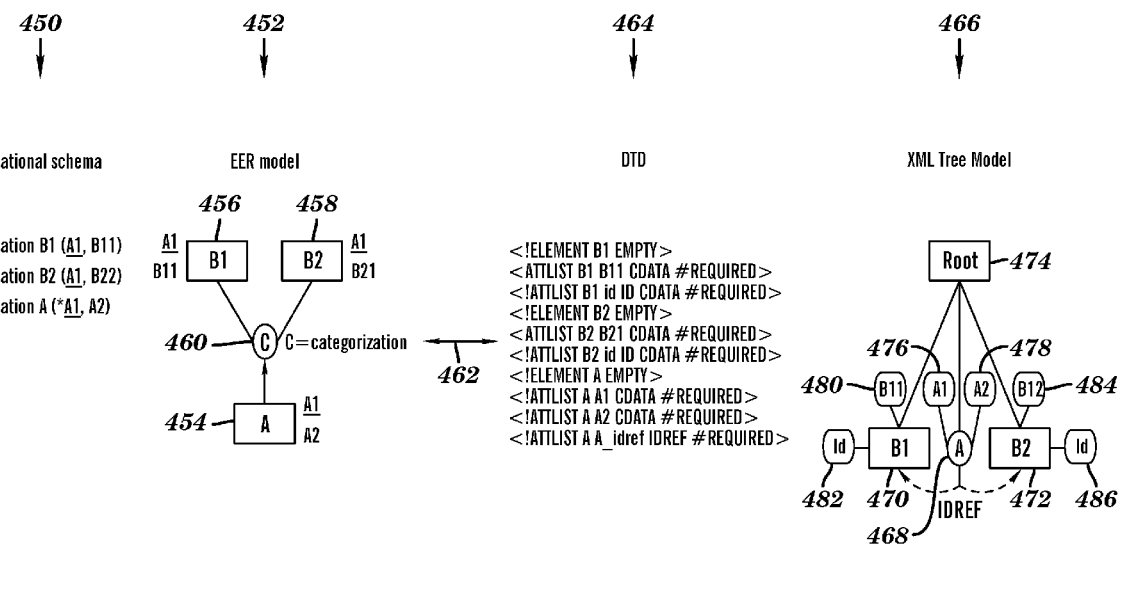
FIG. 10a is a schematic representation of a categorisation mapping of translation between relational schema and a XML Tree Model according to an embodiment of the invention.
Figure 10B:
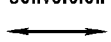
FIG. 10b is a schematic representation of a categorisation mapping of conversion between relational data and an XML document according to an embodiment of the invention.

FIGS. 10a and 10b illustrate the mapping of the categorisation between relational and XML databases according to a preferred embodiment of the present invention. FIG. 10a illustrates the translation of the schema between the relational schema and the XML Tree Model for a categorisation. The relational schema 450 comprises the Relation A, the Relation B1 and the Relation B2. In the corresponding EER model 452, relation A becomes entity A 454, the relation B1 becomes the entity B1 456 and the relation B2 becomes entity B2 458. The entity A 454 is in a categorisation relationship 460 with the entities B1 456 and B2 458. The Schema Translation 462 translates the EER model 452 into the Document Type Definition 464 from which the XML Tree Model 466 is obtained. In the XML Tree Model, the entity A 454 becomes the sub-element A 468, the entity B1 456 becomes the sub-element B1 470 and the entity B2 458 becomes the sub-element B2 472. The sub-elements are dependent on the root element 474. Sub-element A 468 has attributes A1 476 from the subclass entity A1 and A2 478 from the subclass entity A2. The sub-element B1 470 has an attribute B11 480 from the subclass entity B11 and the identity ID 482. The sub-element B2 472 has an attribute B12 484 from the subclass entity B21 and the identity ID 486. The sub-element A 468 refers to the sub-elements B1 470 and B2 472 through IDREF. The procedure is reversible and the relational schema may be obtained from the XML Tree Model.

FIG. 10b illustrates the mapping of the data between the relational database and the XML document in a categorisation. Data from the relational database is converted through the data conversion process into an XML document. The procedure is reversible and data may be converted from the XML document into the relational database.

In the methods of FIGS. 10a and 10b, the inclusion dependency constraints of relational schema may be preserved in the translated XML schema as shown below in Table 10.

TABLE 10

| | Relational schema | Translated XML schema in DTD |
|---|---|---|
| Inclusion dependency | A.A1 c(B1.A1 U B2.A1) | Instance (A) c(Instance (B1) U Instance (B2)) |

Examples of preferred algorithms of schema translation between relational and XML for use in the methods of FIGS. 10a and 10b are:

| Relational → XML DTD | XML DTD → Relational |
|---|---|
| Begin<br>If ∃ PR2s with KAP referring multiple relations then ∃ categorisation;<br>If ∃ categorisation with referring relation Subclass and referred by relations superclass<br>Then begin<br>Superclass relation B1.B11 → sibling element B1.B11, id;<br>Superclass relation B2.B21 → sibling element B2.B21, id;<br>Subclass relation A.A1, A.A2 → sibling element<br>A referring sibling element B1 and B2;<br>end;<br>end | Begin<br>If ∃ sibling element referring one of two sibling elements<br>Then ∃ categorisation;<br>If categorisation<br>Then begin<br>sibling element A.A1, A.A2 → subclass relation A.A1, A.A2,<br>superclass relation B1.A1, B2.A1;<br>sibling element B1.B11 → superclass relation B1.B11;<br>sibling element B2.B21 → subclass relation B2.B21;<br>End; |

Step 2.9: Mapping n-ary Relationship Between Relational and XML Databases

Multiple tables relate to each other in an n-ary relationship. An n-ary relationship is a relationship relation for multiple tables such that components of the former's compound primary key referring to the primary keys of the latter which are related to each other. In DTD, the entities in the n-ary relationship may be transformed as shown in FIGS. 11a and 11b.

Figure 11A:
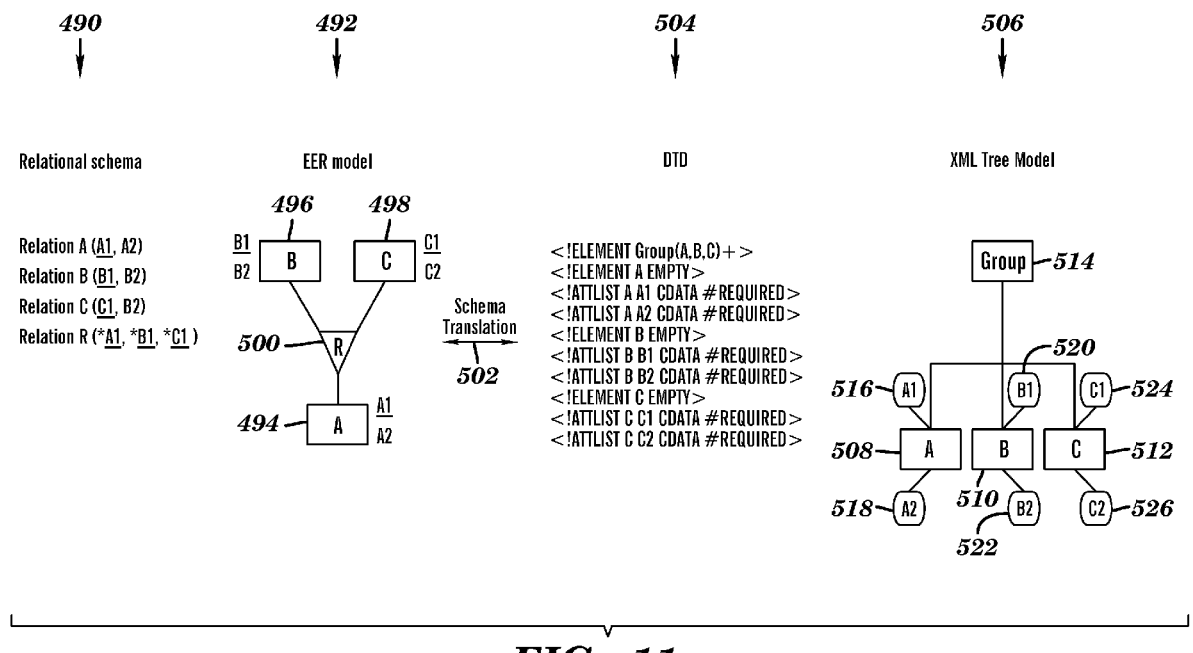
FIG. 11a is a schematic representation of the n-ary relationship and translation between relational schema and a XML Tree Model according to an embodiment of the invention.
Figure 11B:
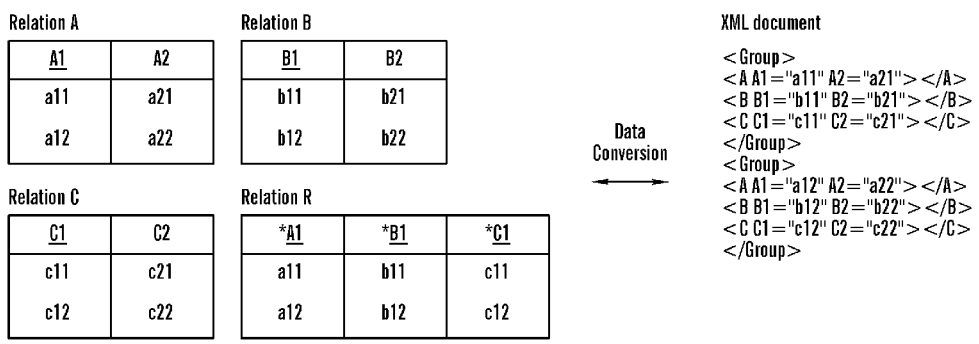
FIG. 11b is a schematic representation of the n-ary relationship and conversion between relational data and an XML document according to an embodiment of the invention.

FIGS. 11a and 11b illustrate the mapping between the relational and XML databases of the n-ary relationship according to a preferred embodiment of the present invention.

FIG. 11a illustrates the translation of schema between the relational schema and the XML Tree Model for an n-ary relationship. The relational schema 490 comprises the Relation A, the Relation B, the Relation C and the Relation R. In the corresponding EER model 492, relation A becomes entity A 494, the relation B becomes the entity B 496, the relation C becomes entity C 498 and the relation R becomes the operator R 500. The Schema Translation 502 translates the EER model 492 into the Document Type Definition 504 from which the XML Tree Model 506 is obtained. In the XML Tree Model 506, the entity A 494 becomes the sub-element A 508, the entity B 496 becomes the sub-element B 510 and the entity C 498 becomes the sub-element C 512. The sub-elements are dependent on the group element 506. Sub-element A 508 has attributes A1 516 from the subclass entity A1 and A2 518 from the subclass entity A2. The sub-element B 510 has attributes B1 520 from the subclass entity B1 and B2 522 from the subclass entity B2. The sub-element C 512 has attributes C1 524 from the subclass entity C1 and C2 526 from the subclass entity C2. The procedure is reversible and the relational schema may be obtained from the XML Tree Model.

FIG. 11b illustrates the mapping of the data between the relational database and the XML document for an n-ary relationship. Data from the relational database is converted through the data conversion process into an XML document. The procedure is reversible and data may be converted from the XML document into the relational database.

In the methods of FIGS. 11a and 11b, the functional dependency constraints of relational schema may be preserved in the translated XML schema as shown below in Table 11,

TABLE 11

| | Relational schema | Translated XML schema in DTD |
|---|---|---|
| Functional dependency | R.A1, R.B1, R.C1 → A.A1 + B.B1 + C.C1 | Instance root → Instance (A) + Instance (B) + Instance (C) |

Examples of preferred algorithms of schema translation between relational and XML for use in the methods of FIGS. 11a and 11b are:

| Relational → XML DTD | XML DTD → Relational |
|---|---|
| Begin<br>If ∃SR1 with 3 KAPs<br>Then ∃ ternary relationship with referring relation<br>as relationship relation referring to 3 relations<br>If ternary relationship<br>Then begin<br>Relationship relation → group element;<br>Referred by relation A.A1, A.A2 → component element A.A1, A.A2;<br>Referred by relation B.B1, B.B2 → component element B.B1, B.B2;<br>Referred by relation C.C1, C.C2 → component element C.C1, C.C2;<br>end;<br>end | Begin<br>If ∃ group element with 3 component elements<br>then 3 ternary relationship;<br>If ternary relationship<br>Then begin<br>Group element → relationship relation R.A1, R.B1, R.C1;<br>component element A.A1, A.A2 → relation A.A1, A.A2;<br>component element B.B1, B.B2 → relation B.B1, B.B2;<br>Component element C.C1, C.C2 → relation C.C1, C.C2<br>End; |

Thus, in step 2 described above, the data dependencies constraints in the relational schema may be mapped into XML Tree Models and the declarations of elements and attributes are mapped into DTD. In the process, the various data semantics of cardinality, participation, aggregation, generalisation, and categorisation are preserved in the hierarchical containment elements and attributes of the XML documents.

Step 3 Data Conversion from Relational Database into XML Documents

According to a preferred embodiment of the present invention, after schema translation, data conversion may then be carried out by loading relational data into XML documents.

Tuples of the relational tables may be loaded into the object instances of elements in the XML documents according to their constraints.

According to preferred embodiments of the invention, the method preferably preserves the structural constraints (cardinality and participation) of the relationships from the underlying relational database source and represents the flat relation structures in a compact nested XML structure.

As the result of the schema translation in step 2 described above, an EER model may be translated into different embodiments of XML schemas based on the selected root elements. For each translated XML schema, the corresponding source relation may be read sequentially by embedded SQL, that is, one tuple at a time, starting from a parent relation. The tuple can then be loaded into an XML document according to the mapped XML DTD. The corresponding child relation tuple(s) may then be read, and loaded into the XML document. According to preferred embodiments, corresponding parent and child relations in the source relational database are processed according to the translated parent and child elements in the mapped DTD.

Step 3.1 Convert Relations into a DOM (Document Object Model) or a JDOM (Java Document Object Model)

Figure 12:
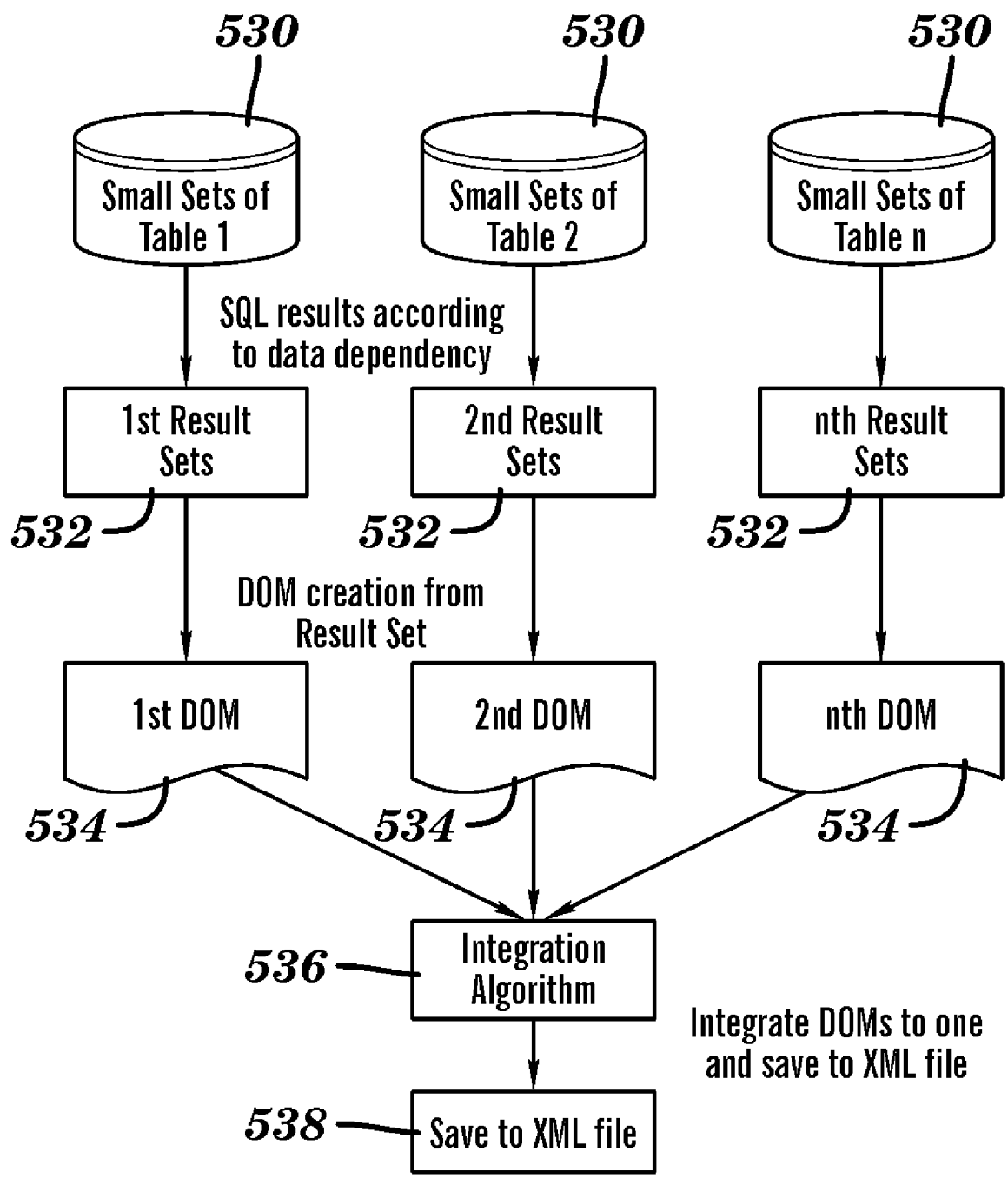
FIG. 12 is a schematic representation of the integration of Document Object Models (DOMS) into a single document for saving in an XML database according to an embodiment of the invention.

FIG. 12 is a block schematic of a system for the integration of XML documents using DOMs according to a preferred embodiment of the invention. A number n of small sets of data 530 for the data dependencies relationship are extracted from the databases and processed to produce n sets of results 532. The sets of results 532 are translated into DOMs 534. The resulting DOMs are then integrated into a single DOM using an integration algorithm 536 and saved in an XML database 538.

According to each data semantic, relations may be converted into DOMs as follows:

Data Conversion Algorithm:

```
Begin
While not at end of element do
Begin
Read an element from the translated target DTD;
Read the tuple of a corresponding relation of the element from the
source relational database;
Load this tuple into a target XML document;
Read the child elements of the element according to the DTD;
While not at end of the corresponding child relation in the source
relational database do
Begin
Read the tuple from the child relation such that the child's corresponding
to the processed parent relation's tuple;
Load the tuple to the target XML document;
     End;
  End;
End;
```

Step 3.2: Integrating XML Documents Using DOMs

An XML structure may be represented as a linked list where one element follows another A DOM technique may be employed for implementation. In a preferred embodiment, each set of relations in a data dependencies relationship may be translated into a DOM. These DOM nodes may then be integrated into a single DOM node, and translated into an XML document using, for example, the following algorithm:

```
Begin
   Create a DOM tree for each XML document;
   For each DOM instance do
```

```
Begin Search for the same DOM instance in another DOM;
If found
Then delete a duplicate DOM instance;
Chain the DOM instances;
End
Map the integrated DOM into an XML document;
End
```

Step 3.3 Manipulating XML Documents Using DOMs

In a preferred embodiment, when a DOM parse attempts to read an XML document, it creates firstly a document object, and then the whole XML document may be traversed from this point. During the merging of two or more DOM's, every element/node in one DOM may be evaluated with the others, not only the structure, such as parent/children relationship, but also their value. A search algorithm such as the procedure getNode set out below may be defined for matching elements/nodes within n numbers of DOMs. The algorithm may match the same elements in a document. Firstly the XML database is inspected and the node list that contains desired elements is derived.

Algorithm of Procedure getNode

```
I* Given getNode (name, value, doc)
name: the Node name
value: the Node value
doc: DOM needs to search
r: the set of same Node in doc with Node passed
return: the set of found Node in doc
I*
Begin While name Node still has sibling Node
Do begin
Get child list of name Node;
For each node in child list
If node.value equals to value;
Then add name Node to r;
Next
End
Return r;
End
```

To integrate DOMs, one main DOM tree is focussed upon and duplicate elements in the other two are deleted after their child elements have been appended to the main element in the program. The reason for deleting duplicate elements is not only to avoid double checking every time the program called getNode( ) is run, but also to avoid duplicate appending. The integration algorithm may be divided into search, deletion and insertion as follows:

Algorithm of the Procedure of Integration

```
/* Given c (node)
   node: every node in mainly focus DOM
   n: node in child list set
   p: the property of node
   s: return vector of getNode
   return: void
   *I
   Begin
   Get p of n;
   If p is DOCUMENT type node
   The integration (Document element of n);
   If p is ELEMENT type node
   Then begin
   While node still has sibling node
   Do begin
   Get child list of node;
```

```
For each n in child list
integration (n);
Next
If p is TEXT type node
Then s = getNode (n, n.value, DOM_1);
If s not equals to null
Then Delete s elements in DOM_1;
Append after n in main DOM;
s = getNode (n, n.value, DOM_2);
```

| Key (1) | Key(k) | Attribute (1) | Attribute (2) | Attribute(a) |
|---------|--------|---------------|---------------|--------------|
|         |        |               |               |              |
|         |        |               |               |              |

An example of a Data Conversion algorithm which may be used in this step is as follows:

```
Begin
Get all element nodes E1, E2, ...Ee from the XML document into template T1, T2 .Te;
While not at end of XML document do
Begin
For i = 1 to e do
        Begin
While not at end of Ei do
Begin
Read data occurrence Di of element Ei into template Ti;
Case element Ei and its parent element E(i-1) are in
1:n cardinality:                    Get foreign key from parent element template T(i-1);
m:n cardinality:                    Get foreign keys from referred elements template T(i-1)
and T(i-2);
weak entity:     Get foreign keys and primary key from parent element template T(i-1);
Total participation:                Get foreign keys from parent element template T(i-1);
                    Partial participation:   Get foreign keys from referred element
                                             template Tp;
aggregation:     Get foreign keys from group element template Tg;
isa:                                Get foreign keys from parent element template T(i- 1)
generalisation:                     Get foreign key from parent element template T(i-1):
categorisation:  Get foreign keys from referred elements template Tr and Ts;
n-ary:           Get foreign key from group element template Tp
                 end;
Get primary key and foreign key (if any) from the template Ei; Output Di into target relation
Ri;
        End
        End
End
```

-continued

```
If s not equals to null
Then Delete s elements in DOM_2;
Append after n in main DOM;
Return void;
End
    End
End
```

The above integration algorithm checks the property of Node first. According to different Node types, TEXT Node will be checked within the other two nodes. When the function finishes its job, an integrated DOM is created.

In a preferred embodiment of the present invention, the above steps 3.1 to 3.3 may be carried out by converting relations into a JDOM (Java Document Object Model).

Step 4: Conversion from an XML Database into a Relational Database

As the result of the schema translation in step 2, an XML Tree Model may be translated into an EER model. For each element in the source XML schema, its corresponding target relation may be located. The data occurrence of an element may then be loaded into the tuple of the relation according to the data semantic. Element and sub-element data occurrences in the source XML database may be processed according to the translated parent and child relations in the mapped relational schema with a template as shown below:

Updating the Databases

To update replicate relational databases and XML databases, a synchronization update may be performed by translating a source relational database program into a target XML database program, and then processing them concurrently. These replicate relational databases and XML databases continue to support the relational database while developing an information-capacity-equivalent XML database for the same application. An incremental mapping from the relational database to the XML database may be maintained. In a preferred embodiment, applications on the relational database may be rewritten and moved to the XML database.

Figure 13A:
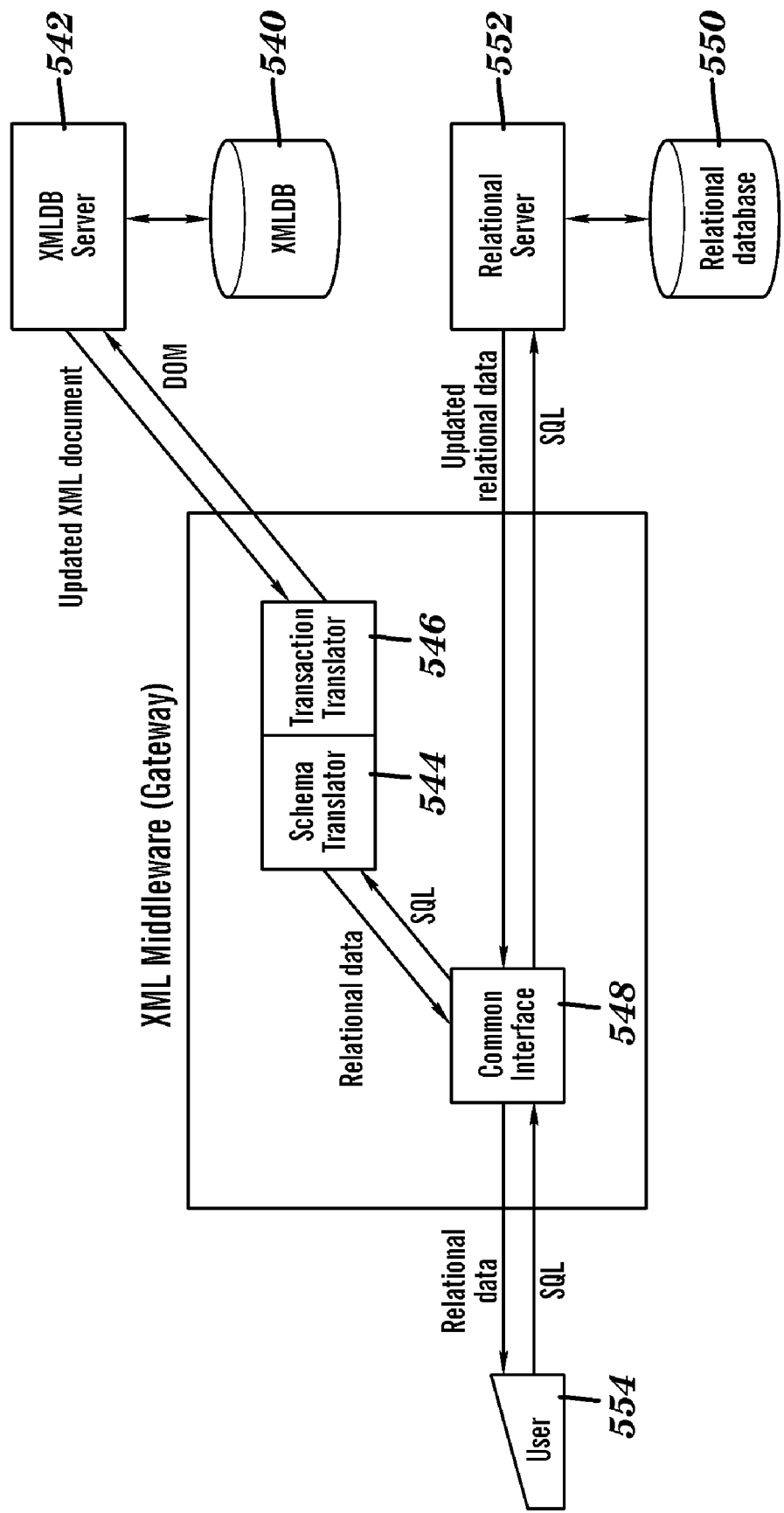
FIG. 13a is a schematic representation of the architecture for the updating of relational and XML databases according to an embodiment of the invention.

The basic idea of the synchronization update of a pair of relational and XML databases according to a preferred embodiment of the present invention is shown in FIG. 13a.

FIG. 13a is a block schematic of an architecture of a system for synchronising the updating of the relational and XML databases. The XML database 540 is connected to the server 542 which is further connected to a schema translator 544 and a transaction translator 546, which together convert SQL to XML and XML to SQL. Data is passed between the server 542 and the translators 544 and 546 in XML. The translators 544 and 546 are coupled to a common interface 548 and communicate with it in SQL. The relational database 550 is connected to a server 552, which is further connected to the common interface unit 548 and communicates with it in SQL. The common interface 548 is also connected to a user interface 554 from which commands and data may be sent to the databases via the common interface 548 in SQL, data may also be extracted from the databases and passed to the user interface in SQL.

At the relational site, DML statements that update the relational database may be monitored. Every time an update operation changes the relational database, the changes may also be recorded in the corresponding XML database by the translated XML database program. This may be implemented by transforming the update transactions of relational database program into the update transactions of the replicate XML database program which perform the same operations on the database as did the original relational database programs. The pseudo code for the overall algorithm of synchronization may be as follows:
Algorithm

```
begin
    monitor user input options (find / insert / delete / update)
    case
    (1)    Find: extract user input data;
    construct SQL statement for SELECT operation;
    execute SQL statement (RDB);
    display result;
    (2)    Insert: extract user input data;
    construct SQL statement for INSERT operation;
    execute SQL statement (RDB);
    construct a XML tree node;
    append the node into XMLDB;
    (3)    Delete: extract user input data;
            construct SQL statement for DELETE operation;
            execute SQL statement (RDB);
            search the XML tree node to be deleted;
            remove the node from XMLDB;
    (4) Update: extract user input data;
            construct SQL statement for UPDATE operation;
            execute SQL statement (RDB);
            search the XML tree node to be updated;
            construct an XML tree node;
        replace the old node with new node from XMLDB;
        case end;
    end;
```

Update Transaction Translation from SOL to DOM

Three update transactions: insert, update and delete may be translated from SQL to DOM as follows:

For the INSERT Transaction:

Attribute values may be specified for a sub-element instance to be inserted in an element $E_k$. The values for attributes corresponding to fields in $R_k$ may be denoted by $v_1, v_2, \ldots v_n$ and the values of the foreign keys in $R_k$ may be denoted by $V_1, V_2 \ldots V_n$.

An example of a suitable algorithm is as follows:

```
Begin
    Locate the element E_{k-1} of the to-be-inserted sub-element E_k within
    XML database by matching its foreign keys in R_k;
        Establish content of all E_k element object in working storage;
        Insert E_k element object;
    End;
```

The syntax of insert algorithm may be as set out in Table 12 below:

TABLE 12

| SQL | DOM |
|---|---|
| Exec SQL Insert into Table-T (KetAttrName1, .v1,) Values (VAL__KeyAttrName1, vn) End-Exec | Inspect (element); NodeList content = element getContent( ); Iterator iterator = content.iterator( ); While (iterator.hasNext( )) {; Object o = iterator.next( ); |

TABLE 12-continued

| SQL | DOM |
|---|---|
| | If (o instanceof Element) { Element child = (element) o; Element addContent(child);}}} |

For the UPDATE Transaction:

If it is desired, for example, to replace the value of an attribute A in the element $E_k$ with the value V, basically, two cases are considered. In the first case, A is not a foreign key. It corresponds to a data item in the corresponding relation R and thus a DOM command is required to perform the replacement in the XML database. In the second case, A is a foreign key. Replacing a value in this case involves changing the element sub-element relationship rather than the attribute value. Value (A) is the content of attribute A in the relation type R before update.

An example of a suitable algorithm for use in this procedure is as follows:

```
Begin
    If A and {A_1,A_2, A_n}/*A is a non-foreign key
    Then if A = K(R)      /* K(R) = key field in relation R
    Then drop the delete /* disallow update a foreign key due to referential
    integrity
    Else begin get element E_k by its attribute A which is mapped to
    K(R) in relation R;
    Update E_k by replacing value of attribute A by value V;
    End;
    If V i null
            Then begin
    Get E_k by its attribute A which is mapped to K(R);
    Delete E_k;
    Get E_{k-1} by its foreign key attribute A_j;
    Insert sub-element E_k under element E_k
            End
    End;
```

The syntax of update algorithm is:

| SQL | DOM |
|---|---|
| Exec SQL Update Table-T Set KeyAttrName1 = v1 And KeyAttrNamei = vn End-exec | Inspect (element); NodeList content = element.getContent( ); Iterator iterator = content.iterator( ); While (iterator.hasNext( )) { Object o=iterator.next( ); If (o instanceof Element) { Element child = (element) o; Element removeContent(child); AddContent(newchild); }}} |

For the DELETE Transaction:

A simple delete-only statement in the relational database corresponds to the XML database delete statement for a given XML schema. The delete-sub-element-$E_k$-only statement has the following properties:

1. Remove sub-element $E_k$ from all elements in which it participates as a sub-element 2. Do not remove sub-element $E_k$ for each element where $E_k$ participates as an element An example of a suitable algorithm for use in this procedure is as follows:

```
Begin Get element E_k by A=K(R) where K(R) = key field in relation R;
If there is sub-element
Then drop delete /* disallow remove an element which consists of
sub-elements
Else delete element E_k
End;
```

The syntax of delete algorithm is:

| SQL | DOM |
|---|---|
| Exec SQL Delete from Table-T where KeyAttrName1 = v1 And KeyAttrNamei =vn Exec-SQL | Inspect (element); NodeList content = element.getContent( ); Iterator iterator = content.iterator( ); While (iterator.hasNext( )) {     Object o=iterator.next( );     If (o instanceof Element) {         Element child = (element) o;         Element removeContent(child) }}} |

After converting the relational database into the XML database, in order to synchronise the update of these two databases, the update transaction of the relational database program may be translated into the update transaction of the XML database program. Once translated, these two programs may update both the relational database and the XML database concurrently for synchronised updating.

Figure 13B:
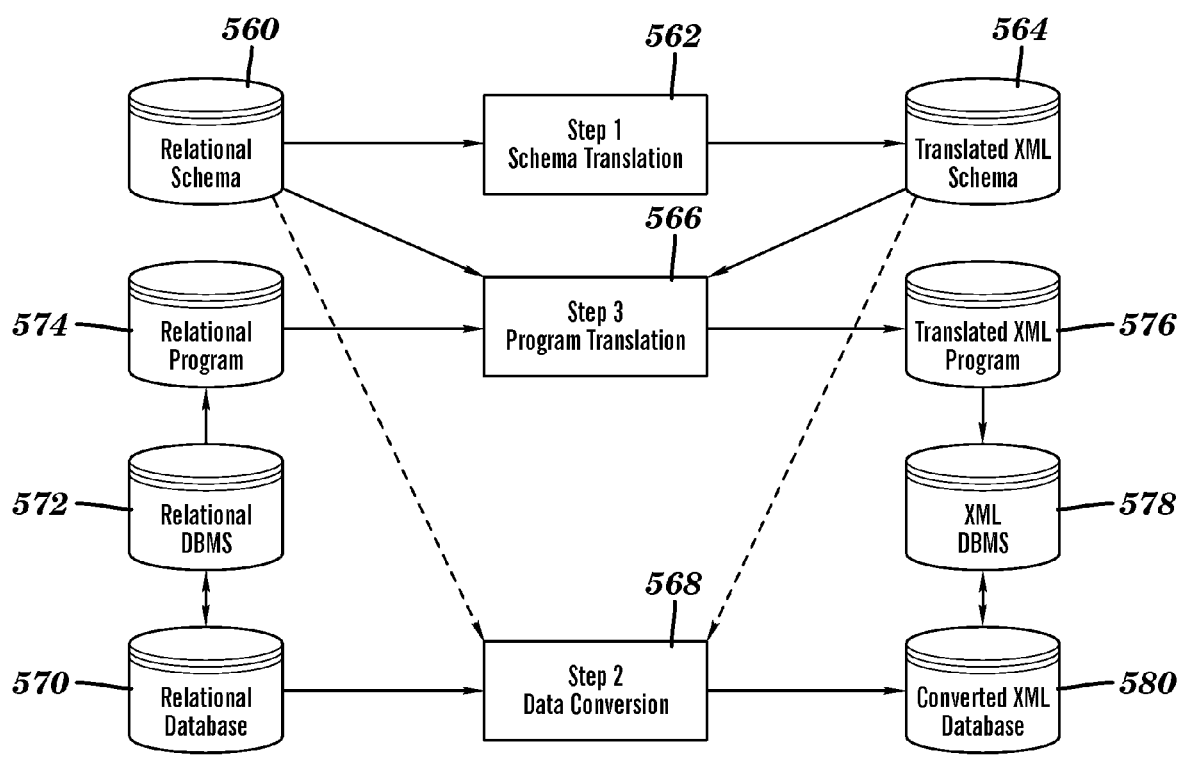
FIG. 13b is a schematic representation of snapshot facilities showing incremental relational to XML mapping according to an embodiment of the invention.

FIG. 13b is a snapshot facility for the synchronisation update process of the relational and XML databases according to an embodiment of the invention.

As shown in FIG. 13b, the relational schema 560 is converted to the XML schema in a translation stage 562 and stored as a translated XML schema 564. Both the relational schema 560 and the XML schema 564 are applied to a program translation stage 566 and a data conversion stage 568. The relational database 570 operates through its management system 572 on a relational program 574. The relational program 574 under the control of the relational database 570 and relational management system 572 is translated in the program translator 566 to give a translated XML program 576. Data from the relational database 570 is converted in the data conversion stage 568 and is then added to the translated XML program 576 which is coupled via its management system 578 to the converted XML database 580.

Asynchronous Update Transactions, Translation and Processing of SOL and JDOM

In a further preferred embodiment of the present invention, after converting the relational database into an XML database, the two databases may be updated asynchronously by translating and processing relational database transactions into XML database transactions. Once translated, the update transactions may be processed asynchronously, firstly the SQL and then, for example, the Java Document Object Model (JDOM). In the pre-process, the data to be transmitted on the web is extracted from the relational database. The data is then converted/replicated into an XML document which is stored in a replicate XML database. Each translated JDOM update transaction is to be processed after each successful SQL update transaction.

Three update transactions, namely, insert, update and delete may be translated from SQL to DOM as follows:

For the INSERT Transaction:

To insert a sub-element into an element $E_k$ its attribute values should be specified. The values for attributes corresponding to fields in $R_k$ may be denoted by $v_1, v_2, \ldots v_n$ and the values of the foreign keys in $R_k$ may be denoted by $V_1, V_2, \ldots, V_n$ and the non-key values may be denoted by $N_1, \ldots N_n$.

An example of a suitable algorithm is as follows:

```
Begin
  locate the element E_{k-1} of the to-be-inserted sub-element E_k within
  XML database by matching its foreign keys in R_k;
  establish content of all E_k element object in working storage;
  insert E_k element object;
  end
```

The syntax of insert algorithm is:

| SQL | JDOM |
|---|---|
| Exec SQL Insert into Table-T (KetAttrName1, ..KeyAttrNamei, ForeignKey1 ForeignKeyn,... Non-Key1 Non-Keyn) Values (v1, vn, V1 Vn, N_1 N_n) End-Exec | Inspect (element); List content = element.getContent( ); Iterator iterator = content.iterator( ); while (iterator.hasNext( )) {     Object o = iterator.next( );     If (o instanceofElement){         Element child = (element) o;         Element         addContent(child);}}} |

For the UPDATE Transaction:

If the value (A) of an attribute A in the relation R is to be replaced by an element $E_k$ with the value V in the translated XML document (database) X, basically, two cases may be considered. In the first case, attribute A is not a foreign key but instead corresponds to a data item in the corresponding relation R. A JDOM command is required to perform the replacement in the XML database. In the second case, attribute A is a foreign key. Replacing a value in this case involves changing a time element sub-element relationship rather than the attribute value in the translated XML database.

An example of a suitable algorithm is as follows:

```
begin
  if attribute A is not a foreign key
    if A = K(R) /* A is a key field in relation R
      drop the delete; // disallow update a key due to referential integrity
    else
      get element E_k by its attribute A which is mapped to K(R) in relation
      R; update E_k by replacing value of attribute A by value V;
    end if
  else // attribute A is a foreign key
    get E_k by its attribute A which is mapped to K(R); delete E_k;
    get E_{k-1} by its foreign key attribute A_j; insert sub-element E_k under
    element E_k;
  end if
end
```

The syntax of update algorithm is:

| SQL | JDOM |
|---|---|
| Exec SQL Update Table-T Set Key AttrName1=v1 And set KeyAttrNamei=vn; set ForeignKey1=V_1, set ForeignKeyn = V_n , set NonKey 1 = N_1, | inspect (element); List content = element.getContent( ); Iterator iterator = content.iterator( ); while (iterator.hasNext( )){     Object o = iterator.next( );     If (o instanceof Elemtn) {         Element child = (element) o; |

-continued

| SQL | JDOM |
|---|---|
| set NonKeyn = $N_n$ | Element removeContent(child); |
| End-exec | AddContent(newchild);}}} |

For the DELETE Transaction:

A simple delete-only statement in the RDB corresponds to the XML database delete statement for a given XML schema. The delete-sub-element-$E_k$-only statement has the following properties:

1. Remove sub-element $E_k$ from all elements in which it participates as a sub-element
2. Do not remove sub-element $E_k$ for each element where $E_k$ participates as an element An example of a suitable algorithm is as follows:

```
begin
  get element E_k by AK(R) where K(R) = key field in relation R;
  if sub-element
    drop delete; //disallow remove an element which consists of
    sub-elements else
    delete element E_k;
end
```

The syntax of delete algorithm is:

| SQL | JDOM |
|---|---|
| Exec SQL Delete from Table-T where KeyAttrName1=v1 And KeyAttrNamei=vn Exec-SQL | Inspect (element);<br>List content = element.getContent( );<br>Iterator iterator = content.iterator( );<br>while (iterator.hasNext( )) {<br>  Object o = iterator.next( );<br>  If (o instanceof Element) {<br>    Element child = (element) o;<br>    Element removeContent(child)}}} |

Two case studies are described below to illustrate the implementation of the above described preferred embodiments of the present invention.

Figure 14:
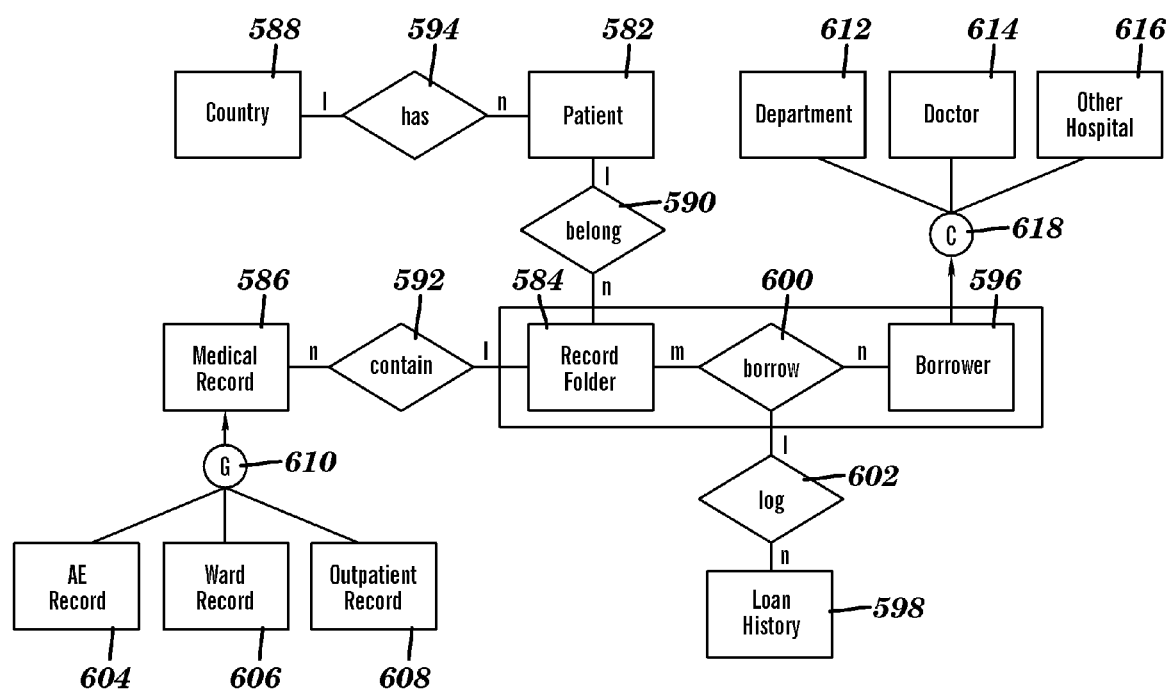
FIG. 14 is a schematic representation of an EER model for a hospital database system for use in an embodiment of the invention.

Case Study 1:

This case study is of a Hospital Database System. An EER of the system is shown in FIG. 14. In this system, a patient 582 may have many record folders 584. Each record folder 584 may contain many different medical records 586 of the patient. The AE record 604, a ward record 606 and an outpatient record 608 may be generalised as a medical record 586. A country 588 has many patients 582. A borrower 596 of the record folder 584 of the patient 582 may be a department 612, a doctor 614 or another hospital 616 for their references or checking. Once a record folder 584 is borrowed, a loan history 598 may be created to record the details about it. The relational schemas for this case study are shown in Tables 13 to 25 below.

In the following, underlined and italic means primary key and * means foreign key.

TABLE 13

Country

| *CountryNo* | Country_Name |
|---|---|
| C0001 | China |
| C0002 | Canada |
| C0003 | Korea |

TABLE 14

Record Folder

| *Folder No* | Location | *HKID |
|---|---|---|
| F_21 | Hong Kong | E3766849 |
| F_22 | Kowloon | E8018229 |
| F_23 | New Territories | E6077888 |
| F_24 | New Territories | E3766849 |

TABLE 15

Patient

| *HKID* | Patient_Name | *Country_No. |
|---|---|---|
| E3766849 | Smith | C0001 |
| E8018229 | Bloor | C0001 |
| E6077888 | Kim | C0001 |

TABLE 16

AE Record

| *Medical_Rec_No | AE_No |
|---|---|
| M_352001 | AE_1 |
| M_362001 | AE_2 |
| M_333333 | AE_3 |

TABLE 17

Medical_Record

| *Medical—Rec_No* | Create_Date | Sub_Type | *Folder_No |
|---|---|---|---|
| M_311999 | Jan-1-1999 | W | F_21 |
| M_322000 | Nov-12-1998 | W | F_21 |
| M_331998 | Nov-10-1998 | O | F_22 |
| M_341999 | Dec-20-1999 | O | F_22 |
| M_352001 | Jan-15-2001 | A | F_21 |
| M_362001 | Feb-01-2001 | A | F_21 |
| M_382001 | Feb-22-2001 | O | F_23 |
| M_333333 | Mar-03-01 | A | F_24 |

TABLE 18

Ward_Record

| *MedicalRecNo* | Ward_No | Admission_Date | Discharge_Date |
|---|---|---|---|
| M_311999 | W_41 | Jan-1-1999 | Mar-20-1999 |
| M_322000 | W_43 | Nov-12-1998 | Dec-14-1998 |

TABLE 19

Outpatient_Record

| *Medical_Rec_No | Outpatient_No | Speciality |
|---|---|---|
| M_331998 | O_51 | Heart |
| M_341999 | O_52 | Ophthalmic |
| M_382001 | O_53 | Therapy |

TABLE 20

Borrower

| *Borrower_No | Borrower_Name |
|---|---|
| B1 | Bloor |
| B2 | Smith |
| B3 | Kim |
| B11 | X-Ray |
| B12 | Infant |
| B14 | Skin |
| B21 | Mac Neal |
| B22 | Riveredge |
| B25 | Golden Park |

TABLE 21

Borrow

| *Borrower_No | *Folder_No |
|---|---|
| B1 | F_21 |
| B1 | F_22 |
| B2 | F_22 |
| B3 | F_23 |
| B11 | F_21 |
| B12 | F_22 |
| B14 | F_23 |
| B21 | F_21 |
| B22 | F_21 |
| B22 | F_24 |
| B25 | F_23 |

TABLE 22

Loan_History

| *Borrower_No | *Folder_No | Loan_Date |
|---|---|---|
| B1 | F_21 | Jan-10-2002 |
| B1 | F_22 | Jan-10-2002 |
| B2 | F_22 | Sep-29-2002 |
| B3 | F_23 | Sep-29-2002 |
| B11 | F_21 | Jun-12-2002 |
| B12 | F_22 | Jan-07-2002 |
| B14 | F_23 | Jan-11-2002 |
| B21 | F_21 | Feb-01-2002 |
| B22 | F_21 | Mar-03-2002 |
| B22 | F_24 | Apr-03-2002 |
| B25 | F_23 | Mar-03-2002 |

TABLE 23

Department

| Borrower_No | Department_Name |
|---|---|
| B11 | X-Ray |
| B12 | Infant |
| B13 | Chest |
| B14 | Skin |
| B15 | Therapy |

TABLE 24

Doctor

| Borrower_No | Doctor_Name |
|---|---|
| B1 | Bloor |
| B2 | Smith |
| B3 | Kim |
| B4 | Chitson |
| B5 | Navathe |

TABLE 25

Other_Hospital

| Borrower_No | Hospital_Name |
|---|---|
| B21 | Mac Neal |
| B22 | Riveredge |
| B23 | Stone Town |
| B24 | North Community |
| B25 | Golden Park |

By following the stepwise procedures according to preferred embodiments of the present invention as described in Steps 1 to 4 above in connection with FIGS. 1 to 13b, the relational schema of this case study may be converted into the XML Schema as follows:

Step 1: Reverse Engineer Relational Schema into an EER Model

By using a classification table, the EER model shown in FIG. 14 may be recovered from the given relational schemas.

Step 2.1: Define a Root Element

As this case study is about patients' records, it is advisable to use a meaningful name for the root element. The entity name, 'Patient', should preferably not be used as the root element name because it is desired to hold all the patient records in an XML file. Another reason is that it may be desirable to add some other attributes to the root element to describe the system itself. Thus, it is preferable to use Patient Records as the root element for the DTD:

XML Schemas

<!ELEMENT Patient_Records (Patient)+>

Starting from the entity Patient 582 in the EER model of FIG. 14, the relevant entities for it are determined. The relevant entities include the related entities that are navigable from the parent entity 582 in one-to-many relationships. The entities Record Folder 584, Medical Record 586 and Borrower 596 are considered relevant entities because they are navigable from the entity Patient 582 in one-to-many relationships. As the relationship between the entity Patient 582 and the entity Country 588 is many-to-one, then the entity Country 588 is considered not to be navigable from the entity Patient 588 according to the proposed methodology.

Figure 15:
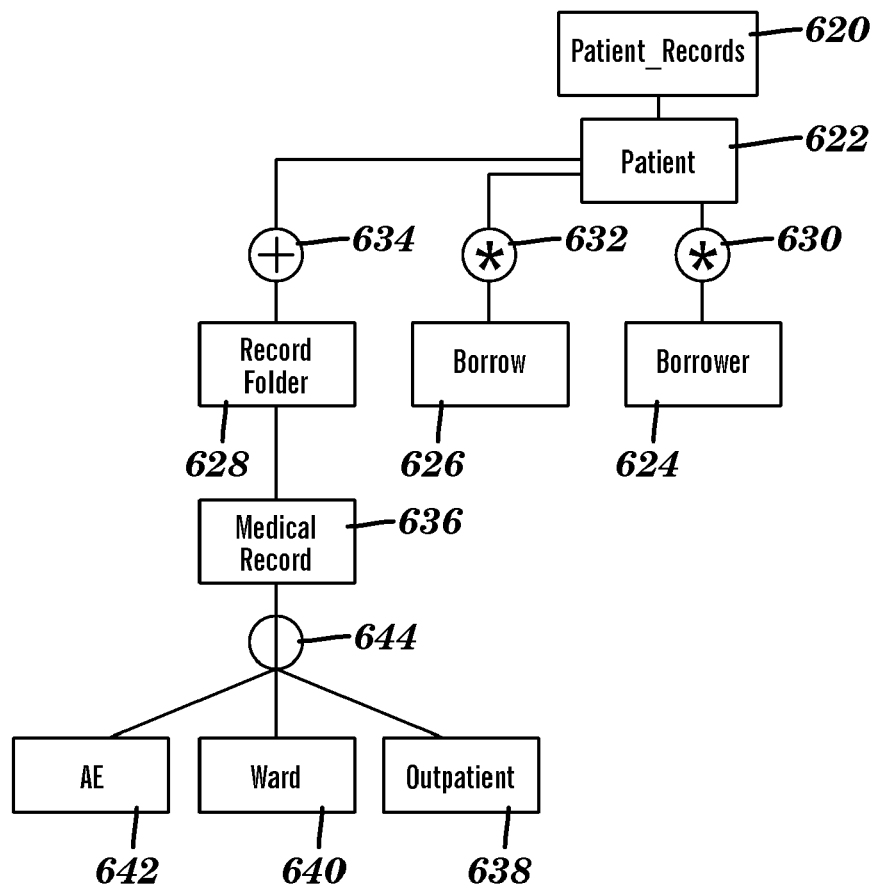
FIG. 15 is an example of a XML Tree Model based on a conceptual view of a patient record system for use in an embodiment of the invention.
Figure 16:
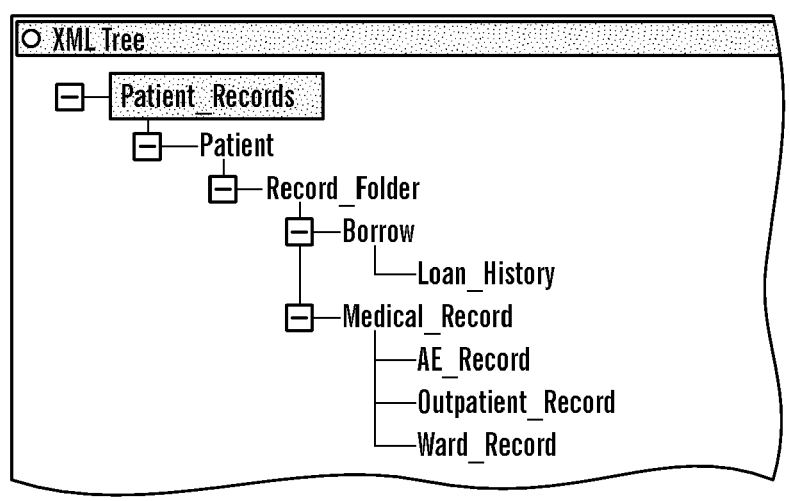
FIG. 16 is an example of a XML Tree Model based on a program generated view of a patient record system for use in an embodiment of the invention.

An XML Tree Model that starts from the entity Patient_ Records may then be formed and this is shown in FIGS. 15 and 16. FIG. 15 is a conceptual view and FIG. 16 is a program-generated view. In FIG. 16, Microsoft's TreeView ActiveX control has been used to represent the XML Tree Model.

The root element Patient_Records 620 has the entity Patient 622 as a direct child. The entity Patient 622 has the entities Borrower 624, Borrow 626 and Record Folder 628 related to it. The entities Borrower 624 and Borrow 626 are each in a zero-to-many relationship 630, 632 with the entity Patient 622 and the entity Record Folder 628 is in a one-to-many relationship 634 with the entity Patient 622. The entity Record Folder 628 has the entity Medical Record 636 as a direct child. In the XML Tree Model, the element Medical Record 636 is in a relationship 644 with either Outpatient 638, Ward 640 or AE 642.

As the entities Record Folder 628 and Medical Record 636 are navigable from the Patient entity 622, all those entities may then be mapped into the elements of the XML schema. The attributes of those elements may be defined by using the definition of the relational schema as shown below in Table 26:

TABLE 26

| Relational schema | Translated XML schema in DTD |
|---|---|
| Patient (HKID, Patient_Name, *Country_Code) Record_Folder (Folder_No, Location, *HKID) Medical_Record (Medical_Rec No, Create_Date, Sub_Type, *Folder_No) | <!ELEMENT Patient_Records (Patient+)> <!ELEMENT Patient (Record_Folder)> <!ELEMENT Record_Folder (Medical_Record)> <!ELEMENT Medical_Record EMPTY> <!ATTLIST Patient HKID CDATA #REQUIRED <!ATTLIST Patient Patient_Name CDATA #REQUIRED> <!ATTLIST Patient Country_Code CDATA #REQUIRED> <!ATTLIST Record_Folder Folder_No CDATA #REQUIRED> <!ATTLIST Record _Folder Location CDATA #REQUIRED> <!ATTLIST Record_Folder HKID CDATA # REQUIRED <!ATTLIST Medical_Record Medical_Rec_No CDATA #REQUIRED> <!ATTLIST Medical_Record Create_Date CDATA #REQUIRED> <!ATTLIST Medical_Record Sub_Type CDATA #REQUIRED> <!ATTLIST Medical_Record Folder_No CDATA #REQUIRED> |

Step 2.2: Map Weak Entity into the Content Model
This is not applicable in this case study.
Step 2.3: Map Participation into the Content Model
The relationship between the entities Patient 622 and the Record Folder 628 is total participation. The relationship between the entities Record Folder 628 and Medical Record 636 is also total participation. Therefore, the content model of the XML schema is translated as shown below in Table 27. Not all foreign keys in the relational schema will be mapped into XML schema as they will be represented in containment or ID and IDREF.

TABLE 27

| Relational schema | Translated XML schema |
|---|---|
| Patient (HKID, Patient_Name, *Country_Code) Record_Folder (Folder_No., Location, *HKID) Medical_Record (Medical_Rec No, Create_Date, Sub_Type, *Folder_No) | <!ELEMENT Patient (Record_Folder*)> <!ELEMENT Record_Folder (Medical_Record*)> <!ELEMENT Medical_Record EMPTY> <!ATTLIST Patient HKID CDATA#REQUIRED> <!ATTLIST Patient Patient_Name CDATA# REQUIRED> <!ATTLIST Patient Country_Code CDATA #REQUIRED. <!ATTLIST Record_Folder Folder_No CDATA #REQUIRED. <!ATTLIST Record_Folder Location CDATA #REQUIRED> <!ATTLIST Medical_Record Medical_Rec_No CDATA #REQUIRED> <!ATTLIST Medical_Record Create_Data CDATA #REQUIRED> <!ATTLIST Medical_Record Sub_Type CDATA #REQUIRED> |

Step 2.4: Map Cardinality into the Content Model
The relationship between the entities Borrower 624 and Borrow 26, and the entity Record Folder 628 is many-to-many cardinality as a borrower may borrow many record folders and a record folder may be borrowed by many borrowers. In this many-to-many cardinality, the relationship between the entities borrow and borrower will not be included for the purposes of this case study as they are in a many-to-one relationship. The translated XML schema together with the many-to-many relationship is shown below in Table 28:

TABLE 28

| Relational schema | Translated XML schema |
|---|---|
| Record_Folder (Folder No, Location, *HKID) | <!ELEMENT Record_Folder (Borrow*, Medical_Record*)> |

TABLE 28-continued

| Relational schema | Translated XML schema |
| --- | --- |
| Borrow (*Borrower No, *Folder No) | <!ELEMENT Medical_Record EMPTY> <!ELEMENT Borrow EMPTY> <!ATTLIST Borrow Borrower_No CDATA #REQUIRED> |

As the entity Loan History shown in FIG. 16 is also navigable from the Borrow entity 626 and they are in a one-to-many relationship, so the modified XML schema will be as set out in Table 28 below:

TABLE 28

| Relational schema | Translated XML schema |
| --- | --- |
| Loan_History (*Borrower_No, *Folder No, Loan_Dat) | <!ELEMENT Borrow (Loan_History*)> <!ELEMENT Loan_History EMPTY> <!ATTLIST Loan_History Folder_No CDATA #REQUIRED> <!ATTLIST Loan_History Loan Date CDATA #REQUIRED> |

Step 2.5: Map Aggregation into the Content Model
 This step is not applicable in this case study.
Step 2.6 Map is a into the Content Model
 This step is not applicable in this case study.
Step 2.7: Map Generalisation into the Content Model
 As the medical record may be an AE, a ward or an outpatient record, so it is a disjoint generalisation. The translated XML schema for the entity Medical Record may be as shown below in Table 29:

TABLE 29

| Relational schema | Translated XML schema |
| --- | --- |
| Medical_Record (Medical_Record_No, Create_Date, Sub_Type, *Folder_No) AE_Record (*Medical_Rec_No, AE_No) Ward_Record (*Medical_Rec_No, Ward_No, Admission_Date, Discharge_Date) Outpatient_Record (*Medical_Rec_No, Outpatient_No, Specialty) | <!ELEMENT Medical_Record (AE \| Ward \| Outpatient)> <!ATTLIST Medical_Record Medical_Rec_No CDATA #REQUIRED> <!ATTLIST Medical_Record Create_Date CDATA #REQUIRED> <!ATTLIST Medical_Record Sub_Type CDATA #REQUIRED> <!ELEMENT AE EMPTY> <!ATTLIST AE AE_No CDATA#REQUIRED> <!ELEMENT Ward EMPTY> <!ATTLIST Ward Ward_No CDATA #REQUIRED> <!ATTLIST Ward Admission_Date CDATA #REQUIRED> <!ATTLIST Ward Discharge_Date CDATA #REQUIRED> <!ELEMENT Outpatient EMPTY> <!ATTLIST Outpatient Outpatient_No CDATA #REQUIRED> <!ATTLIST Outpatient Specialty CDATA #REQUIRED> |

Step 2.8: Map Categorisation into the Content Model
 Although there is a categorisation in this case study, it is not navigable from the entity Patient. Thus this step is not applicable for this case study.
Step 2.9: Map n-ary Relationship into the Content Model
 This step is not applicable in this case study.
 As a result, the final XML DTD and example of XML document are as follows:
The Translated XML DTD

```
<!ELEMENT Patient_Records (Patient+)>
<!ELEMENT Patient (Record_Folder*)>
<!ELEMENT Record_Folder (Borrow* , Medical_Record *)>
<!ELEMENT Borrow (Loan_History*)>
<!ELEMENT Medical_Record (AE_Record|
Outpatient_Record| Ward_Record)>
<!ELEMENT Loan_History EMPTY>
<!ELEMENT AE_Record EMPTY>
<!ELEMENT Outpatient_Record EMPTY>
<!ELEMENT Ward_Record EMPTY>
<!ATTLIST Patient
Country_No CDATA #REQUIRED
HKID CDATA #REQUIRED
Patient_Name CDATA #REQUIRED>
<!ATTLIST Record_Folder
Folder_No CDATA #REQUIRED
Location CDATA #REQUIRED>
<!ATTLIST Borrow
Borrower_No CDATA #REQUIRED>
<!ATTLIST Medical_Record
Medical_Rec_No CDATA #REQUIRED
Create_Date CDATA #REQUIRED
Sub_Type CDATA #REQUIRED>
<!ATTLIST Loan_History
Loan_Date CDATA #REQUIRED>
<!ATTLIST AE_Record
AE_No CDATA #REQUIRED>
<!ATTLIST Outpatient_Record
Outpatient_No CDATA #REQUIRED
```

-continued

```
Specialty CDATA #REQUIRED>
<!ATTLIST Ward_Record
Admission_Date CDATA #REQUIRED
Discharge_Date CDATA #REQUIRED
Ward_No CDATA #REQUIRED>
```

Step 3 Data Conversion from Relational Database into XML Document

As a result of schema translation in step 2, relational data may be loaded into an XML document as follows:

An Example of XML Document is:

```
<Patient Records>
<Patient Country_No="C0001" HKID="E3766849" Patient_Name="Smith">
<Record_Folder Folder_No="F_21" Location="Hong Kong">
<Borrow Borrower_No="B1">
<Loan_History Loan_Date="Jan-10-2002"/>
</Borrow>
<Borrow Borrower_No"B11">
<Loan_History Loan_Date="Jun-12-2002"/>
</Borrow>
<Borrow Borrower_No="B21">
<Loan_History Loan_Date="Feb-01-2002"/>
</Borrow>
<Borrow Borrower_No="B22">
<Loan_History Loan_Date="Mar-03-20O2"/>
</Borrow>
<Medical_Record Medical_Rec_No="M_311999" Create_Date="Jan-1-1999"
Sub_Type="W">
    <Ward_Record Admission_Date="Jan-1-1999" Discharge Date= "Mar-20-1999"
Ward_No="W_41"/>
</Medical_Record>
<Medical_Record Medical_Rec_No="M_322000" Create_Date="Nov- 12-1998"
Sub_Type="W">
    <Ward_Record Admission_Date="Nov-12-1998"
Discharge_Date="Dec-14-1998" Ward_No="W_43"/>
</Medical_Record>
<Medical_Record Medical_Rec_No="M_352001" Create_Date="Jan- 15-2001"
Sub_Type="A">
    <AE_Record AE_No="AE_1"/>
</Medical_Record>
<Medical_Record Medical_Rec_No="M_362001" Create_Date="Feb- 01-2001"
Sub_Type="A">
    <AE_Record AE_No="AE_2"/>
</Medical Record>
</Record_Folder>
<Record_Folder Folder_No="F_24" Location="New Territories">
<Borrow Borrower_No="B22">
<Loan_History Loan_Date="Apr-03-2002"/>
</Borrow>
<Medical_Record Medical_Rec_No="M_333333"
Create_Date="Mar-03-01" Sub_Type="A">
    <AE_Record AE_No="AE_3"/>
</Medical_Record>
</Record_Folder>
</Patient>
<Patient Country_No="C0001" HKID="E8018229" Patient_Name="Bloor">
  <Record_Folder Folder_No="F_22" Location="Kowloon">
<Borrow Borrower_No="B1">
        <Loan_History Loan_Date="Jan-10-2002"/>
<lBorrow>
<Borrow Borrower_No="B2">
<Loan_History Loan_Date="Sep-29-2002"/>
<lBorrow>
<Borrow Borrower_No="B12">
<Loan_History Loan_Date="Jan-07-2002"/>
    </Borrow>
<Medical_Record Medical_Rec_No="M_331998" Create_Date="Nov- 10-1998"
Sub_Type="O">
    <Outpatient_Record Outpatient_No="O_51" Specialty="Heart"/>
</Medical_Record>
<Medical_Record Medical_Rec_No="M_341999" Create_Date="Dec-20-1999"
Sub_Type="O">
    <Outpatient_Record Outpatient_No="O_52"
    Specialty="Ophthalmic"/>
</Medical_Record>
</Record_Folder>
</Patient>
<Patient Country_No='C000I' HKID='E6077888' Patient_Name='Kim'>
<Record_Folder Folder_No='F_23' Location='New Territories'>
<Borrow Borrower_No='B3'><Loan_History Loan_Date='Sep-29-2002'/></Borrow>
```

-continued

```
<Borrow Borrower_No='B14'><Loan_History Loan_Date='Jan-11-2002'/></Borrow>
<Borrow Borrower_No='B25'><Loan_History Loan_Date='Mar-03-2002'/></Borrow>
<Medical_Record Medical_Rec_No='M_382001' Create_Date='Feb-22-2001'
Sub_Type='O'>
    <Outpatient_Record Outpatient_No='O_53' Specialty='Therapy'/>
</Medical_Record>
</Record_Folder>
</Patient>
</Patient_Records>
```

Case Study 2

This case study is for a bank loan application. In this study, a loan with an identity number belongs to a customer who has a customer identity number Customers have mortgage loans secured by loan securities. Each loan interest type may be accrued by multiple interest types. Each interest type may be assigned to different loans. Customers open accounts at different branches with a maturity date. Each loan is charged with interest of a rate of an interest type. All of these may be described in an extended entity relationship model such as that shown in FIG. 17.

Figure 17:
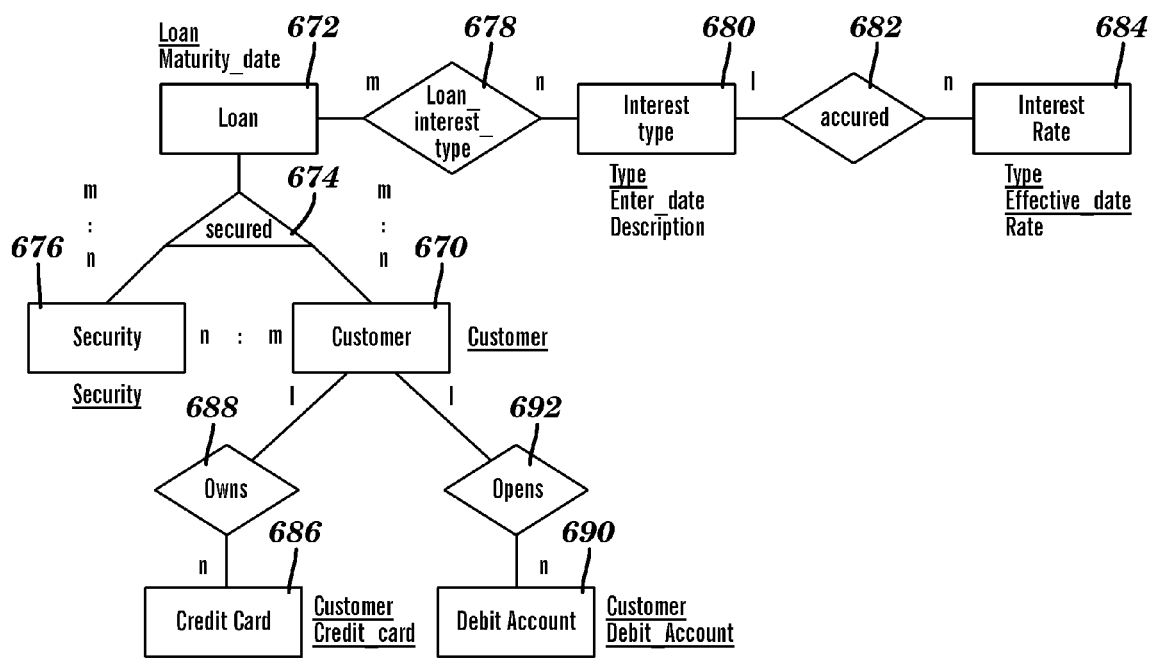
FIG. 17 is a schematic representation of an EER model for a bank's mortgage loan database system for use in an embodiment of the invention.

Starting from the entity Loan 672 in the EER model of FIG. 17, the relevant entities for it are determined. The relevant entities include the related entities that are navigable from the parent entity 672 in various relationships. The entity Customer 670 is in a many-to-many relationship 674 defined as secured with the parent entity 672. The entity Security 676 is in a many-to-many relationship 674 defined as secured with the parent entity 672. The entity Interest Type 680 is in a many-to-many relationship 678 defined as Loan Interest Type with the parent entity 672. The entity Interest Type 680 is in a one-to-many relationship 682 defined as accrued with the entity Interest Rate 684. The entity Customer 670 is in a one-to-many relationship 688 defined as owns with the entity Credit Card 686. The entity Customer is also in a one-to-many relationship 692 defined as opens with the entity Debit Account 690.

The relational schemas for this case study are shown in Tables 30 to 37 below.

TABLE 30

Relation Customer-Credit_Card

| *Customer | Credit_Card |
|---|---|
| Joe Doe | 110011001100 |
| Bob Kusik | 110022002200 |
| Chris Bloor | 220022002200 |

TABLE 31

Relation Loan-Customer

| *Loan | *Customer |
|---|---|
| LN00001 | Joe Doe |
| LN00002 | Bob Kusik |
| LN00003 | Chris Bloor |

TABLE 32

Relation Customer-Debit_Acct

| *Customer | Debit_Acct |
|---|---|
| Joe Doe | 550011 |
| Bob Kusik | 660011 |
| Chris Bloor | 770000 |

TABLE 33

Relation Interest_Type

| Type | Enter_Date | Description |
|---|---|---|
| Prime | 01/01/2002 | Fixed |
| Mortgage | 15/06/2002 | Floating |
| Car Loan | 01/12/2002 | Fixed |

TABLE 34

Security-Loan

| *Security | *Loan | Maturity_Date |
|---|---|---|
| LS00001 | LN00001 | 31/12/2005 |
| LS00002 | LN00002 | 15/06/2005 |
| LS00003 | LN00003 | 15/12/2004 |

TABLE 35

Relation Customer-Security

| *Customer | *Security |
|---|---|
| Joe Doe | LS00001 |
| Bob Kusik | LS00002 |
| Chris Bloor | LS00003 |

TABLE 36

Relation Interest_Rate

| *Type | Effective_Date | Rate |
|---|---|---|
| Prime | 15/01/2002 | 5 |
| Mortgage | 01/07/2002 | 7 |
| Car Loan | 01/01/2003 | 6 |

TABLE 37

Relation Loan-Interest_Type

| *Loan | *Type |
|---|---|
| LN00001 | Prime |
| LN00002 | Mortgage |
| LN00003 | Car Loan |

Transforming Relational Database into XML Documents:
(a) Schema Translation from Relational topological XML Tree Model After classifying each attribute in a classification table, their constraints may be derived as set out in Table 38:

TABLE 38

| Relation Name | Relational Type | Primary Key | KAP | KAG | FKA | NKA |
|---|---|---|---|---|---|---|
| Customer-Credit_Card | PR2 | Customer, Credit_Card | Customer | Credit_Card | | |
| Customer-Debit_Acct | PR2 | Customer, Debit_Acct | Customer | Debit_Acct | | |
| Customer-Security | SR1 | Customer, Security | Customer, Security | | | |
| Security-Loan | SR1 | Security, Loan | Security, Loan | | | Maturity_Date |
| Loan-Customer | SR1 | Loan, Customer | Loan, Customer | | | |
| Interest_Type | PR1 | Type | | | | Enter_Date, Description |
| Interest_Rate | PR2 | Type, Effective_Date | Type | Effective_Date | | Rate |
| Loan-Interest_Type | PR2 | Loan, Type | Loan, Type | | | |

(i) Map Relational Schema into Group Topological XML Tree Model

Figure 18:
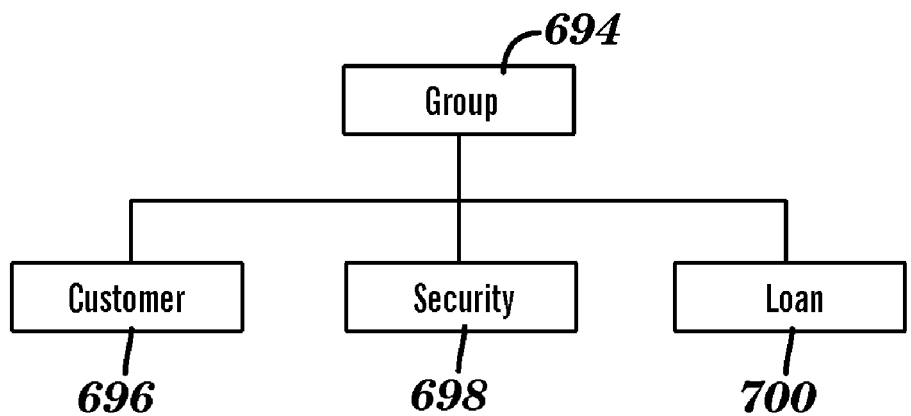
FIG. 18 is an example of an XML XML Tree Model based on a conceptual view of a bank's mortgage system for use in an embodiment of the invention.
Figure 19:
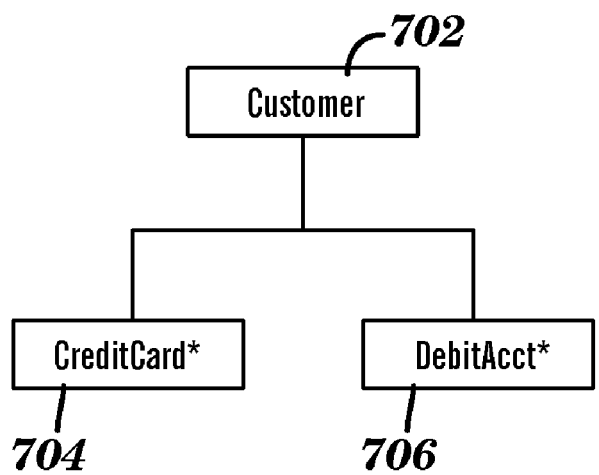
FIG. 19 is an example of an XML XML Tree Model based on a conceptual view of a bank's mortgage system for a sub-element of the graph of FIG. 18 for use in an embodiment of the invention.
Figure 20:
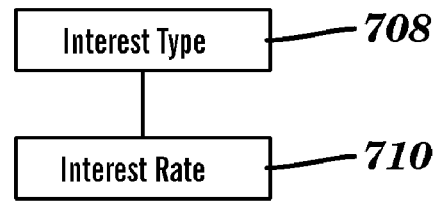
FIG. 20 is an example of an XML XML Tree Model based on a further conceptual view of a bank's mortgage system for use in an embodiment of the invention.
Figure 21:
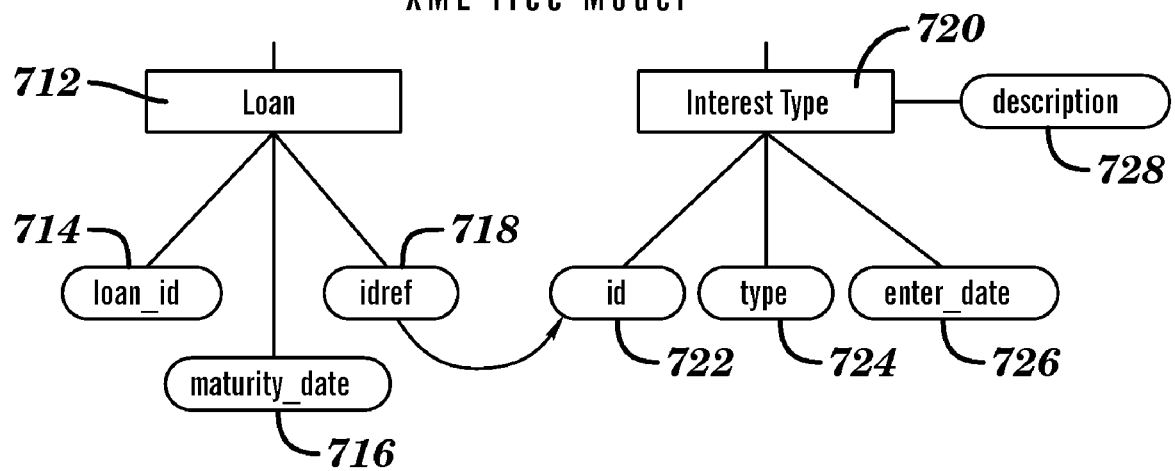
FIG. 21 is an example of an XML XML Tree Model based on a still further conceptual view of a bank's mortgage system for use in an embodiment of the invention.

The relational schema comprising the relations R1, R2 and R3 where R1 is defined by R1(*Customer, *Security), R2 is defined by R2(*Security, *Loan, Maturity Date), and R3 is defined by R3(*Loan, *Customer) are joined into the relation R(*Customer, *Security *Loan, Maturity_Date). Then, the relation R is transformed into a group of elements in an XML Tree Model. FIG. 18 shows this relationship R transformed into an XML Tree Model where the group element 694 has the sub-elements Customer 696, Security 698 and Loan 700.
(ii) Map Relational Schema into Multiple Topological XML Tree Model The relational schema comprising the relations R1 and R2, where these relations R1 and R2 are defined as R1(*Customer, Credit_Card) and R2(*Customer, Debit_Acct), are joined into the relation R(*Customer, Credit_Card, Debit_Acct). Then the relation R is transformed into a group of sub-elements of multiple occurrences in an XML Tree Model. FIG. 19 shows this relationship R transformed into a group of sub-elements of multiple occurrences in an XML Tree Model where the element Customer 702 has the sub-elements CreditCard* 704 and DebitAcct*. In this context, the symbol '*' indicates multiple occurrences.
(iii) Map Relational Schema into a Single Sub-Element Topological XML Tree Model The relational schema comprising the relations R1 and R2, where R1 and R2 in this case are defined as R1(Type, Enter_Date, Description) and R2(*Type, EffectiveDate, Rate,), are mapped into a relation R(Type, EffectiveDate, Enter_Date, Rate, Description). Then the relation R is transformed into a single sub-element topological XML Tree Model. FIG. 20 shows this relationship R transformed into an XML Tree Model where the element Interest Type 708 has the single sub-element Interest Rate 710.
(iv) Map Relational Schema into a Referral Topological XML Tree Model The relational schema comprising the relation R(Loan_ID, Type) is mapped into a referral topological XML Tree Model as shown in FIG. 21. FIG. 21 shows the XML Tree Model comprising the elements Loan 712 and Interest Type 720. In the XML Tree Model, the element Loan 712 has the attributes loan_id 714, maturity_date 716 and idref 718. The element Interest Type has the attributes id 722, type 724, enter_date 726 and description 728. The element Loan 712 having an idref 718 refers to the element Interest Type 720 having an ID 722.

Figure 22:
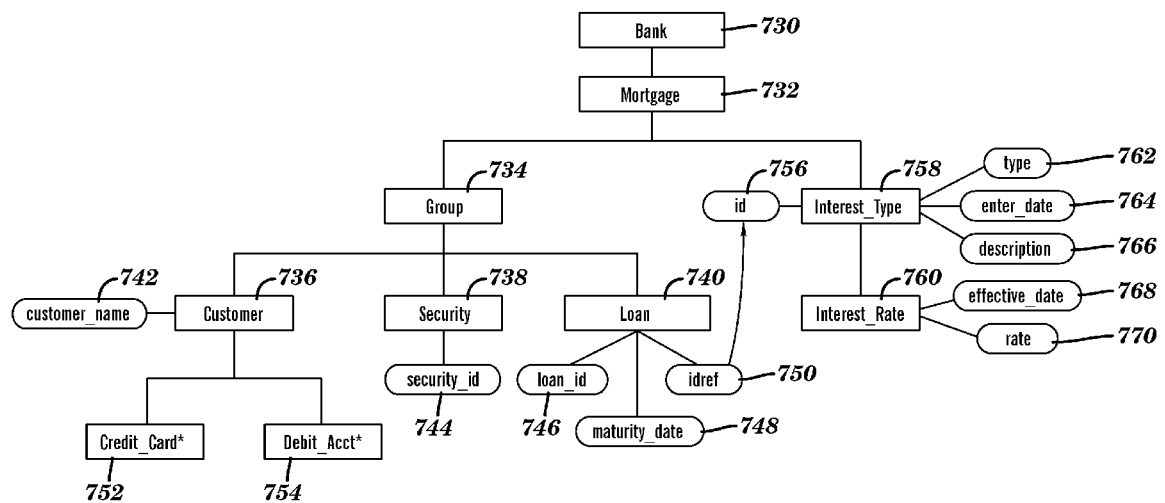
FIG. 22 is an example of an XML XML Tree Model based on an integration of the XML Tree Models of FIGS. 18 to 21 for use in an embodiment of the invention.

Finally, the above translated XML Tree Models of FIGS. 18 to 21 are integrated into an XML Tree Model as shown in FIG. 22.

The XML Tree Model of FIG. 22 comprises the root element Bank 730 having a sub-element mortgage 732. The sub-element mortgage 732 has the sub-element group 734 which in turn has the sub-elements Customer 736, Security 738 and Loan 740. The element Customer 736 has the sub-elements customer_name 742, Credit_Card* 752 and Debit_Acct* 754, the '*' indicating multiple occurrences. The element Security 738 has the attribute security_id 744. The element Loan 740 has the attributes loan_id 746, maturity-date 748 and idref 750.

The element mortgage 732 also has the sub-element Interest Type 758. The sub-element Interest Type 758 has the sub-element Interest_Rate 760 and the attributes type 762, enter_date 764, and description 766. The sub-element Interest_Rate 760 has the attributes effective_date 768 and rate 770. The element Loan 712 having the idref 750 refers to the element Interest Type 720 having the ID 756.
(b) Map XML Tree Model into XML Schema In this case study, Bank is selected as the root of the XML document for the application. Then the integrated XML Tree Model may be mapped into an XML Schema (DTD) as follows:

```
<?xml version="1.0" encoding="UTF-8"?>
<!ELEMENT Bank ( Mortgage+)>
<!ELEMENT Mortgage ( Customer, Security, Loan, Interest_Type) >
<!ELEMENT Customer ( Credit_Card*, Debit_Acct*)>
<!ATTLIST Customer customer_name CDATA#REQUIRED>
```

```
<!ELEMENT Credit_Card (#PCDATA)>
<!ELEMENT Debit_Acct (#PCDATA)>
<!ELEMENT Security EMPTY>
<!ATTLIST Security security_id NMTOKEN #REQUIRED>
<!ELEMENT Loan EMPTY>
<!ATTLIST Loan loan id NMTOKEN #REQUIRED>
<!ATTLIST Loan maturity_date CDATA#REQUIRED>
<!ATTLIST Loan idref IDREF #REQUIRED>
<!ELEMENT Interest_Type (Interest_Rate)>
<!ATTLIST Interest_Type type CDATA#REQUIRED>
<!ATTLIST Interest_Type enter_date CDATA#REQUIRED>
<!ATTLIST Interest_Type description CDATA#REQUIRED>
<!ATTLIST Interest_Type id ID #REQUIRED>
<!ELEMENT Interest_Rate EMPTY>
<!ATTLIST Interest_Rate rate NMTOKEN#REQUIRED>
<!ATTLIST Interest_Rate effective_date CDATA#REQUIRED>
```

(c) Data Conversion from Relational to XML Document

Case (i): Relations→Group topological XML document:

To convert the data from the relational database into the XML document, firstly a reorganized relation R1(*Customer, *Security, *Loan, Maturity_Date) is loaded into a group of element data instances in an XML document (1) as follows:
Relation R1=Relation Customer-Security ▷ ◁Relation Security-Loan ▷ ◁Relation Loan-Customer
Relation R1 is shown in Table 39.

TABLE 39

| *Customer | *Security | *Loan | Maturity_Date |
|---|---|---|---|
| Joe Doe | LS00001 | LN00001 | 31/12/2005 |
| Bob Kusik | LS00002 | LN00002 | 15/06/2005 |
| Chris Bloor | LS00003 | LN00003 | 15/12/2004 |

XML Document (1)

```
<Group>
  <Customer customer_name="Joe Doe"></Customer>
  <Security security_id="LSOOOO1 "></Security>
  <Loan loan_id="LNOOOO1' maturity_date="31/12/2005"></Loan>
</Group>
<Group>
  <Customer customer_name="Bob Kusik"></Customer>
  <Security security_id="LS00002"></Security>
  <Loan loan_id="LN00002"maturity_date="15/06/2005"></Loan>
</Group>
<Group>
  <Customer customer_name="Chris Bloor"></Customer>
  <Security security_id="LS00003"></Security>
  <Loan loan_id="LN00003" maturity_date="15/12/2004"></Loan>
</Group>
```

Case (ii): Relations→Multiple sub-element topological XML document:

To convert the data from the relational database into the XML document, secondly, a reorganized relation R2(*Customer, CreditCard, DebitAcct) is loaded into a multiple sub-element topological XML document (2) as follows:
Relation R2=Relation Customer-Credit_Card ▷◁ Relation Customer-Debit_Acct
Relation R2 is shown in Table 40.

TABLE 40

| *Customer | Credit_Card | Debit_Acct |
|---|---|---|
| Joe Doe | 110011001100 | 550011 |
| Bob Kusik | 110022002200 | 660011 |
| Chris Bloor | 220022002200 | 770000 |

XML Document (2)

```
<Customer customer_name="Joe Doe">
  <Credit_Card>110011001100</Credit_Card>
  <Debit_Acct>550011</Debit_Acct>
</Customer>
<Customer customer_name="Bob Kusik">
  <Credit_Card>110022002200</Credit_Card>
  <Debit_Acct>660011</Debit_Acct>
</Customer>
<Customer customer_name="Chris Bloor">
  <Credit_Card>220022002200</Credit_Card>
  <Debit_Acct>770000</Debit_Acct>
</Customer>
```

Case (iii): Relations→Single sub-element topological XML document:

To convert the data from the relational database into the XML document, thirdly a reorganized relation R3(Type, Effective_Date, Enter_Date, Rate, Description) is loaded into a single sub-element topological XML document (3) as follows:

Relation R3=Relation Interest_Type ⋈ Relation Interest_Rate

Relation R3 is shown in Table 41.

TABLE 41

| Type | Effective Date | Enter_Date | Rate | Description |
|---|---|---|---|---|
| Prime | 15/01/2002 | 01/01/2002 | 5 | Fixed |
| Mortgage | 01/07/2002 | 15/06/2002 | 7 | Floating |
| Car Loan | 01/01/2003 | 01/12/2002 | 6 | Fixed |

XML Document (3)

```
<Interest_Type type="Prime" enter_date="01/01/2002"
description="Fixed">
<Interest_Rate effective_date="15/01/2002" rate="5"></Interest_Rate>
</Interest_Type>
<Interest_Type type = "Mortgage" enter_date = "15/06/2002"
description="Floating">
<Interest_Rate effective_date="01/07/2002" rate="7"></Interest Rate>
</Interest_Type>
<Interest_Type type="Car Loan" enter_date="01/12/2002"
description="Fixed">
<Interest_Rate effective_date="01/01/2003" rate="6"></Interest_Rate>
</Interest_Type>
```

Case (iv): Relations→Referral topological XML document:

To convert the data from the relational database into the XML document, fourthly a reorganized relation R4(Loan, Type,) is loaded into a topological XML document (4) as follows:

Relation R4=Relation Loan-Interest_Type

Relation R4 is shown in Table 42.

TABLE 42

| Loan | Type |
|---|---|
| LN00001 | Prime |
| LN00002 | Mortgage |
| LN00003 | Car Loan |

XML Document (4)

```
<Loan loan_id=" LN00001" idref="1"></Loan>
<Interest_Type type="Prime" id=" 1 "></Interest_Type>
<Loan loan_id=" LN00002" idref="2"></Loan>
<Interest_Type type="Mortgage" id="2"></Interest_Type>
```

-continued

```
<Loan loan_id=" LN00003" idref="3"></Loan>
<Interest_Type type="Car Loan" id="3"></Interest_Type>
```

Then all of the above relations are integrated into an XML document by use of a DOM tree as follows:

```
<?xml version="1.0" encoding="UTF-8"?>
<!DOCTYPE Bank SYSTEM "bank.dtd">
<Bank>
   <Mortgage>
      <Customer customer_name="Joe Doe">
            <Credit_Card>110011001100</Credit_Card>
            <Debit_Acct>550011</Debit_Acct>
      </Customer>
<Security security_id="LS00001"></Security>
<Loan loan_id="LN00001" maturity_date="31/12/2005" idref="1"></Loan>
<Interest_Type type="Prime" enter_date="01/01/2002" description="Fixed" id="1">
      <Interest_Rate effective_date="15/01/2002" rate="5"></Interest Rate>
</Interest_Type>
</Mortgage>
<Mortgage>
<Customer customer_name="Bob Kusik">
<Credit_Card>110022002200</Credit_Card>
<Debit_Acct>660011</Debit_Acct>
    </Customer>
    <Security security_id="LS00002"></Security>
    <Loan loan_id=" LN00002" maturity_date=" 15/06/2005" idref="2"></Loan>
    <Interest_Type type="Mortgage" enter_date=" 15/06/2002" description="Floating" id="2">
        <Interest_Rate effective_date="01/07/2002" rate="7"</Interest_Rate>
        </Interest_Type>
</Mortgage>
<Mortgage>
<Customer customer_name="Chris Bloor">
<Credit_Card>220022002200</Credit_Card>
<Debit_Acct>770000</Debit_Acct>
</Customer>
<Security security_id=" LS00003"></Security>
<Loan loan_id=" LN00003" maturity_date=" 15/12/2004" idref="3"></Loan>
<Interest_Type type="Car Loan" enter_date="01/12/2002" description="Fixed" id"3">
      <Interest_Rate effective_date="01/01/2003" rate="6"></Interest_Rate>
</Interest_Type>
</Mortgage>
</Bank>
```

Update Transactions from SQL to XML Document

At the relational database (RDB) site, DML statements that update the relational database are monitored. Every time an update operation (insert/delete/update) changes the relational database, the changes may also be applied to the corresponding XML database. This may be implemented by transforming the update transactions of the relational database program into the update transactions of the replicate XML database program which perform the same operations on the database as did the original relational database programs.

Update Transaction Translation from SQL to DOM

Three update transactions, namely insert, update and delete may be translated from SQL to DOM as follows. The example given shows the actual SQL and its translated DOM statements.

Firstly, if it is desired to insert a new record into the RDB, the corresponding change is applied to the XMLDB simultaneously, as shown below:

Customer Name: Tomi
Credit Card Number: 999922002200
Debit Card Number: 999911
Security Number: LS00004

-continued

```
Loan Number: LN00004
Interest Type: Prime
Interest Rate: 5
Description: Fixed
Enter Date: 01/12/2003
Effective Data: 15/01/2002
Maturity Date: 31/12/2008
INSERT
//code for RDB
Class.forName("sun.jdbc.odbc.JdbcOdbcDriver");
con = DriverManager.getConnection("jdbc:odbc:mortgageRDB", "", ""); stat = con
.createStatement( );
SQL = "INSERT INTO Customer_Credit_Card VALUES ("' + Tomi + "', "'+999922002200
+ "')"; stat.executeUpdate(SQL);
SQL = "INSERT INTO Customer_Debit_Acct VALUES ("' + Tomi + "', "' + 999911 + "')";
stat.executeUpdate(SQL);
SQL = "INSERT INTO Customer_Security VALUES ("' + Tomi + "', "' + LS00004 + "')";
stat.executeUpdate(SQL);
SQL "INSERT INTO Security_Loan VALUES ("' + L500004 + "', "' + LN00004 + "', "' +
31/12/2008 + "')"; stat.executeUpdate(SQL);
SQL = "INSERT INTO Loan_Customer VALUES ("' + LN00004 + "', "' +Tomi + "')";
stat.executeUpdate(SQL);
SQL = "INSERT INTO Interest_Type VALUES ("' + Prime + "', "' + 01/12/2003 + "', "'+
Fixed + "')"; stat.executeUpdate(SQL);
SQL= "INSERT INTO Loan_Interest_Type VALUES ("' + LN00004 + "', "' + Prime + "',
"'+ 01/12/2003 + stat.executeUpdate(SQL);
//code for XMLDB
Document doc = new DocumentImpl( );
Element mortgage = doc.createElement("Mortgage);
Element customer = doc.createElement("Customer');
customer.setAttribute("customer_name", "Tomi");
mortgage.appendChild(customer);
Element credit_card = doc.createElement("Credit_Card");
credit_card.appendChild(doc.createTextNode(999922002200);
customer.appendChild(credit_card);
Element debit_acct = doc.createElement("Debit_Acct");
debit_acct.appendChild(doc.createTextNode("999911)); customer.appendChild(debit_acct);
Element security = doc.createElemente("Security");
security.setAttribute("security_id', "LS00004);
mortgage.appendChild(security);
Element loan_ = doc.createElement("Loan");
loan_.setAttribute("loan_id", "LN00004 );
loan_.setAttribute("maturity_date", 31/12/2008);
loan_.setAttribute("idref', ID); //ID is a system generate number
mortgage.appendChild(loan);
Element interest_type = doc.createElement("Interest_Type");
interest_type.setAttribute("type","Prime");
interest_type.setAttribute("enter_date",01/12/2003); interest_type.setAttribute("description",
"Fixed");
interest_type.setAttribute("id", ID);
Element interest_rate = doc.createElement("Interest_Rate");
interest_rate.setAttribute("effective_date", 15/01/2002);
interest rate.setAttribute("rate", "5);
mortgage.appendChild(interest_type); interest_type.appendChild(interest_rate);
TaminoClient tamino = new TaminoClient("http://dell/tamino/mydb/Bank"); TaminoResult
tr= tamino.insert(mortgage);
If it is desired to update the following data, this may be carried out as follows:
Customer Name: Tomi
Credit Card N umber: : 999922002200 → 777722002200
Debit Card Number: 999911 → 777711
UPDATE
//code for RDB
Class.forName("sun.jdbc.odbc.JdbcOdbcDriver");
con = DriverManager.getConnection("jdbc:odbc:mortgageRDB", "", "");
stat con.createStatement( );
SQL ="UPDATE Customer_Credit_Card SET Credit_Card = "777722002200 WHERE
Customer = "' + Tomi + "'";
stat.executeUpdate(SQL);
SQL = "DELETE FROM Customer_Debit_Acct SET Debit_Acct "777711 WHERE
Customer = "' + Tomi +"'";
stat.executeUpdate(SQL);
//code for XMLDB
Document doc = new DocumentImpl( );
Element credit_card = doc.createElement("Credit Card");
credit_card.appendChild(doc.createTextNode("999922002200);
Element debit_acct doc.createElement("Debit_Acct");
debit_acct.appendChild(doc.createTextNode("999911));
TaminoClient tamino = new TaminoClient("http://dell/tamino/mydb/Bank");
TaminoResult tr = tamino.query("Mortgage/Customer[customer_name~=\"" + Tomi
+"*\"]");
```

```
while (tr.hasMoreElements( )){
    Element el=tr.getNextElement( );
tamino.delete(el);}
tr= tamino.insert(credit_card);
tr= tamino.insert(debit_acct);
Finally, if it is desired to delete, for example, the record "Tomi", this may be carried out as
follows:
DELETE
// code for SQL
Class.forName("sun.jdbc.odbc.JdbcOdbcDriver");
Con=DriverManager.getConnection("jdbc:odbc:mortgageRDB", "", "");
stat = con.createStatement( );
SQL= "DELETE FROM Customer_Credit_Card WHERE Customer = '" + Tomi + "'";
stat.executeUpdate(SQL);
SQL = "DELETE FROM Customer_Debit_Acct WHERE Customer ='" + Tomi + "'";
stat.executeUpdate(SQL);
SQL = "DELETE FROM Customer_Security WHERE Customer ='" + Tomi + "'";
stat.executeUpdate(SQL);
SQL = "DELETE FROM Security_Loan WHERE Security = '" + LS00004 + "'";
stat.executeUpdate(SQL);
SQL = "DELETE FROM Loan_Customer WHERE Customer = '" + Tomi + "'";
stat.executeUpdate(SQL);
SQL = "DELETE FROM Interest_Type WHERE Type ='" + "Prime" + "'AND Enter_Date =
'" + 01/12/2003 +"'"; stat.executeUpdate(SQL);
SQL = "DELETE FROM Loan_Interest_Type WHERE Loan ='" + LN00004 + "'";
stat.executeUpdate(SQL);
II code for XMLDB
TaminoClient tamino = new TaminoClient("http://dell/tamino/mydblBank");
TaminoResult tr = tamino.query("Mortgage[Customer/@customer_name~=\"" + Tomi
+"*\"]");
while (tr.hasMoreElements( )){
Element el=tr.getNextElement( );
tamino.delete(eI);}
```

FIGS. 23 to 31 show sample display screens which may be used for Case Study 2 described above during the implementation of the above-described method embodying the present invention.

Figure 23:
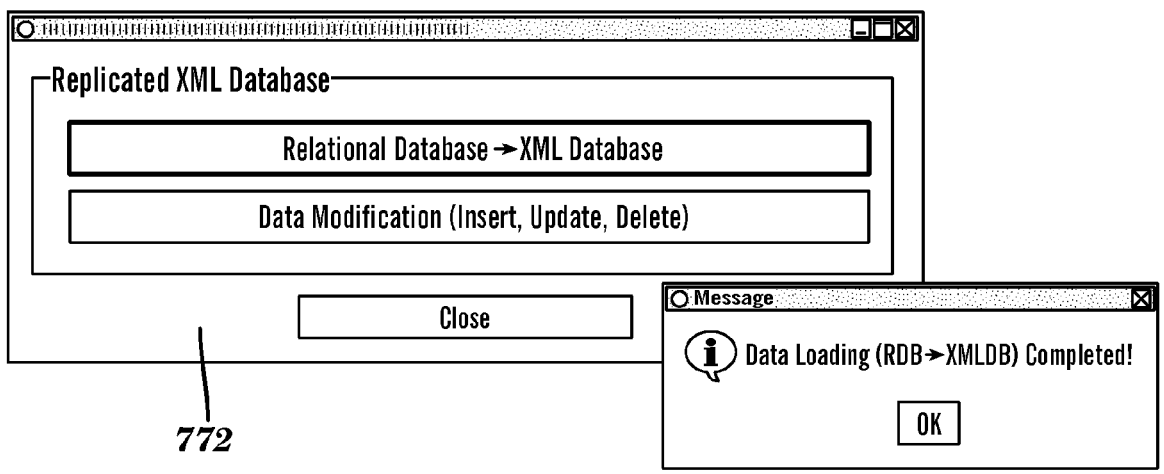
FIG. 23 is a schematic representation of an on-screen display of a replicated database menu for use in the present invention.

FIG. 23 shows a main menu 772 comprising two functions: Relational Database→XML Database, and Data Modification (Insert, Update, Delete). The first function may be used to extract the existing RDB instances, then to transform them into XML document structure and to save them continually into an XML database. The second function may be used to simulate the synchronization of both databases when the source database has been updated. Every time a user performs the XML operations, a program that constructs the corresponding XML document instance may be triggered and applied to the XML database simultaneously.

Figure 24:
FIG. 24 is a schematic representation of an on-screen display of a data modification menu for use in the present invention.
Figure 25:
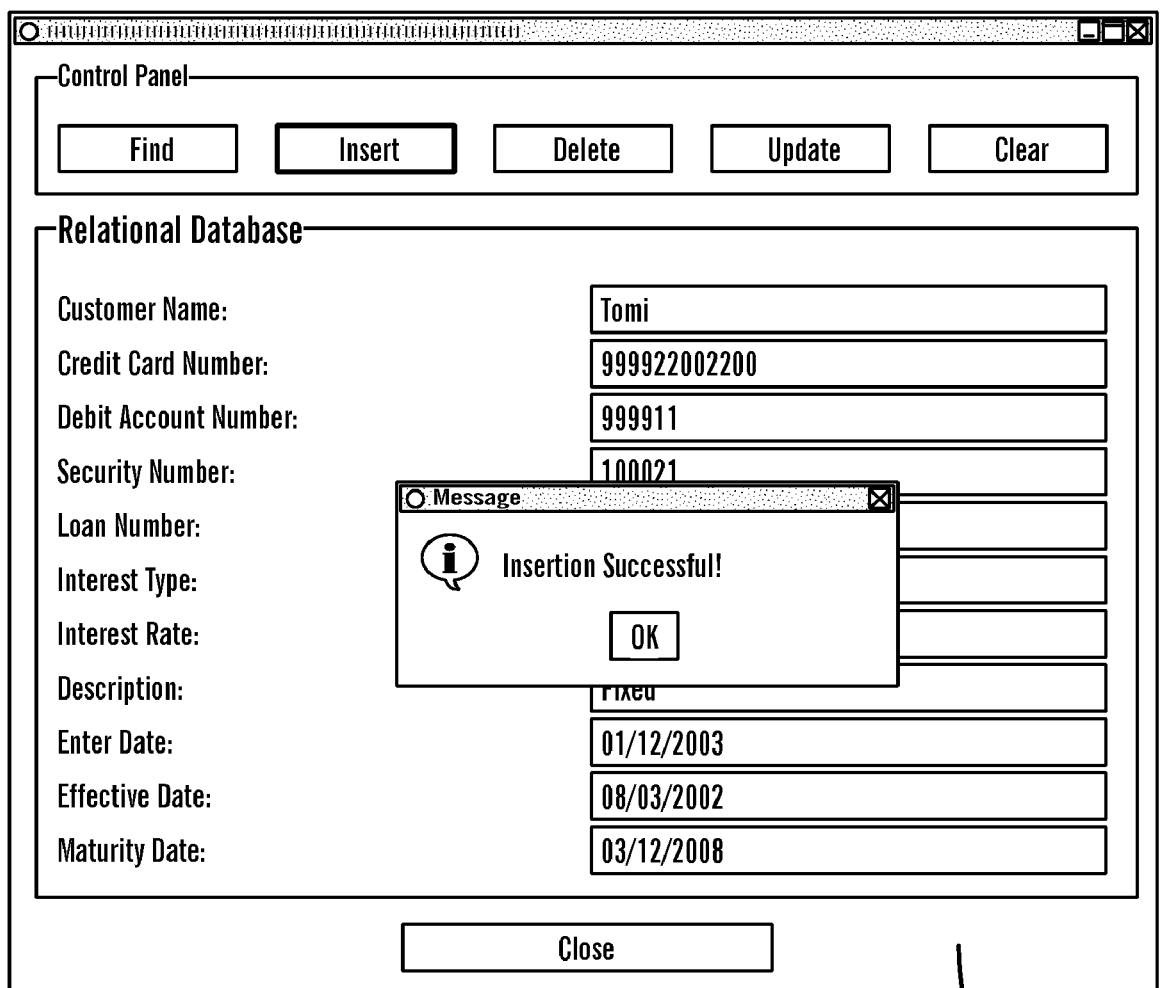
FIG. 25 is a schematic representation of an on-screen display showing the insertion of data into the menu of FIG. 24.
Figure 26:
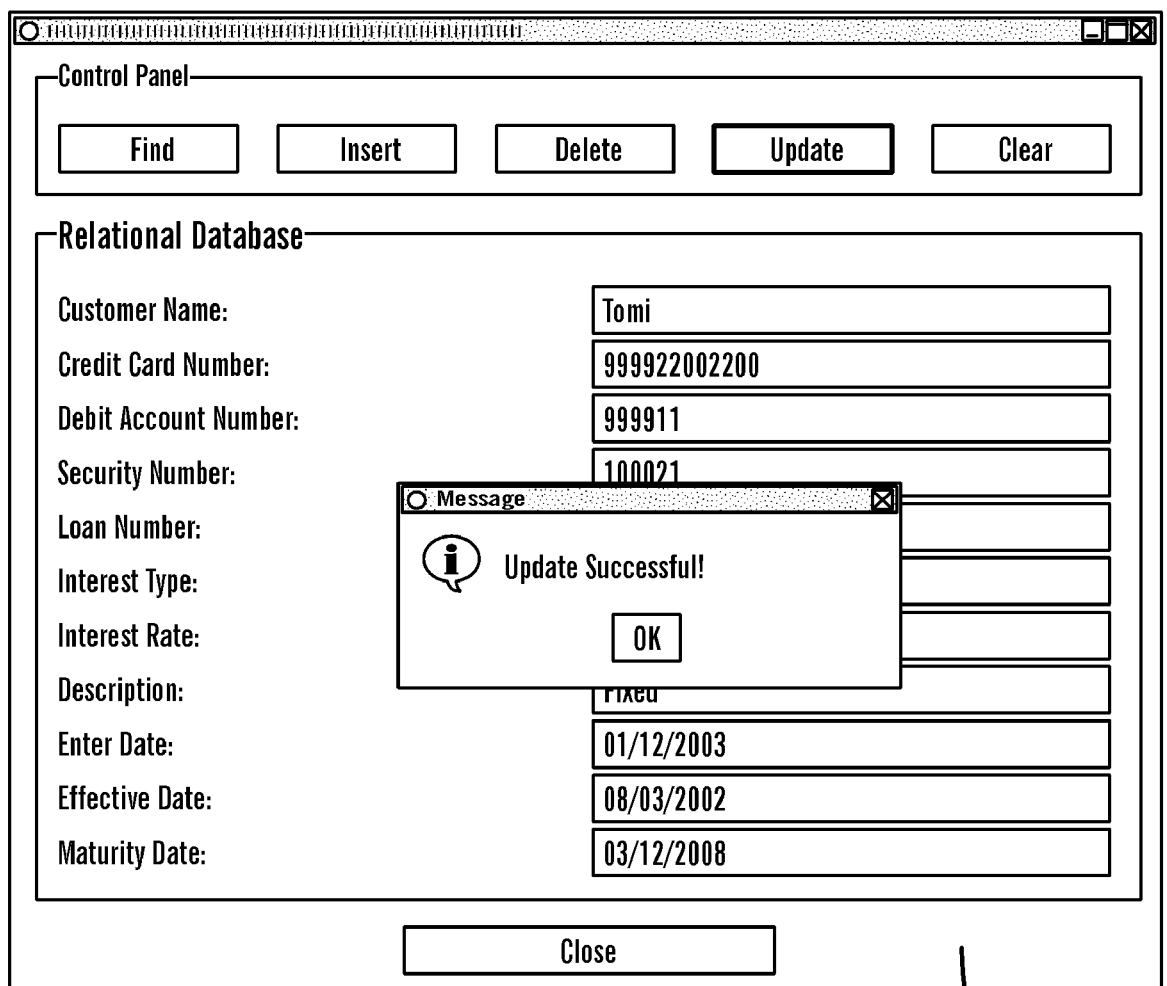
FIG. 26 is a schematic representation of an on-screen display of updating data in the menu of FIG. 24.
Figure 27:
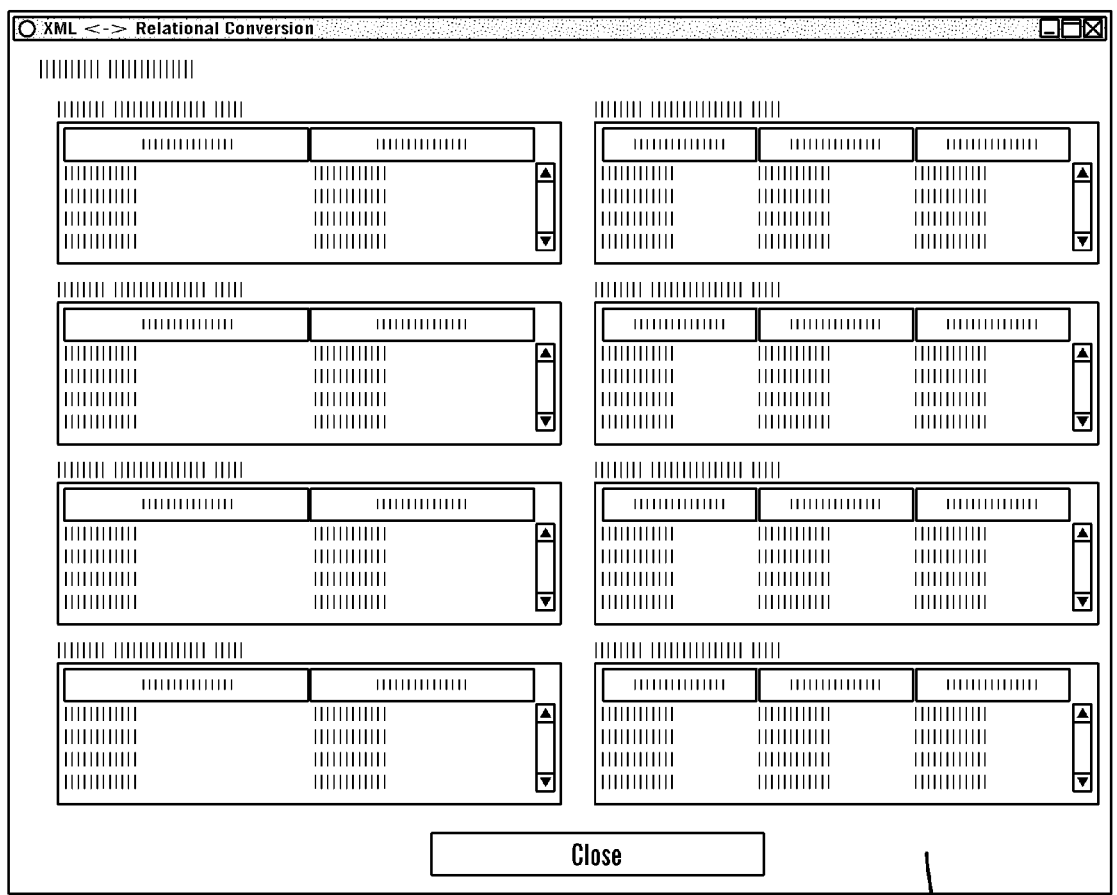
FIG. 27 is a schematic representation of an on-screen display of a relational database for use in the present invention.
Figure 28:
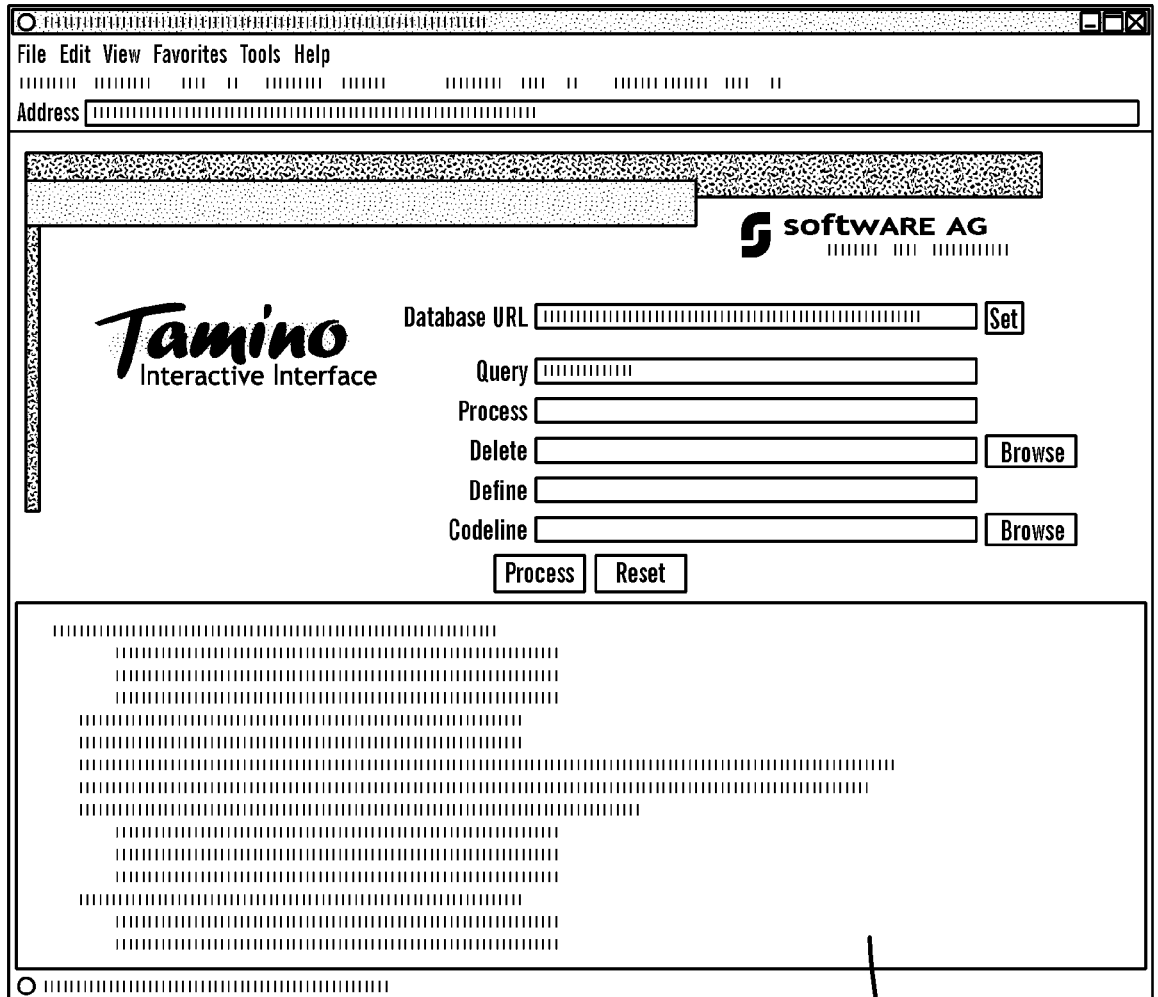
FIG. 28 is a schematic representation of an on-screen display of an XML database corresponding to the relational database of FIG. 27.
Figure 29:
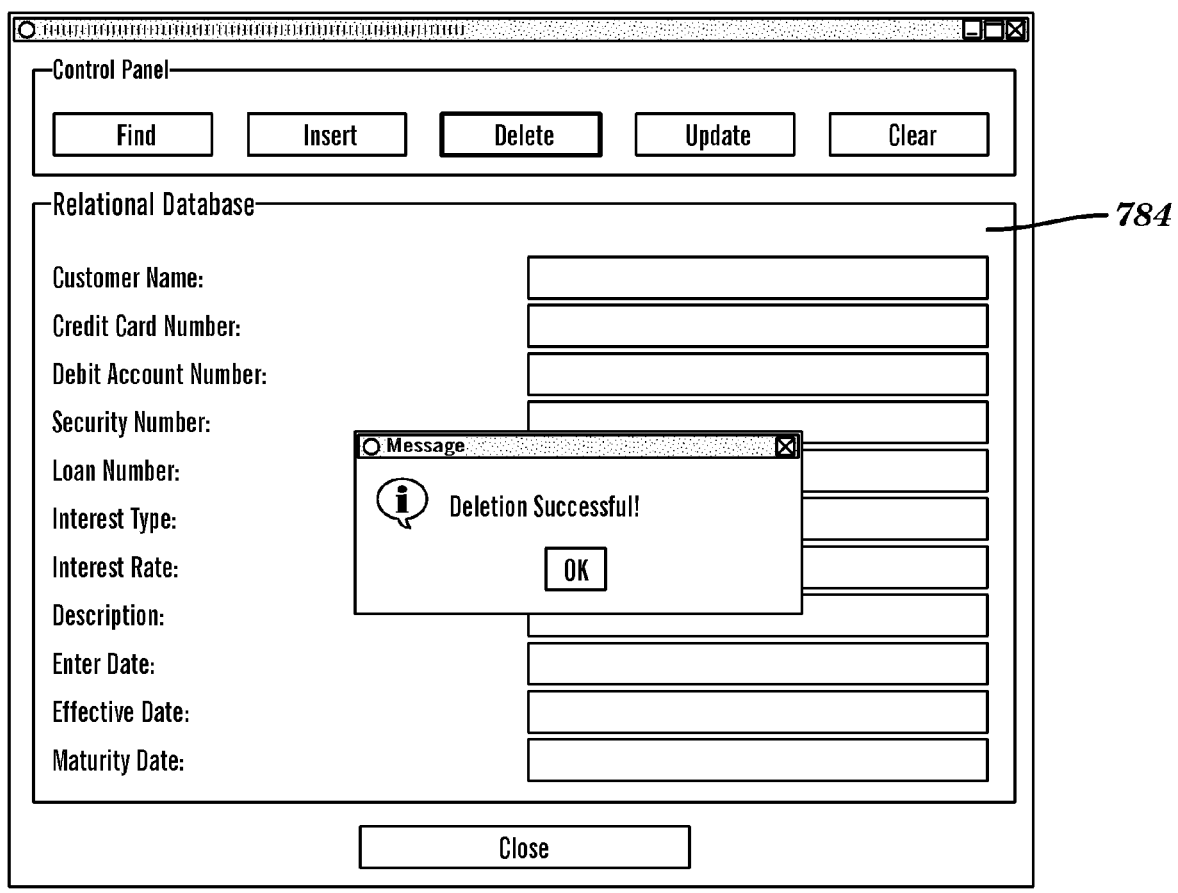
FIG. 29 is a schematic representation of an on-screen display showing the delete operation in the menu of FIG. 24.

FIG. 24 depicts the data modification interface 744 that allows a user to perform various XML operations. Firstly, a new customer "Tomi" is inserted into the RDB (as shown in the display screen 776 of FIG. 25), then his credit card and debit account numbers are updated (as shown in the display screen 778 of FIG. 26). The RDB and XML are both updated concurrently regarding the change of source database. FIGS. 27 and 28 show the corresponding changes as displayed on respective screens 780 and 782.

Finally, if it is desired to delete the customer "Tomi", a 'Find' operation may be executed to find the customer to be deleted, then the above-described Delete operation may be applied directly. A message box may appear on the display to show that the record has been deleted (as shown in the display screen 784 of FIG. 29).

Figure 30:
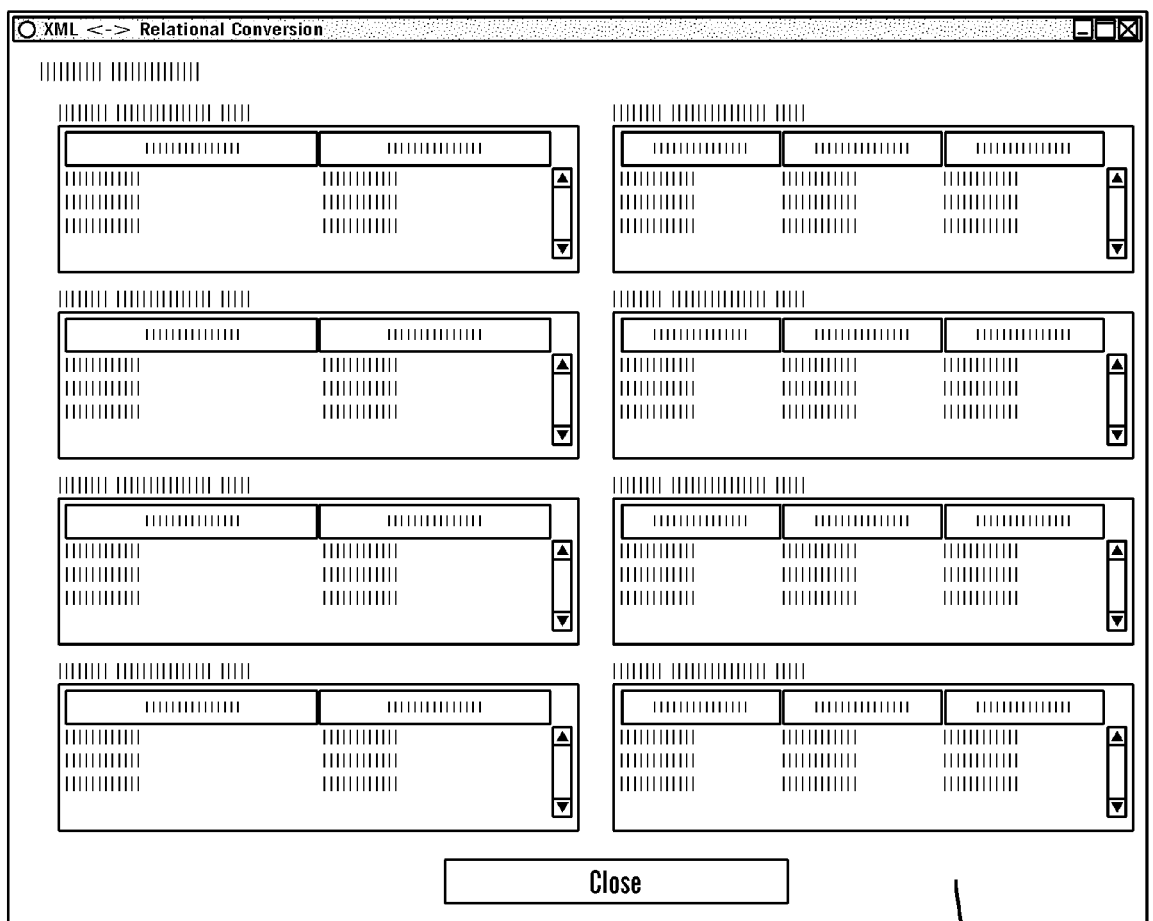
FIG. 30 is a schematic representation of an on-screen display of a final version of a relational database for use in the present invention.
Figure 31:
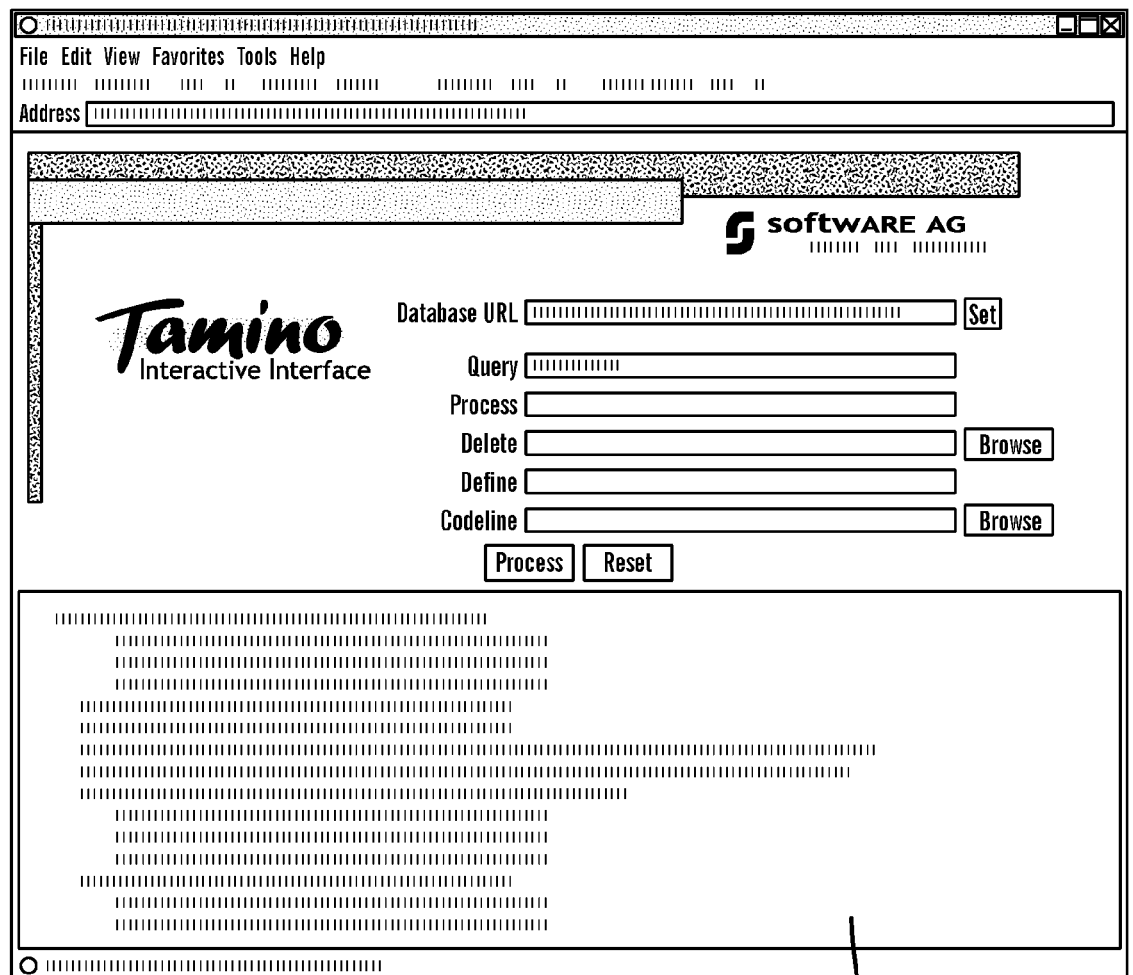
FIG. 31 is a schematic representation of an on-screen display of a final version of an XML database for use in the present invention.

FIGS. 30 and 31 show sample display screens 786 and 788 illustrating the final version of the databases after a series of DML operations.

In summary, one or more preferred embodiments of the present invention provide a method for converting a relational database into one or more XML documents according to its topology mapping. The schema translation and data conversion procedures are provided with steps and mapping rules to recover the data constraints semantics of relational database into an Extended Entity Relationship model which may then be mapped into XML Tree Model and XML schema. The target XML schema may be presented in DTD. The constraints of the relational schema in functional dependencies, inclusion dependencies and multi-valued dependencies may be represented in the translated XML schema. The translation may be constructed through an extracted XML view of relational database, which may be based on a selection of its root element (an entity) and its relevant and navigable elements, (the selected entity plus its navigable entities) to fulfil the data requirement of an XML document. The translation process involves mapping each constraint of relational schema into a hierarchical containment of XML Tree Model. The conversion is preferably capable of preserving the original relational database constraints. The resulting XML structure is thereby able to reflect the semantics and structure in the underlying relational database.

One or more preferred embodiments of the present invention may assist in improving the performance of Internet computing by allowing parallel processing for data exchange on the Internet as well as data processing of relational data. Also, the reliability of an XML database may be improved by recovery from its counterpart relational database.

Various modifications to the embodiments of the present invention described above may be made. For example, other components and method steps can be added or substituted for those above. Thus, although the invention has been described above using particular embodiments, many variations are possible within the scope of the claims, as will be clear to the skilled reader, without departing from the spirit and scope of the invention.

What is claimed is:

1. A method of translating a relational database into an XML document comprising the steps of:
    generating, using a computer, an Extended Entity Relationship (EER) model from a relational schema associated with said relational database;
    applying, using the computer, a schema translation process to the Extended Entity Relationship model to map the relational schema into a Document Type Definition (DTD) of an XML schema;
    generating, using the computer, a XML Tree Model from said Document Type Definition representative of one or more data semantics of the relational schema which are preserved as one or more data semantics in said XML document; and
    converting, using the computer, relational data from said relational database into said XML document by:
    using said relational schema and said XML schema from one selected from a group consisting of: said Document Type Definition, said XML Tree Model and a combination thereof, wherein structural constraints of any relationships from said relational database are preserved using identifiers (ID), identifier reference (IDREF) and instance occurrence indicators;
    converting, using the computer, one or more relations associated with relational data in said relational database into a Java Document Object Model (DOM); and
    manipulating, using the computer, said XML document using said Java Document Object Model.

2. The method according to claim 1, wherein the step of generating said Extended Entity Relationship model comprises reverse-engineering logical relational schema associated with said relational database.

3. The method according to claim 1, wherein the step of applying a schema translation process comprises mapping the relational schema with associated relational schema constraints into said Document Type Definition.

4. The method according to claim 1, wherein the step of applying a schema translation process comprises mapping the relational schema into a topological XML Document Type Definition.

5. The method according to claim 1, wherein the step of applying a schema translation process comprises defining a root element prior to mapping the relational schema into said Document Type Definition (DTD), said root element being representative of an element in said relational database.

6. The method according to claim 5, wherein the step of defining said root element comprises selecting said root element.

7. The method according to claim 5, wherein the step of defining said root element comprises selecting said root element from a relational entity table in said relational database.

8. The method according to claim 5, wherein said relational database comprises one or more entities, and said XML document comprises said root element, and one or more sub-elements, and wherein the step of applying a schema translation process further comprises one or more of the following steps after defining said root element:
    (a) mapping a weak entity from said relational database into said XML document;
    (b) mapping participation between entities in said relational database into said XML document;
    (c) mapping cardinality between entities in said relational database into said XML document;
    (d) mapping aggregation between entities in said relational database into said XML document;
    (e) mapping one or more ISA relationships between entities in said relational database into said XML document;
    (f) mapping one or more generalisations between entities in said relational database into said XML document;
    (g) mapping one or more categorisations between entities in said relational database into said XML document; and
    (h) mapping one selected from a group consisting of: one or more single, multiple (n-ary) relationships and a combination thereof between entities in said relational database into said XML document.

9. The method according to claim 1, wherein said relational database comprises one or more entities, and said XML document comprises a root element, and one or more sub-elements, and wherein the step of applying a schema translation process comprises mapping related entities in said relational database into relevant elements in said XML document based on navigability of the entities.

10. The method according to claim 8, wherein each mapping step generates a new XML document, and wherein the step of converting relational data from said relational database into said XML document comprises:
    (a) converting one or more relations associated with relational data in said relational database into a Document Object Model (DOM); and
    (b) integrating XML documents using said Document Object Model to form an XML database corresponding to said relational database.

11. The method according to claim 1 wherein the step of generating an XML Tree Model comprises generating a plurality of XML Tree Models representative of one or more data semantics of the relational schema.

12. The method according to claim 10, further comprising updating said relational database and said XML database by translating an update transaction from said relational database in Structural Query Language into an update transaction of said XML database as a Document Object Model.

13. The method according to claim 12, wherein said transactions update said relational database and said XML database concurrently to produce a synchronized update.

14. The method according to claim 12, wherein said updating of said relational database is effected prior to or after said update of said XML database to produce an asynchronized update.

15. The method according to claim 1, wherein the step of generating an Extended Entity Relationship (EER) model comprises recovering one or more data semantics associated with said relational schema from a classification table.

16. A method of data transmission of relational data through an XML document between a sender and a receiver over a network comprising:
    translating, using a computer, a relational database into an XML document, wherein the translating comprises:
    generating, using the computer, an Extended Entity Relationship (EER) model from a relational schema associated with said relational database;
    applying, using the computer, a schema translation process to the Extended Entity Relationship model to map the relational schema into a Document Type Definition (DTD) of an XML schema;
    generating, using the computer, a XML Tree Model from said Document Type Definition representative of one or more data semantics of the relational schema which are preserved as one or more data semantics in said XML document; and
    converting, using the computer, relational data from said relational database into said XML document by:

using said relational schema and said XML schema from one selected from a group consisting of said Document Type Definition, said XML Tree Model and a combination thereof, wherein structural constraints of any relationships from said relational database are preserved using identifiers (ID), identifier reference (IDREF) and instance occurrence indicators;

converting, using the computer, one or more relations associated with relational data in said relational database into a Java Document Object Model (DOM);

manipulating, using the computer, said XML document using said Java Document Object Model;

transmitting, using the computer, from said sender said XML document over said network;

receiving at said receiver said XML document; and converting said XML document into a local relational schema language used in said receiver.

17. The method according to claim 16, wherein the step of converting said XML document into the local relational schema used in said receiver comprises:

generating an XML Tree Model from said XML document;

generating a Document Type Definition representative of one or more data semantics of an XML schema associated with said XML document;

generating an Extended Entity Relationship (EER) model from said XML schema;

applying a schema translation process to the Extended Entity Relationship model to map the XML schema into said local relational schema representative of a relational database of said receiver, said data semantics of said XML schema being preserved as one or more data semantics in said relational database of said receiver; and converting XML data from said XML database into said local relational database using said local relational schema and said XML schema from one selected from a group consisting of: said Document Type Definition, said XML Tree Model and a combination thereof.

18. The method according to claim 17, wherein said network is the Internet.

19. A computer program product, stored on a non-transitory computer readable medium, for translating a relational database into an XML document during execution by a computer, the program product comprising program code for generating an Extended Entity Relationship (EER) model from a relational schema associated with said relational database;

program code for applying a schema translation process to the Extended Entity Relationship model to map the relational schema into a Document Type Definition (DTD) of an XML schema;

program code for generating a XML Tree Model from said Document Type Definition representative of one or more data semantics of the relational schema which are preserved as one or more data semantics in said XML document;

program code for converting relational data from said relational database into said XML document by:

using said relational schema and said XML schema from one selected from a group consisting of: said Document Type Definition, said XML Tree Model and a combination thereof, wherein structural constraints of any relationships from said relational database are preserved using identifiers (ID), identifier reference (IDREF) and instance occurrence indicators;

converting one or more relations associated with relational data in said relational database into a Java Document Object Model (DOM); and manipulating said XML document using said Java Document Object Model.

\* \* \* \* \*